(12) United States Patent
Rabadi

(10) Patent No.: US 10,901,704 B1
(45) Date of Patent: Jan. 26, 2021

(54) COMPUTER-AIDED DESIGN, SIMULATION, AND CODE GENERATION FOR CRYPTOGRAPHY

(71) Applicant: Nader Mazen Rabadi, Grand Forks, ND (US)

(72) Inventor: Nader Mazen Rabadi, Grand Forks, ND (US)

(73) Assignee: XMODN SECURITY, LLC, Grand Forks, ND (US)

( * ) Notice: Subject to any disclaimer, the term of this patent is extended or adjusted under 35 U.S.C. 154(b) by 0 days.

(21) Appl. No.: 16/932,823

(22) Filed: Jul. 19, 2020

(51) Int. Cl.
  *G06F 9/44* (2018.01)
  *G06F 9/445* (2018.01)
  *G06F 8/34* (2018.01)
  *G06F 8/36* (2018.01)

(52) U.S. Cl.
  CPC . *G06F 8/34* (2013.01); *G06F 8/36* (2013.01)

(58) Field of Classification Search
  CPC ... G06F 8/34; G06F 8/36; G06F 21/31; G06F 21/62; G06F 8/20; G06F 8/30; G06F 11/3688; H04W 12/00; H04W 12/001; H04W 12/06
  See application file for complete search history.

(56) References Cited

U.S. PATENT DOCUMENTS

| | | | |
|---|---|---|---|
| 7,367,012 B2 | 4/2008 | Szpak | |
| 8,898,481 B1* | 11/2014 | Osburn, III | H04L 63/0428 713/192 |
| 9,460,239 B1 | 10/2016 | Yunt | |
| 10,325,109 B2 | 6/2019 | Gomez Claros | |
| 2018/0011694 A1* | 1/2018 | Al-Fuqaha | G06F 8/34 |
| 2018/0173503 A1* | 6/2018 | Ghasemizadeh | G06F 3/04812 |
| 2019/0102157 A1* | 4/2019 | Caldato | G06F 21/602 |
| 2019/0227855 A1* | 7/2019 | Beckett | G06F 9/541 |
| 2020/0110796 A1* | 4/2020 | Tsabba | G06F 40/154 |
| 2020/0151319 A1* | 5/2020 | Sharma | G06F 8/30 |
| 2020/0250319 A1* | 8/2020 | Bacher | G06F 9/45558 |

OTHER PUBLICATIONS

Manuel Barbosa, SoK: Computer-Aided Cryptography, Jun. 2020, pp. 1-19. http://www.contrib.andrew.cmu.edu/~bparno/papers/cac-sok.pdf (Year: 2020).*

(Continued)

*Primary Examiner* — Mongbao Nguyen

(57) ABSTRACT

A software cryptography library management program allows a user to provide a software cryptography library via a graphical user interface. A cryptography toolbox program displays to the user a plurality of cryptographic operation modules in a cryptography toolbox view such that each of the cryptographic operation modules is a graphical shape representation of an operation that performs one or more of application programming interfaces from the provided software cryptography library. A cryptography design program allows the user to place cryptographic operation modules in a drawing area to form a cryptosystem. The user sends a command to a simulation engine to simulate the cryptosystem using the application programming interfaces. The user may send a different command to a code generation engine to generate code from the cryptosystem using the application programming interfaces.

22 Claims, 42 Drawing Sheets

(56) References Cited

OTHER PUBLICATIONS

Stefan Kruger, Generating Code for the Secure Usage of Crypto APIs, Feb. 2020, pp. 185-197. https://dl.acm.org/doi/pdf/10.1145/3368826.3377905 (Year: 2020).*

Computer Networks: A System Approach, 8.2 Cryptographic Building Blocks, 2019, p. 1. https://book.systemsapproach.org/security/crypto.html (Year: 2019).*

Stefan Krüger, CogniCrypt: Supporting Developers in using Cryptography, 2017, pp. 1-6. http://felixguenther.info/publications/ASE_KNRAMB17.pdf (Year: 2017).*

* cited by examiner 400
402 — Generate Elliptic Curve (EC) private and public keys, and encode the keys in PEM/DER ASN.1 Syntax.
404 — Module Label: [ ] — 406
410
408 — Elliptic Curve Name: [B-163 , sect163r2 ▼]
412 — ☑ Include EC Parameters with EC Private Key
414 — Output ASN.1 Syntax: [PKCS#8 Encrypted PrivateKeyInfo Structure ▼] — 416
418 — Output Format: [PEM ▼] — 420
422 — ○ PKCS #5 v1.5
424 — Encryption Scheme: [ ▼] — 426
428 — ● PKCS #5 v2.1
430 — Encryption Scheme: [AES-256 in CBC Mode ▼] — 432
434 — KDF: [HMAC with SHA1 ▼] — 436
438 — No. of Iterations: [5] — 440
442 — (8 Digits Maximum: 99999999 in Decimal)
444 — ● Random Salt Generation
446 — Number of Bytes in Decimal. Maximum 99. If Salt Length is set to 0, then the minimum recommended value of 8 will be used.
450
448 — Salt Length: [ ]
452 — ○ Salt via Port (Maximum 99 Bytes)

Display to Output Window:
454 — ☑ ECpriv

FIG. 4

No-Connection Module

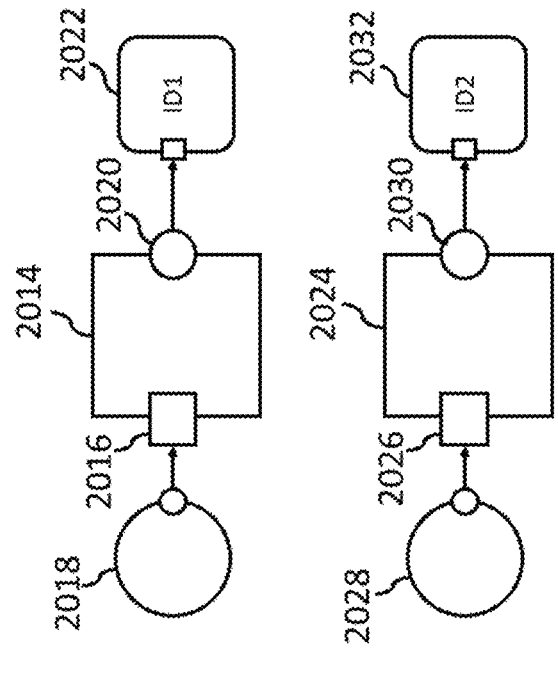
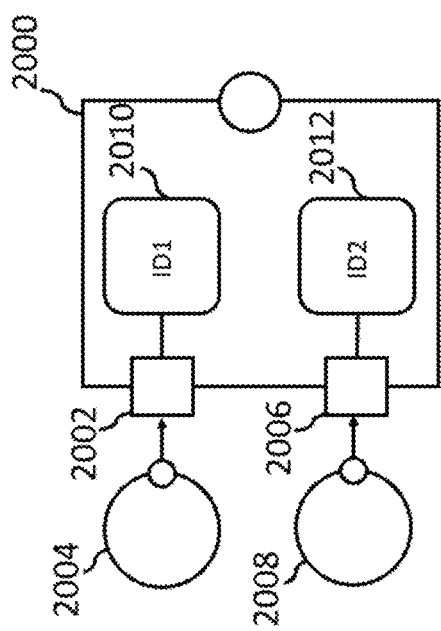
FIG. 20

```
int BNadd(
    char* a,
    int aLength,         } 3302
    char* b,
    int bLength,
    char** r,
    int* rLength,
    char** errReason)
{
    int error = 0;
    int status = 0;
    BIGNUM* BNa = NULL;  
    BIGNUM* BNb = NULL;  } 3304
    BIGNUM* BNr = NULL;

status = GetBigNumWithSign(a, aLength, &BNa, errReason);  // 3306
    if (status != 1)
    {
        goto ErrorExit;
    } status = GetBigNumWithSign(b, bLength, &BNb, errReason);  // 3308
    if (status != 1)
    {
        goto ErrorExit;
    }

BNr = BN_new();  // 3310
    if (BNr == NULL)
    {
        *errReason = GetError();
        goto ErrorExit;
    } status = BN_add(BNr, BNa, BNb);  // 3312
    if (status != 1)
    {
        *errReason = GetError();
        goto ErrorExit;
    } status = GetBigNumData(BNr, r, rLength, errReason);  // 3314
    if (status != 1)
    {
        goto ErrorExit;
    } error = ERROR_OK;

ErrorExit:

if (BNa != NULL)
    {
        BN_free(BNa);  // 3316
    } if (BNb != NULL)
    {
        BN_free(BNb);  // 3318
    } if (BNr != NULL)
    {
        BN_free(BNr);  // 3320
    } return error;
}
```

FIG. 33

```
int main()
{
    int error = 0;
    int status = 0;
    char* errReason = NULL;

status = BNadd(
        a_label_1,          ─── 3504
        aLength_label_1,
        b_label_1,          ─── 3506
        bLength_label_1,
        &r_label_1,         ─── 3508
        &rLength_label_1,
        &errReason);

if (status != 1)
    {
        goto ErrorExit;
    } error = ERROR_OK;
ErrorExit:
    if (r_label_1 != NULL)
    {
        OPENSSL_free(r_label_1);
    } return error;
}
```

```
#include <string.h>
char* a_label_1 = (char*)"53BC6E55859703133FF540EA7A0C29";
int aLength_label_1 = 30;
char* b_label_1 = (char*)"10B41870405969F2B2F20272109F8A4480";
int bLength_label_1 = 34;
char* r_label_1 = NULL;
int rLength_label_1 = 0;
```

FIG. 36

```
int main()
{
    int error = 0;
    int status = 0;
    char* errReason = NULL;

status = BNadd(                    ⎫
        a_label_1,                     ⎪
        alength_label_1,               ⎪
        b_label_1,                     ⎬ 3802
        blength_label_1,               ⎪
        &r_label_1,                    ⎪
        &rlength_label_1,              ⎪
        &errReason);                   ⎭ if (status != 1)
    {
        goto ErrorExit;
    } status = BNadd(                    ⎫
        r_label_1,        ← 3806       ⎪
        rlength_label_1,  ← 3808       ⎪
        b_demo_2,                      ⎬ 3804
        blength_demo_2,                ⎪
        &r_demo_2,        ← 3810       ⎪
        &rlength_demo_2,               ⎪
        &errReason);                   ⎭ if (status != 1)
    {
        goto ErrorExit;
    } error = ERROR_OK;
ErrorExit:
    if (r_label_1 != NULL)
    {
        OPENSSL_free(r_label_1);
    }
    if (r_demo_2 != NULL)
    {
        OPENSSL_free(r_demo_2);
    } return error;
}
```

```
#include <string.h>
char* a_label_1 = (char*)"53BC6E5585970313FF540EA7A0C29";
int aLength_label_1 = 30;
char* b_label_1 = (char*)"10B41B704D5969F282F20272109F8A4480";
int bLength_label_1 = 34;
char* r_label_1 = NULL;
int rLength_label_1 = 0;
char* b_demo_2 = (char*)"2B5A642CC2D3974F27CA654105";
int bLength_demo_2 = 26;
char* r_demo_2 = NULL;
int rLength_demo_2 = 0;
```

FIG. 39

COMPUTER-AIDED DESIGN, SIMULATION, AND CODE GENERATION FOR CRYPTOGRAPHY

BACKGROUND OF THE INVENTION

The embodiment and aspects describe herein relate, generally, to the field of cryptography, and more specifically, to implementing a computer-aided design, simulation, and code generation for cryptography.

Cryptography is utilized in information systems, which operate in and interact with an unsecure environment, to achieve a number of cybersecurity objectives. Examples of such cybersecurity objectives include: data confidentiality, data integrity, and authentication. In cryptography, a cryptographic primitive is an operation that performs mathematical computations on one or more input data to produce one or more output data. The main objective of the cryptographic primitive is to help in achieving one or more of cybersecurity objectives, An example of such cryptographic primitive is an encryption operation that takes a plain text data as an input data, a secret-key data as another input data, and then performs computations on the plain text and the secret-key data to produce as an output a cipher text data.

The cryptographic primitive by itself may not provide the service needed to meet one or more of cybersecurity objectives. For example, there is no point of encrypting the plain text data if no one can perform the inverse operation, which is a decryption operation, to retrieve the original plain text data. Thus, one may define a cryptographic scheme as a set of cryptographic primitives that may be used to provide one or more of security services. An example of such cryptographic scheme is an encryption scheme. The encryption scheme may consist of the encryption operation, the corresponding decryption operation, the secret-key data that may be shared between entities, the plain text data, and the cipher text data. An entity uses the encryption operation and the secret-key data to encrypt the plain text data and to produce the cipher text data. Another entity uses the corresponding decryption operation, the same secret-key data and the cipher text data to produce the original plain text data. Therefore, the encryption scheme in this example may be considered as meeting the cybersecurity objective of data confidentiality.

One of the mathematical foundations of the cryptographic primitive is based on the arithmetic of large integers. The arithmetic may be of a fixed precision or a multiple precision one. The terms "bignum" (i.e. Big Number) arithmetic and arbitrary precision arithmetic are also used to refer to multiple precision arithmetic. Fixed-precision arithmetic uses a fixed-size representation of integers. Multiple-precision arithmetic provides a variable-length representation of integers; thus, no precision is lost while representing the outcome of an arithmetic operation. The main purpose of using large-integer arithmetic when implementing the cryptographic primitive is to protect the cryptographic primitive from cryptanalysis attacks. The purpose of cryptanalysis attacks is to use mathematical techniques to find a weakness in the design or implementation of the cryptographic primitive. For example, given a small integer (e.g. 91), one can find two prime integers whose product is 91 (i.e. 7×13). However, factoring a large integer (e.g. in the order of 600 digits) into two prime integers has been known to be computationally hard, where these two prime integers are considered to be secret data.

An individual, who wants to apply cryptography to the information system, or who wants to learn and practice cryptography, would need to learn the following, in no preferred order:

(1) Fundamentals of cryptography, which includes: terminologies, concepts, and cryptographic primitives. The individual must be able to differentiate among these primitives in terms of purpose, functionality, level of security, and performance.

(2) One or more areas in mathematics as it is the heart of cryptography and the building blocks of cryptographic primitives. The art of cryptography starts with theoretical foundations that use mathematical techniques to solve a problem. The art may then evolve into practical science that exposes the inputs, outputs, properties, and conditions to use these techniques. Learning abstract algebra, group theory, and elliptic curves (to name a few areas in mathematics) may be necessary for the individual who wants to design new cryptographic primitives.

(3) Cryptography standards and latest recommendations from the National Institute of Standards and Technology (NIST), the Institute of Electrical and Electronics Engineers (IEEE), the American National Standards Institute (ANSI) and the Internet Engineering Task Force (IETF). Such organizations and groups provide recommendations on the use of selected cryptographic primitives, schemes, algorithms, and protocols that went through analysis, testing, and approvals by professionals in the art of cryptography.

(4) A software cryptography library, where there are many public and proprietary software libraries that implemented a number of standardized cryptographic primitives and algorithms. These libraries provide Application Programming Interface (API)s to these standardized cryptographic primitives and algorithms.

(5) A programming language (e.g. C, C++, C#, Java, Python) in order to use the software cryptography library, which is written in one of these programming languages.

I have found out that acquiring and applying knowledge in theoretical and practical cryptography is challenging due to the following:

(1) Acquiring knowledge and grasping the fundamentals in cryptography takes time and effort, especially when there are many publications in cryptography, including textbooks, journal papers, standards, and the Internet. Cryptography keeps evolving and changing to meet new standards in security. The individual needs to keep up-to-date on the latest recommendations in cryptography. Furthermore, time and effort may be costly especially when the objective of the individual is to get a secure system to the public as quickly as possible.

(2) The existence of large number of cryptographic primitives. Each cryptographic primitive has its own number of parameters, inputs, outputs, structural representations, and one or more methods of operations. The individual may learn about one method of applying the cryptographic primitive, and then at a later date to find out of another method that is more secure than the first one.

(3) Learning and applying the syntax and APIs of a selected software cryptography library may take time and effort. The individual needs to correlate between the APIs of the selected software cryptography library and the specifications of cryptographic primitives in order to correctly utilize cryptography in the system. The individual needs to write and debug pieces of code in the programming language that is supported by the selected software cryptography library. The individual may go through trial-anderror experiments in order to get the desired security objectives of using APIs and cryptographic primitives. Those of ordinary skilled in the art of software engineering will recognize that developing code takes effort, time, and cost.

(4) Cryptography uses large-integer arithmetic that an ordinary calculator does not help. The individual may use the software cryptography library if it provides APIs to handle large-integer arithmetic.

BRIEF SUMMARY OF THE INVENTION

In accordance with the teachings of the invention, a computer program product and a method are disclosed that aid a user in the design, simulation, and code-generation of a cryptosystem. In one aspect, the user may provide the computer program product with a software cryptography library that implements functional behaviors of cryptographic operations, which are called via Application Programming Interfaces (APIs). The computer program product displays to the user, in a cryptography toolbox view, graphical shape representations of such cryptographic operations. The user will be able to design a desired cryptosystem by selecting and dragging selected graphical shapes from the cryptography toolbox view, and dropping these shapes into a cryptography design view. The user will then be able to graphically connect these shapes in the cryptography design view to form the desired cryptosystem. The user may issue a command in the computer program product to simulate the desired cryptosystem and to validate its intended operations. The simulation is performed using the APIs of the provided software cryptography library. Once the user has validated the operation of the desired cryptosystem, the user may issue another command in the computer program product to generate code that represents the desired cryptosystem. The generated code may contain the APIs of the provided software cryptography library, and may be written in the same programming language of the provided software cryptography library. Thus, the user conveniently learns and experiments with cryptography, designs, simulates, validates, and generates code of a cryptosystem using graphical shape representations of cryptographic operations and a provided software cryptography library.

This Brief Summary is provided merely for purposes of summarizing the embodiment so as to provide a basic understanding of some aspects of the disclosure. Accordingly, it will be appreciated that the above described example embodiment is merely an example and should not be construed to narrow the scope or spirit of the disclosure in any way. Additional features of the invention will become apparent from the following detailed description taken in conjunction with the accompanying drawings, which illustrate by way of example, the principles of the described embodiment.

BRIEF DESCRIPTION OF THE DRAWINGS

FIG. 4 shows an example of the cryptography properties view for a module that generates elliptic curve private and public keys.

FIG. 20 is an illustration of the use of two internal memory modules of the while-loop iteration module.

FIG. 33 shows a sample generated internally-created API code for a module that performs the addition of two large integers.

FIG. 35 shows a sample generated code for using the generated internally-created API code of FIG. 33.

FIG. 36 shows a sample generated code for the external input source modules of FIG. 34.

FIG. 38 shows a sample generated code for the cryptosystem in FIG. 37.

FIG. 39 shows a sample generated code for the external input source modules in FIG.

DETAILED DESCRIPTION OF THE INVENTION

The following discussion of the embodiment and aspects directed to a computer program product and a method for the design, simulation, and code generation for cryptography, and is in no way intended to limit the embodiment and aspects.

A cryptographic algorithm is a sequence of steps comprising one or more cryptographic primitives to achieve desired security objectives. In the cryptographic algorithm, the output of one cryptographic primitive may serve as an input to another cryptographic primitive. The cryptographic algorithm may also include large-integer arithmetic operations.

A cryptographic protocol involves one or more cryptographic algorithms for use by a party of two or more entities.

A user of cryptography may design and develop any of cryptographic primitives, schemes, algorithms, and protocols.

Due to various terminologies used in describing the use of cryptography, the term "cryptosystem" will be used to refer to the collection of and interactions within one or any combination of cryptographic primitives, schemes, algorithms, protocols, large-integer arithmetic operations, and any mechanism that involves cryptography. Thus, the user of cryptography may design the cryptosystem to serve one or more cybersecurity objectives. The term "cryptographic operation" will be used to refer to any operation that involves the use of one or any combination of cryptographic primitives, schemes, algorithms, protocols, and large-integer arithmetic operations. The interactions inside the cryptosystem may define one or more operational flows due to the use of conditional operations. Those of ordinary skills in the art will recognize the if-else selection statement and the while-loop iteration statement as examples of conditional operations in programming languages. For example, the cryptosystem may be designed to have a sequence of actions performed by cryptographic primitives, where these actions may be split into two operational flows: (1) the first operational flow includes a first subset of these actions that will be executed under a first condition, and (2) the second operational flow includes a second subset of these actions that will be executed under a second condition, where the first and the second conditions are determined by the if-else selection statement.

The embodiment and aspects will now be described with reference to the accompanying Figures.

Figure 1A:
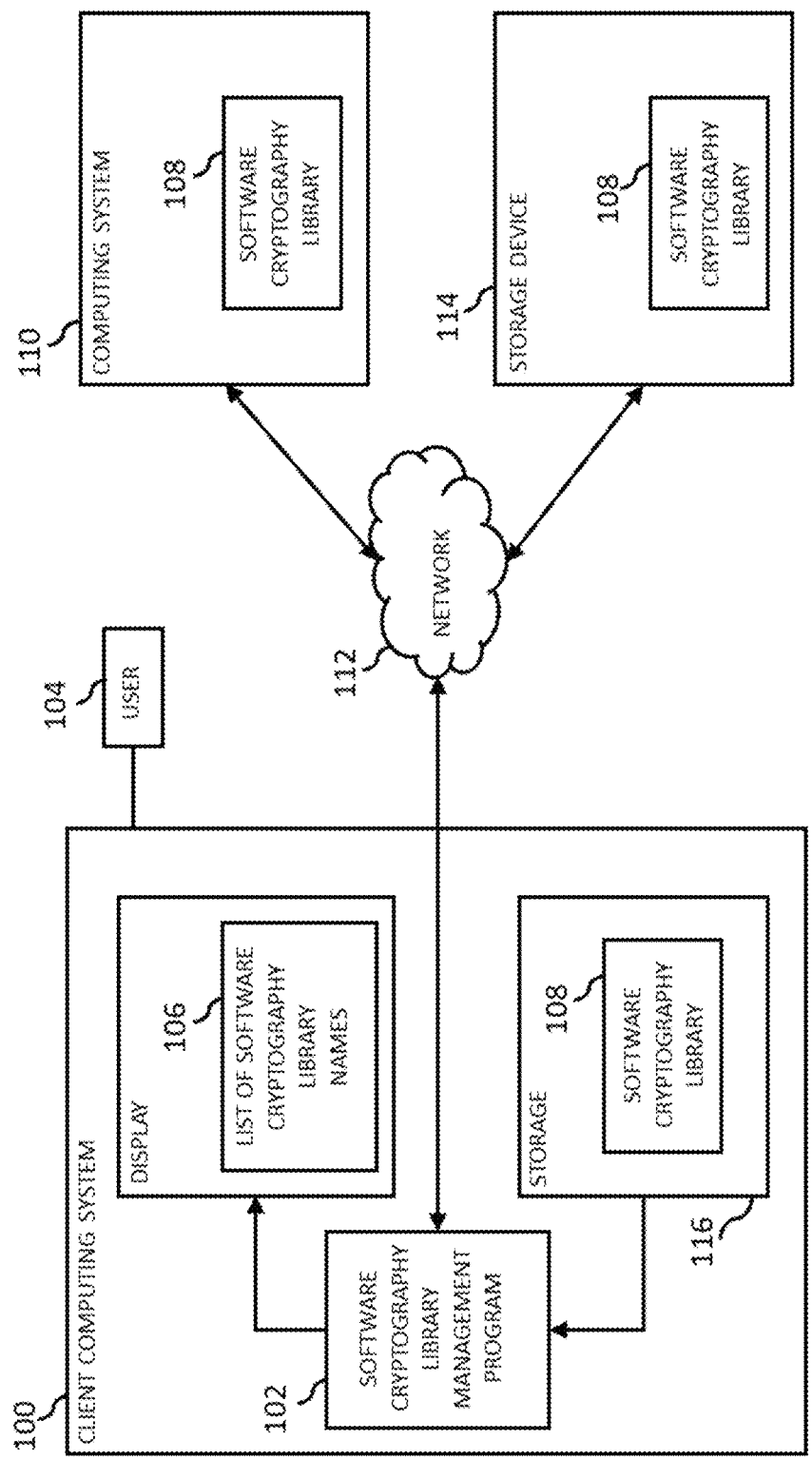
FIG. 1A is an illustration of an example of the embodiment with the software cryptography library management program component, and the possible locations of a software cryptography library.

In an example embodiment, FIG. 1A shows a client computing system 100 which may include a software cryptography library management program 102. Software cryptography library management program 102 may be a program or a subroutine contained in a program. Client computing system 100 may be a laptop computer, a desktop computer, a server, a tablet, a smartphone, or any other electronic device or computing system capable of displaying to the user 104 a list 106 of names of software cryptography libraries that may be identifiable by user 104, and that may be supported by software cryptography library management program 102.

A software cryptography library is a packaged collection of routines (also known as methods, procedures or functions in programming languages) that implement functional behaviors of cryptographic primitives, schemes, algorithms, protocols, mechanisms, and any operation that depends on cryptography. The code of the software cryptography library may be written in a programming language. These routines are called via Application Programming Interfaces (API)s. An API is the external interface to the routines inside the software cryptography library. The API may define the purpose and the functional behavior the API represents, how to make a call to the API, and the format of data to be passed through the API. For example, in "C" programming language the API is called using a C's programming-language function call. When the computer program product uses the software cryptography library to call a certain API, it makes use of the routines associated with this certain API without having to implement these routines.

Those who are skilled in the art will recognize that a software library, in general, can be linked at different lifecycle phases in the computer program product. If the code of the software library is linked and accessed while building the computer program product, then the software library is referred to as a static library. If the code of the software library is built independently of the computer program product, and the computer program product links to the independently-built software library during the execution of the computer program product, then the software library is referred to as a dynamic library. Linking to the dynamic library is also referred to as loading the library. For example, in "C" programming language, the dynamic library may be loaded using LoadLibrary( ) function, and providing the name of the dynamic library to this LoadLibrary( ) function.

In the example embodiment, the software cryptography library may be a static library, a dynamic library, or an executable, and it may be linked or loaded at any lifecycle phase of the computer program product. The software cryptography library may be provided by the user, by the operating system of the client computing system, or by the operating system of other computing devices. Loading the software cryptography library will be referred to as accessing and calling the APIs in the software cryptography library.

User 104 may select one of the identifiable names from list 106 and then may provide a location where software cryptography library 108 resides. The location where software cryptography library 108 resides may be in: (1) another computing system 110 across a network 112, (2) a storage device 114 across network 112, or (3) may be in a local storage device 116 within client computing system 100. Client computing system 100, or any other electronic device or computing system, may have one or both of the following additional capabilities of: (1) receiving software cryptography library file 108 from computing system 110 over network 112, from storage device 114 over network 112, or from local storage device 116, and (2) communicating over network 112 with software cryptography library 108 in computing system 110 or in storage device 114. Software cryptography library management program 102 receives software cryptography library 108 from computing system 110 over network 112, from storage device 114 over network 112, or from client computing system 100 where software cryptography library resides in local storage device 116. The storage device is a tangible computer readable storage medium (or media) such as, but not limited to, read-only memory (ROM), hard disk drive, solid state drive, optical storage devices (e.g. CD ROM, DVD), erasable programmable read-only memory (e.g. Flash memory), random-access memory (RAM), memory stick, or any other computer-readable storage media that is capable of storing digital information or program instructions. The computer readable storage medium is not to be construed as being transitory signals per se.

Figure 1B:
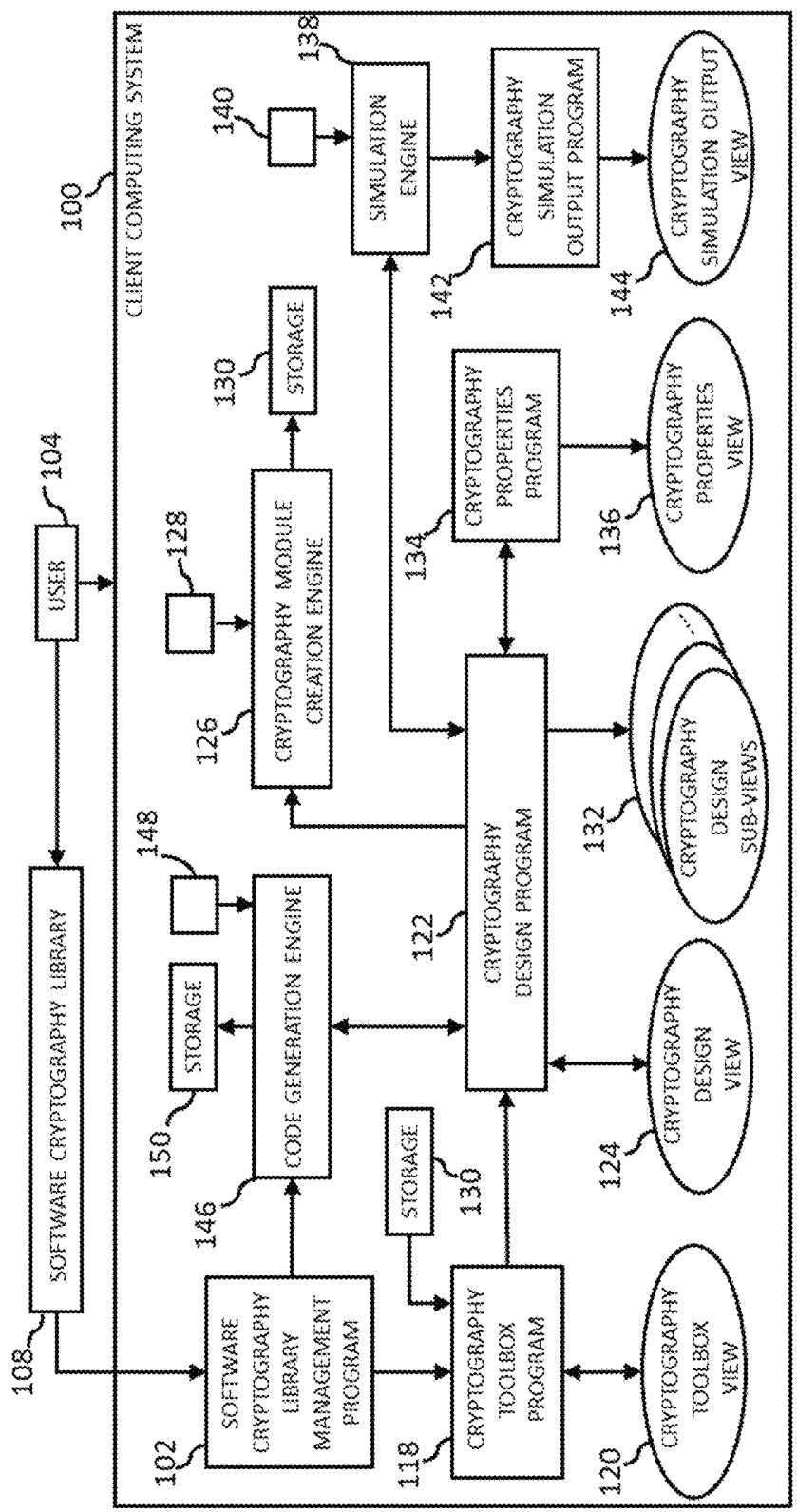
FIG. 1B is an illustration of the components of the example of the embodiment.

FIG. 1B shows the components of the embodiment example where user 104 provides software cryptography library 108 to software cryptography library management program 102. The following is an overview of each component in FIG. 1B. Based on the provided software cryptography library, a cryptography toolbox program 118 displays to user 104 in a cryptography toolbox view 120 a list of cryptographic operation modules. A cryptographic operation module is a graphical shape presentation of a cryptographic operation. Each cryptographic operation module performs an operation using one or more of the APIs from software cryptography library 108. The number of displayed cryptographic operation modules may depend on the capability of software cryptography library 108. For example, assuming a hypothetical software cryptography library that implements five cryptographic primitives, and thus cryptography toolbox program 118 may display five cryptographic operation modules in cryptography toolbox view 120, each representing one of the five cryptographic primitives. However, if any of these five cryptographic primitives is not supported by cryptography toolbox program 118, then cryptography toolbox program 118 will not display the cryptographic operation module that represents the unsupported cryptographic primitive.

A cryptography design program 122 may receive from cryptography toolbox program 118 one or more selected cryptographic operation modules from cryptography toolbox view 120. Cryptography design program 122 may be a program, or a subroutine contained in a program. Each of the selected cryptographic operation modules is selected by user 104 using a Graphical User Interface (GUI). The GUI allows user 104 to interact with the components of the embodiment through graphical buttons, radio buttons, menus, combo boxes, or the like, using a pointing device, such as a mouse, or a keyboard. The GUI also includes the use of the pointing device, such as the mouse, or the keyboard to select objects, to move objects, and to draw objects. Cryptography design program 122 places each of the selected cryptographic operation modules in a drawing area in a cryptography design view 124. The position, where each of the selected cryptographic operation modules is placed, is determined by user 104 using the GUI. For example, user 104 may drag each of the selected cryptographic operation modules using the mouse from cryptography toolbox view 120 and then drops each of the selected cryptographic operation modules into cryptography design view 124. When user 104 drags each of the selected cryptographic operation modules, cryptography toolbox program 118 makes a copy of each of the selected cryptographic operation modules, and the copied object is sent to cryptography design program 122. When user 104 drops each of the selected cryptographic operation modules into cryptography design view 124, cryptography design program 122 pastes the copied object into cryptography design view 124 at the drop position. The drawing area in cryptography design view 124 may be used by user 104 for the design of the cryptosystem. User 104 drops the selected cryptographic operation modules from cryptographic toolbox view 120 into the drawing area of cryptography design view 124, and then graphically connects between these dropped cryptographic operation modules using the GUI. A graphical connection may be a sequence of graphical line segments that represents the flow of data from one dropped cryptographic operation module to another dropped cryptographic operation module. The interconnected cryptographic operation modules in the drawing area of cryptographic design view 124 represents the user's desired design of the cryptosystem.

A cryptography module creation engine 126 may request the contents of the drawing area of cryptography design view 124 if user 104 starts the operation of cryptography module creation engine 126 using a button 128 via the GUI. Cryptography module creation engine 126 may be a program, or a subroutine contained in a program. As a result, cryptography design program 122 sends the contents to cryptography module creation engine 128, which in turn creates and stores a new cryptographic operation module in a storage 130. This new cryptography operation module is referred to as user-created cryptographic operation module. This user-created cryptographic operation module is a graphical shape presentation of the contents of cryptography design view 124 from which cryptography module creation module 126 has created. This user-created cryptographic operation module performs the operations of the contents of cryptography design view 124 from which cryptography module creation module 126 has created. Thus, cryptography module creation engine 126 allows a collection of cryptographic operation modules to be represented by a single user-created cryptographic operation module. This user-created cryptographic operation module may be displayed in cryptography toolbox view 120 by cryptography toolbox program 118, which retrieves this user-created cryptographic operation module from storage 130. When cryptography design program 122 receives the user-created cryptographic operation module from cryptography toolbox program 118, cryptograph design program 122 may display the contents of this user-created cryptographic operation module in one of cryptography design sub-views 132. Each user-created cryptographic operation module may be displayed in one cryptography design sub-view.

When user 104 clicks on a cryptographic operation module in either cryptography design view 124 or one of cryptography design sub-views 132 via the graphical user interface, cryptography design program 122 informs a cryptography properties program 134 about the clicked cryptographic operation module. Cryptography properties program 134 may be a program, or a subroutine contained in a program. Based on the clicked cryptographic operation module, cryptography properties program 134 may assign the clicked cryptographic operation module to a set of data fields, such as data-entry and data-selection fields, and then may display these fields in a cryptography properties view 136. Cryptography properties program 134 assigns a unique set of data fields for each module in cryptography toolbox view 120. User 104 may provide data in data-entry fields, and may select options from data-selection fields. The contents of the data-entry fields and the selections of the data-selection fields define the functional behavior of the clicked cryptographic operation module.

A simulation engine 138 may access the contents of the drawing area of cryptography design view 124 and cryptography design sub-views 132 if user 104 starts the operation of simulation engine 138 using a button 140 via the GUI. Simulation engine 138 may be a program, or a subroutine contained in a program. In addition, simulation engine 138 may access, via cryptography design program 122, the data fields from cryptography properties program 134 for each cryptographic operation module in cryptography design view 124 and cryptography design sub-views 132. Simulation engine 138 in turn executes one or more of cryptographic operation modules in cryptography design view 124 and cryptography design sub-views 132 using the APIs from software cryptography library 108 and the contents of the data fields from cryptography properties program 134. A cryptography simulation output program 142 may receive the execution results from simulation engine 138, and then displays the execution results in a cryptography simulation output view 144. Cryptography simulation output program 142 may be a program, or a subroutine contained in a program.

A code generation engine 146 may access the contents of the drawing area of cryptography design view 124 and cryptography design sub-views 132 if user 104 starts the operation of code generation engine 146 using a button 148 via the GUI, Code generation engine 146 may be a program, or a subroutine contained in a program. In addition, code generation engine 146 may access, via cryptography design program 122, the data fields from cryptography properties program 134 for each cryptographic operation module in cryptography design view 124 and cryptography design sub-views 132. Code generation engine 146 in turn generates code for one or more of cryptographic operation modules in cryptography design view 124 and cryptography design sub-views 132 using the APIs from software cryptography library 108 and the contents of the data fields from cryptography properties program 134. The generated code may be in the same programming language of software cryptography library 108. The generated code may be stored in a storage 150.

Cryptography Toolbox View, Design View, and Properties View

Cryptography toolbox view 120 may display a number of cryptographic operation modules. Cryptographic operation modules comprise standard and well-known cryptographic primitives, large-integer arithmetic, elliptic curve point arithmetic, polynomial based arithmetic over a binary filed, digital certificate, and user-created cryptographic operations. Those of ordinary skill in the art will recognize the following examples of standard and well-known cryptographic primitives: Advanced Encryption Standard (AES) encryption/decryption primitives, Rivest-Shamir-Adleman (RSA) encryption/decryption/signature generation/signature validation primitives, Elliptic-Curve signature generation/ signature validation primitives, Diffie-Hellman key agreement primitive, Elliptic-Curve Diffie-Hellman key agreement primitive, and Keyed Hash Message Authentication Code (HMAC) primitive to name a few examples. Cryptography toolbox program 118 may further display to user 104 in cryptography toolbox view 120 a list of non-cryptographic operation modules to support the operations of cryptographic operation modules. The non-cryptographic operation modules comprise an external input source module, an external output destination module, a no-connection module, a memory module, an if-else selection module, a while-loop iteration module, a break module, and a continue module. The term "module" may be used to refer to any of cryptographic operation modules and non-cryptographic operation modules displayed in the cryptography toolbox view 120.

Cryptography design program 122 may receive from cryptography toolbox program 118 one or more selected non-cryptographic operation modules from cryptography toolbox view 120. Each of the selected non-cryptographic operation modules is selected by user 104 using the GUI. Cryptography design program 122 places each of the selected non-cryptographic operation modules in the drawing area in cryptography design view 124. The position, where each of the selected non-cryptographic operation modules is placed, is determined by user 104 using the GUI. For example, user 104 may drag each of the selected non-cryptographic operation modules using the mouse from cryptography toolbox view 120 and then drops each of the selected non-cryptographic operation modules into cryptography design view 124. When user 104 drags each of the selected non-cryptographic operation modules, cryptography toolbox program 118 makes a copy of each of the selected non-cryptographic operation modules, and the copied object is sent to cryptography design program 122. When user 104 drops each of the selected non-cryptographic operation modules into cryptography design view 124, cryptography design program 122 pastes the copied object into cryptography design view 124 at the drop position. User 104 drops the selected non-cryptographic operation modules from cryptographic toolbox view 120 into the drawing area of cryptography design view 124, and then graphically connects between dropped cryptographic operation modules and non-cryptographic operation modules using the GUI.

Figure 2:
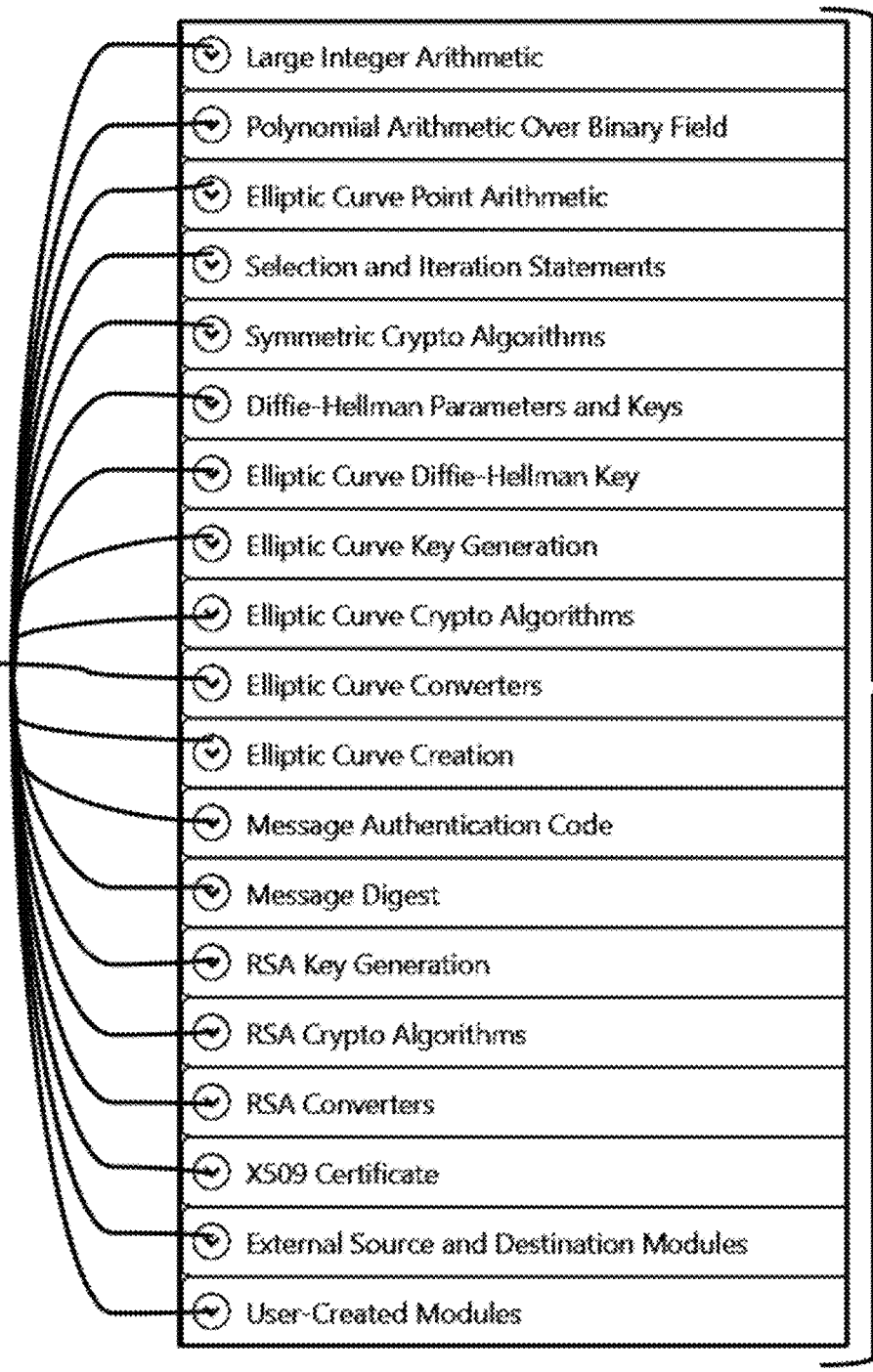
FIG. 2 shows the cryptography toolbox view that comprises a plurality of modules organized into groups.
Figure 3:
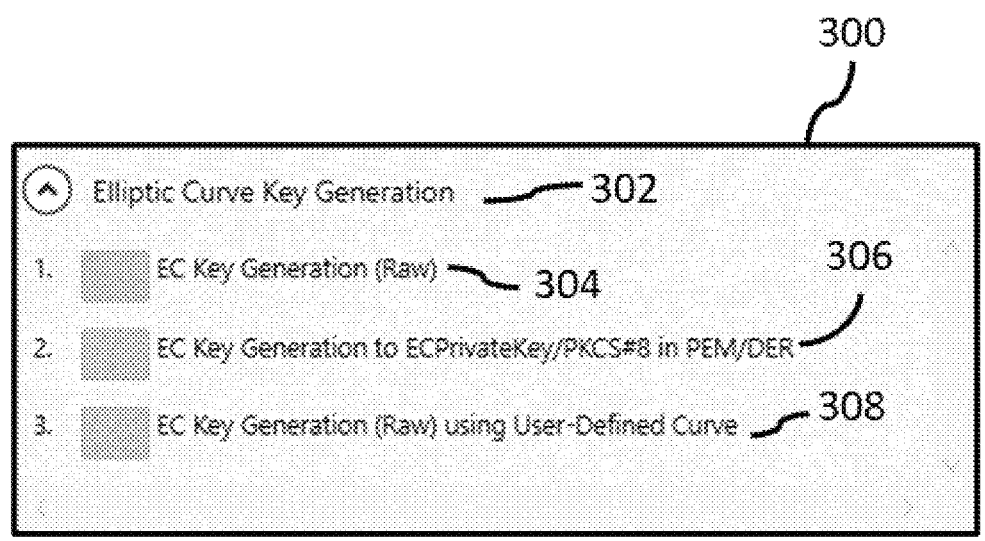
FIG. 3 shows an expanded view of one of the groups in the cryptography toolbox view, and the group contains three modules.

As depicted in FIG. 2, the cryptography toolbox view is organized into groups 200. Each group represents a set of related cryptographic operation modules or a set of non-cryptographic operation modules. Each group has a name or a title 202 that identifies the intended operation of the group. When the user clicks on a group, the group is expanded to view one or more of its cryptographic operation modules or non-cryptographic operation modules from which the user selects. FIG. 3 shows an expanded view of group 300 with title "Elliptic Curve Key Generation" 302. Group 300 has three cryptographic operation modules 304, 306, and 308.

The user selects any module under any group in the cryptography toolbox view using the pointing device, such as the mouse, drags the selected module out of the cryptography toolbox view by holding down the left button of the mouse on the selected module and moving the mouse over the cryptography design view, and then drops the selected module into the cryptography design view by releasing the left button of the mouse. When the user initiates the drag operation out of the cryptography toolbox view, the cryptography toolbox program makes a copy of the selected module and the copied version of the selected module is moved when the user moves the mouse over to the cryptography design view. When the user drops the selected module into the cryptography design view, the cryptography design program pastes the copied version of the selected module into the drawing area of the cryptography design view.

Each module from the cryptography toolbox view may have properties that define the module's functional behavior. The functional behavior may comprise a mode of operation, the availability of one or more parameters, the dependency on other cryptographic primitives, and the structure and format of the produced output. Each module is assigned by the cryptography properties program a unique cryptography properties view that displays the module's properties. When the module is in the cryptography design view or sub-views and the user selects this module via the graphical user interface, the cryptography properties view of the selected module is displayed in the cryptography properties view via the cryptography properties program. When the cryptography properties view is displayed to the user, the user may specify or select all or a subset of these properties to define the selected functional behavior for the selected module, and the cryptography properties program receives the selected functional behavior for the selected module for use by the simulation engine or the code generation engine as indicated earlier. The selected functional behavior may be selected from one or more functional behaviors. FIG. 4 is an example of the cryptography properties view for an Elliptic Curve Key Generation module.

In general, the cryptographic properties view comprises one or more fields. A field may comprise one or more sub-fields. The field or the sub-field may also provide none, one or more options from which the user selects. For example, the field of a block of text, which has no options, that describes the purpose of the selected module or provides helpful tips on the use of the selected module.

The option in the field or the sub-field may specify how the selected module performs its computation and produces output, may specify the source from which the selected module gets one or more of its inputs, or may accept input text from the user.

The field or the sub-field may be in either an active state or an inactive state. An inactive area on a graphical view is usually referred to as "grayed out". One or more fields may remain in the active state and never changes to the inactive state. One or more fields or sub-fields may change states between the active and inactive states. An active field or an active sub-field allows the user to view and select one of the active field's options or the active sub-field's options. An inactive field or an inactive sub-field does not allow the user to view and select one of the inactive field's options or the inactive sub-field's options. The state of the inactive field or the inactive sub-field changes to the active state when the user selects an option from another active field or active sub-field, and the selected option allows the inactive field or the inactive sub-field to change its state to the active state. The state of the active field or the active sub-field changes to the inactive state when the user selects an option from another active field, and the selected option allows the former active field or active sub-field to change its state to the inactive state. The state of each field and sub-field and the options the user selects are maintained while the selected module remains in the drawing area in the cryptography design view.

The example in FIG. 4 is for illustration purpose, and each module has its own cryptography properties view. Those skilled in the art will recognize the terminologies and abbreviations throughout FIG. 4. Cryptographic properties view 400 is for a cryptographic operation module that generates an elliptic curve private-public key pair, and provides the key pair in either Privacy Enhanced Mode (PEM) or Distinguished Encoded Rules (DER) Abstract Syntax Notation One (ASN.1) encoding. Cryptography properties view 400 comprises the following fields, sub-fields, and options. Field 402 contains a brief description of the purpose of this module. Field 404 allows the user to provide a label for this module in a text box 406. This label may be used during simulation and code generation.

Field 408 requires the user to select an elliptic curve name from several options 410 in order for this module to generate the correct key-pair on the selected elliptic curve name. Furthermore, each elliptic curve name comes with a set of elliptic curve parameters, and field 412 allows the user to whether or not include such parameters in the generated output.

Field 414 requires the user to select the structure of the generated output from several options 416. Those skilled in the art of cryptography can recognize the following examples of output structures: "PKCS #8 PrivateKeyInfo Structure", "PKCS #8 Encrypted PrivateKeyInfo Structure", and "ECPrivateKey Structure", where PKCS #8 is the Public Key Cryptography Standard, publication number 8. Field 418 requires the user to select the output format from options 420, such as PEM or DER encoding.

Fields, sub-fields, and options 422-452 remain in the inactive state (i.e. grayed out) if the user does not select "PKCS #8 Encrypted PrivateKeyInfo Structure" from options 416. When the user selects "PKCS #8 Encrypted PrivateKeyInfo Structure" from options 416, field 422 and field 428 become active allowing the user to select between field 422 and field 428. When the user selects field 422, its sub-field 424 and options 426 become active while sub-field 430, options 432, sub-field 434, and options 436 of field 428 become inactive. When the user selects field 428, its sub-field 430, options 432, sub-field 434, and options 436 become active while sub-field 424 and options 426 of field 422 become inactive, Those skilled in the art of cryptography may recognize fields 422-436 that allow the user to select an encryption operation from options 426 or from options 432, and a key-derivation function (KDF) from options 436 in order for this module to encrypt the generated elliptic-curve key pair using the selected functions.

When the user selects "PKCS #8 Encrypted PrivateKeyInfo Structure" from options 416, fields 438-452 become active. Field 438 allows the user to provide a numeric input in text box 440. This numeric input may be used by the selected encryption from options 426 or options 432. Field 442 provides a block of text as a helpful tip on how to use field 438. When the user selects field 444, its sub-field 448 and text box 450 become active. When the user selects field 452, sub-field 448 and text box 450 of field 444 become inactive. Fields 444 and 452 provide the user an option to specify the source from which this module gets a random data, which may be used during the encryption of the generated key pair. Sub-field 446 provides a block of text as a helpful tip on how to use sub-field 448. Sub-field 448 allows the user to enter another numerical value in text box 450 for the desired length of the random data that will be generated by this module. Field 452 allows this module to get the random data from a dedicated input port of this module. Finally, data-selection field 454 allows the user to select whether or not to display the generated output of this module to the cryptography simulation output view.

Thus, the user may be able to define the desired functional behavior, from several available options, via the cryptography properties view of FIG. 4 for the cryptographic operation module that generates an elliptic curve private-public key pair.

Cryptographic Operation Modules

Each cryptographic operation module may have one or more preassigned data ports. Preassigned data ports are the interface to the cryptographic operation module. Data flows into the cryptographic operation module via one or more preassigned input ports. Data flows out of the cryptographic operation module via one or more preassigned output ports. A preassigned input port may take one of two forms: a mandatory input port or a discretionary input port.

On one hand, if the cryptographic operation module has the mandatory input port, then data must be available at the mandatory input port in order for the cryptographic operation module to perform its intended computations. On the other hand, if the cryptographic operation module has the discretionary input port, then data is not required to be available at the discretionary input port. As an example, assume a hypothetical cryptographic operation module having one discretionary input port and one mandatory input port. This one discretionary input port takes a password to protect the contents of data flowing into this one mandatory input port. If the user of this hypothetical cryptographic operation module does not want to protect the data flowing into the mandatory port, then the user is not required to provide a password via the discretionary input port.

Figure 5:
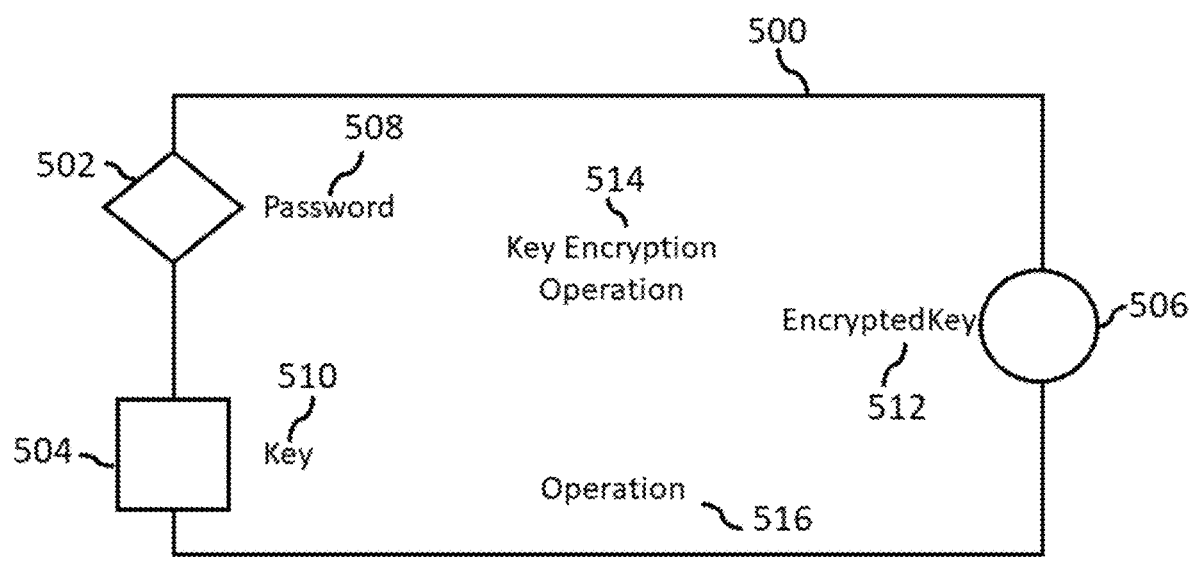
FIG. 5 is an illustration of a graphical representation of a module having one discretionary input port, one mandatory input port, and one output port.

FIG. 5 shows an example of a graphical representation of cryptographic operation module 500 having discretionary input port 502, mandatory input port 504, and one output port 506, Discretionary input port 502, mandatory input port 504, and output port 506 may be differentiated visually among each other for the user to recognize each port, where each port has a graphical shape that overlays cryptographic operation module 500. These ports can be located anywhere on the perimeter of cryptographic operation module 500. Each graphical shape may be different than illustrated in FIG. 5.

Each data port of the cryptographic operation module has a preassigned name. The preassigned name of the data port is used as a guidance to the user of the cryptographic operation module on the type of data that is needed or generated by the cryptographic operation module. As shown in FIG. 5, discretionary input port 502 has preassigned name "Password" 508 to indicate to the user that a password may be provided via this port. Mandatory input port 504 has preassigned name "Key" 510 to indicate to the user that a key data is needed via this port in order for cryptographic operation module 500 to correctly perform its operation. Output port 506 has preassigned name "EncryptedKey" 512 to indicate to the user that an encrypted key is available by cryptographic operation module 500 via output port 506. The names "Password", "Key", and "EncryptedKey" are examples for illustration purpose.

Furthermore, cryptographic operation module 500 may have two labels as shown in FIG. 5. Label 514 may be used as a descriptive title of cryptographic operation module 500. For example, label 514 describes the operation of module 500 to be "Key Encryption Operation". Label 516 may be used as a module identification of cryptographic operation module 500 during simulation and code generation. For example, label 516 is named "Operation", which may appear to the user during simulation and code generation. Label 516 may be provided by the user using the cryptography properties view of module 500, For example, the module identification entered by the user in text box 406 in FIG. 4 will be displayed on the Elliptic Curve Key Generation module. The labels "Key Encryption Operation" and "Operation" in FIG. 5 are examples for illustration purpose. The labels may be positioned anywhere inside cryptographic operation module 500. The number of labels may be different from one cryptographic operation module to another cryptographic operation module.

External Input Source Module

Figure 6:
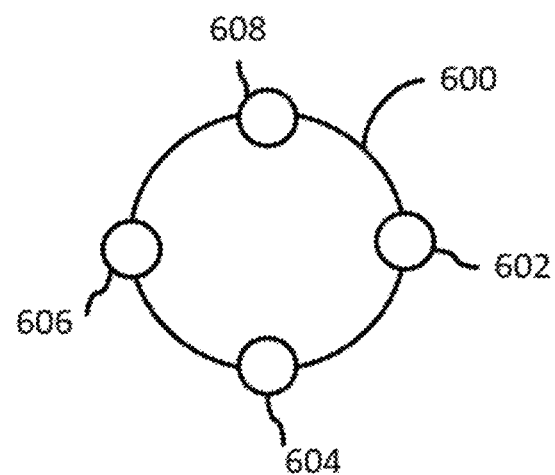
FIG. 6 is an illustration of a graphical representation of the external input source module having four output ports.

Data is provided to the mandatory input port or the discretionary input port of the cryptographic operation module by one of the following two input sources: (1) an output port of another cryptographic operation module, or (2) data provided by the user. When the user provides data to the cryptographic operation module via its mandatory input port or discretionary input port, the user utilizes the external input source module. The external input source module may have one or more output ports. The user provides data to the external input source module via the cryptography properties view of the external input source module, and then the external input source module provides this data via its data output ports to other modules. FIG. 6 shows a graphical representation of external input source module 600 having four output ports 602, 604, 606, and 608. The graphical representation of output ports 602-608 may be located anywhere on the perimeter of external input source module 600. Each graphical shape in FIG. 6 may have a different representation.

Figure 7:
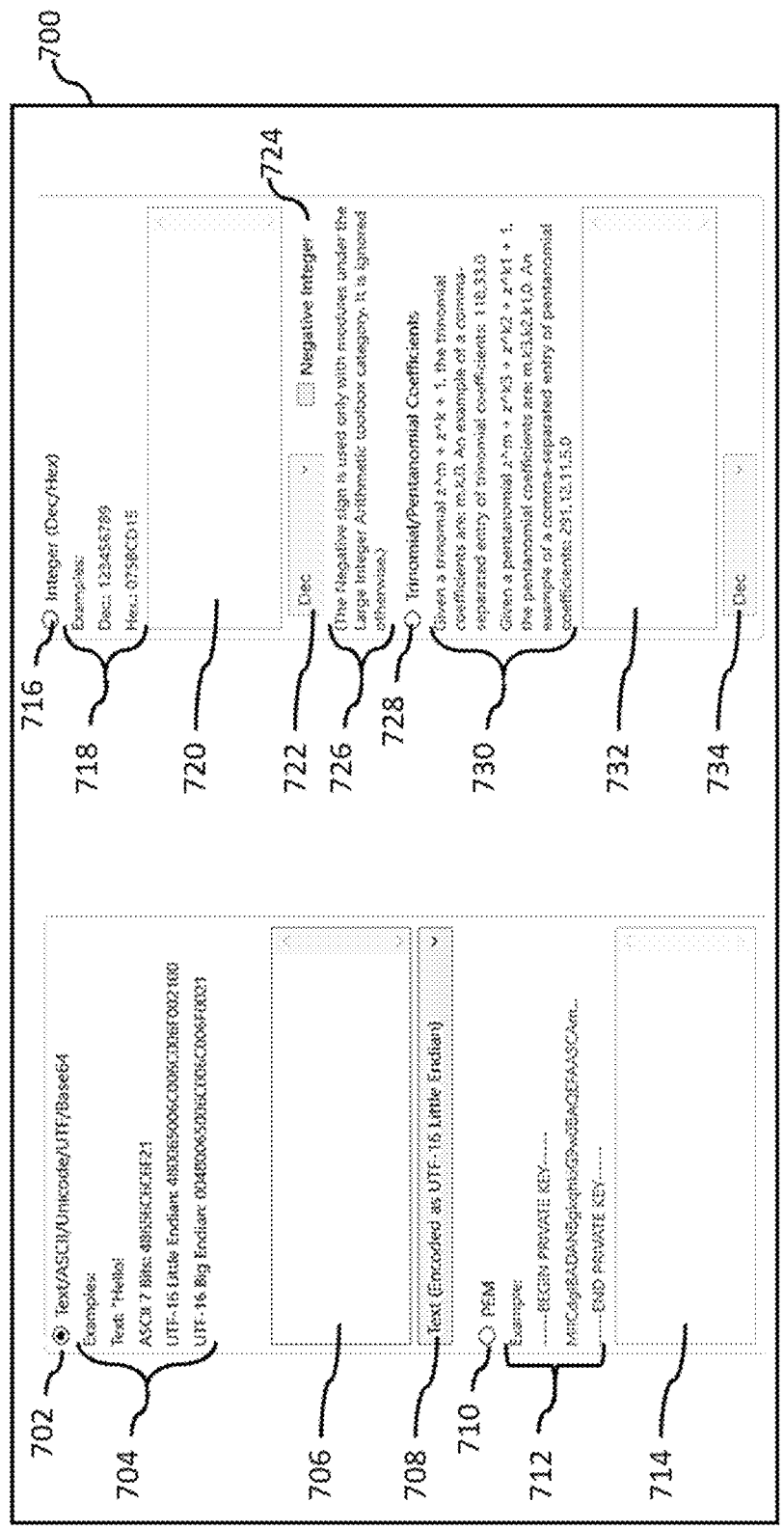
FIG. 7 shows the cryptography properties view of the external input source module.

The external input source module may be available in the cryptography toolbox view, and the user may drag and drop the external input source module into a position in the drawing area of the cryptography design view. The cryptography properties view of the external input source module is displayed to the user when the user selects the external input source module in the drawing area of the cryptography design view. FIG. 7 shows cryptography properties view 700 of the external input source module. Cryptography properties view 700 comprises four data-entry fields 702, 710, 716, and 728 from which the user can select. Selecting one of these four data-entry fields changes the selected field's state, subfields, and options to the active state, and changes the state of the other three data-entry fields, their subfields, and their options to the inactive state. Those skilled in the art will recognize these four data-entry fields that represent a range of data types that may be used in cryptography. Data-entry field 702 represents text data type in ASCII, UNICODE, UTF or Base64 format. Data-entry field 710 represents text data type in PEM format. Data-entry field 716 represents integer numerical data type that can be in decimal or hexadecimal. Data-entry field 728 represents integer numerical data type that represents one or more polynomial coefficients for use in elliptic curve cryptographic operations.

Data-entry field 702 comprises subfield 704 that provides description and helpful tips on how to use data-entry field 702. Data-entry field 702 also comprises a designated area subfield 706 in which the user can enter data. Data-entry field 702 also has a number of format options 708 from which the user can select. When the user selects an option from options 708, and data already exists in designated area 706, the data is converted from its currently displayed format to the newly format that is selected by the user, and the new formatted data replaces the old data and is displayed in designated area 706.

Data-entry field 710 comprises subfield 712 that provides a description on how to use data-entry field 710. Data-entry field 710 also comprises designated area subfield 714 in which the user can enter PEM-formatted data.

Data-entry field 716 comprises subfield 718 that provides a description on how to use data-entry field 716. Data-entry field 716 also comprises designated area subfield 720 in which the user can enter numerical integer data. Data-entry field 716 also comprises options 722 to select between decimal and hexadecimal representation of the numerical integer data, and option 724 to select whether or not the numerical integer data in designated area subfield 720 is a negative number. Subfield 726 provides a description on the use of option 724. When the user selects an option from options 722, and data already exists in designated area subfield 720, the data is converted from its currently displayed format to the newly format that is selected by the user, and the new formatted data replaces the old data and is displayed in designated area subfield 720.

Data-entry field 728 comprises subfield 730 that provides a description on how to use data-entry field 728. Data-entry field 728 also comprises designated area subfield 732 in which the user may enter comma-separated numerical integer data. Data-entry field 728 also comprises options 734 from which the user can select between decimal and hexadecimal representation of the comma-separated numerical integer data. When the user selects an option from options 734, and data already exists in designated area subfield 732, the data is converted from its currently displayed format to the newly format that is selected by the user, and the new formatted data replaces the old data and is displayed in designated area subfield 732.

No-Connection Module

Figure 8:
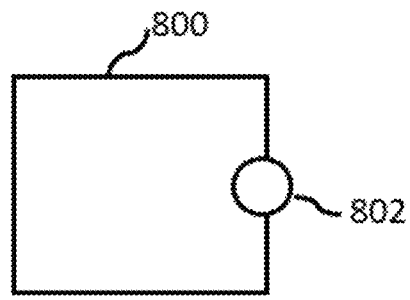
FIG. 8 is an illustration of a graphical representation of the no-connection module having one output port.

When the user chooses not to provide data to the discretionary input port of the cryptographic operation module, the user utilizes the no-connection module. The no-connection module provides a null data. The no-connection module may have one or more data output ports that provide the null data. FIG. 8 shows a graphical representation of no-connection module 800 having one output port 802. The graphical representation of output port 802 may be located anywhere on the perimeter of no-connection module 800. Each graphical shape in FIG. 8 may have a different representation. The no-connection module may be available in the cryptography toolbox view, and the user may drag and drop the no-connection module into a position in the drawing area of the cryptography design view.

External Destination Output Module

Figure 9:
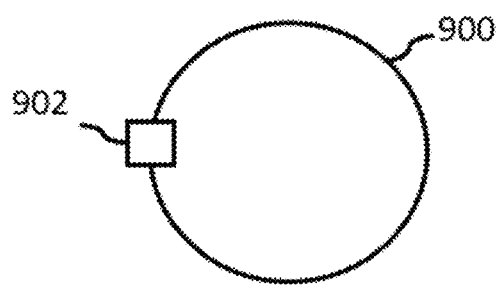
FIG. 9 is an illustration of a graphical representation of the external output destination module having one mandatory input port.

The cryptographic operation module may also send its output to one or more of the following destinations: (1) another cryptographic operation module, (2) the cryptography simulation output view, and (3) a data storage such as a file. When the cryptographic operation module sends its output to the cryptography simulation output view and/or the data storage, the user utilizes the external output destination module. The external output destination module has one mandatory input port that receives data from another module. FIG. 9 shows a graphical representation of external output destination module 900 having one mandatory input port 902. The graphical representation of mandatory input port 902 may be located anywhere on the perimeter of external output destination module 900. Each graphical shape in FIG. 9 may have a different representation. The external output destination module may be available in the cryptography toolbox view, and the user may drag and drop the external output destination module into the drawing area of the cryptography design view.

Connectors

Figure 10:
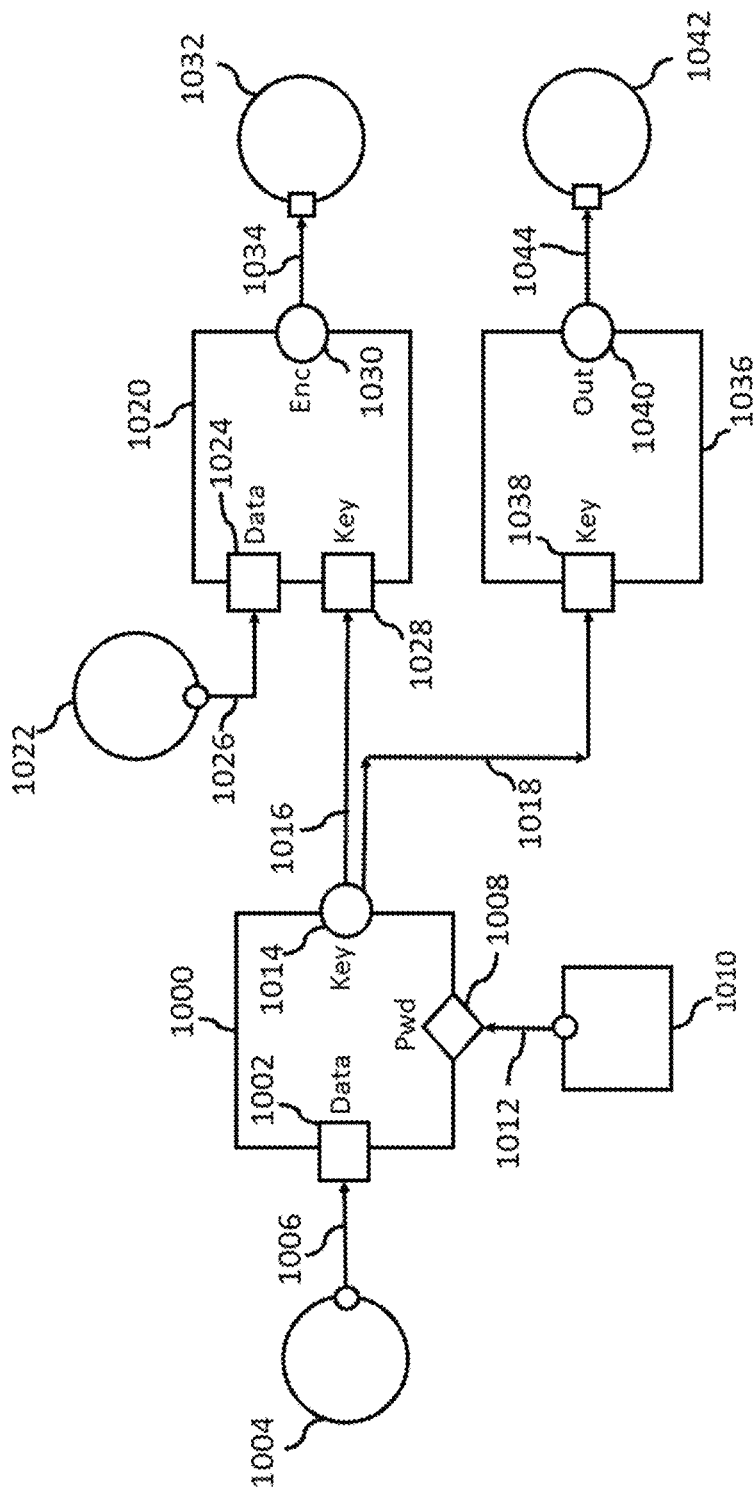
FIG. 10 is an illustration of a cryptosystem comprising three modules, two external input source modules, two external output destination modules, one no-connection module, and connectors.

The interaction with data ports is visually represented by connectors. A connector is a sequence of graphical line segments that form a graphical connection identifying the flow of data from an output port of one module to an input port of another module. An arrow symbol on the connector may be used to indicate the direction of data flow. An input port of one module can be connected to only one output port of another module. The cryptography design program receives and displays the graphical connection when the user draws this graphical connection by using the pointing device, such as the mouse, by pressing and holding the mouse's button on the input port, drag the mouse over the output port, and then release the mouse's button. FIG. 10 shows three cryptographic operation modules 1000, 1020, and 1036. Cryptographic operation module 1000 that has mandatory input port 1002 connected to external input source module 1004 via connector 1006. Cryptographic operation module 1000 also has discretionary input port 1008 connected to no-connection module 1010 via connector 1012. Cryptographic operation module 1000 also has output port 1014 that is connected to cryptographic operation module 1020 via connector 1016, and to cryptographic operation module 1036 via connector 1018. Cryptographic operation module 1020 receives data from two different input sources: (1) external input source module 1022 is connected to mandatory input port 1024 via connector 1026, and (2) cryptographic operation module 1000 connected to mandatory input port 1028 via connector 1016. Cryptographic operation module 1020 also has output port 1030 connected to external output destination module 1032 via connector 1034. Finally, cryptographic operation module 1036 has mandatory input port 1038 connected to cryptographic operation module 1000 via connector 1018. Cryptographic operation module 1036 also has output port 1040 connected to external output destination module 1042 via connector 1044.

FIG. 10 is an example of the cryptosystem that contains three cryptographic operation modules 1000, 1020 and 1036, two external input source modules 1004 and 1022, two external output destination modules 1032 and 1042, and one no-connection module 1010.

User-Created Cryptographic Operation Modules

The embodiment includes the cryptography module creation engine that allows the user to create a new module from the cryptosystem in the drawing area of the cryptography design view. The new module is referred to as "user-created cryptographic operation" module. The user-created cryptographic operation module may be stored in a storage device and may be available to the user in the cryptography toolbox view under a group that is assigned to hold one or more user-created cryptographic operations modules. The user may drag and drop the user-created cryptographic operation module into the drawing area of the cryptography design view. The operation of the cryptography module creation engine may be started by receiving a command from the user, such as clicking on a button via the GUI.

The user-created cryptographic operation module may have one or more data ports. The cryptography module creation engine generates, maps, and assigns names to the input ports of the user-created cryptographic operation module from each input port, which is connected to the external input source module, in the cryptosystem from which the cryptography creation module engine has created. The mapping operation also includes determining whether each of the input ports of the user-created cryptographic operation module is either of the mandatory input port type or the discretionary input port type. If the input port in the cryptosystem is of the mandatory input port type, then the mapped input port of the user-created cryptographic operation module is of the mandatory input port type. If the input port in the cryptosystem is of the discretionary input port type, then the mapped input port of the user-created cryptographic operation module is of the discretionary input port type.

The cryptography module creation engine generates, maps, and assigns names to the output ports of the user-created cryptographic operation module from each output port, which is connected to the external output destination module, or left unconnected, in the cryptosystem from which the cryptography creation module engine has created.

Figure 11A:
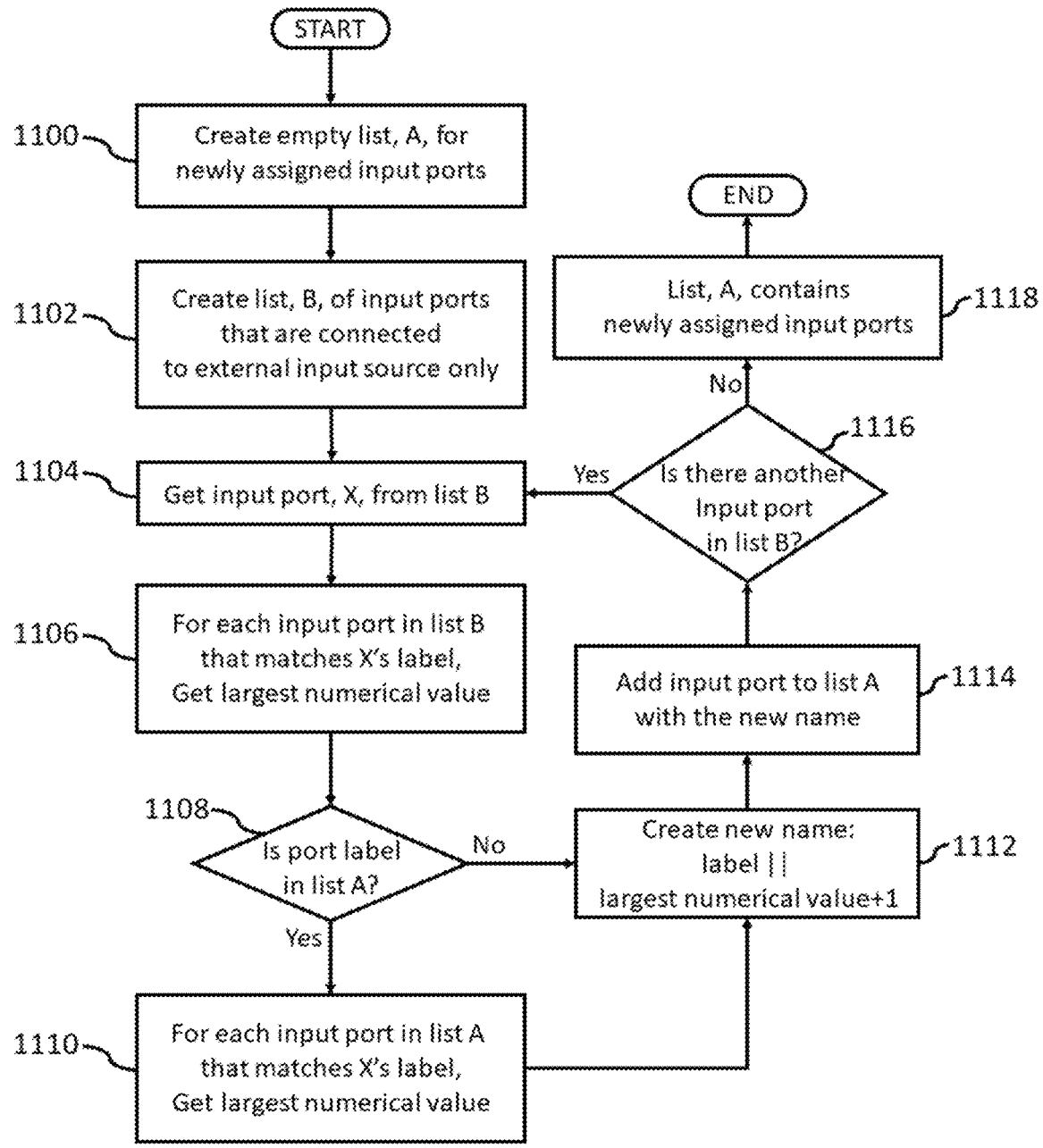
FIG. 11A is a flowchart for creating input ports for a user-created cryptographic operation module.

FIG. 11A shows a flowchart of steps the cryptography module creation engine performs to generate input ports, create a mapping for each input port, and assign a name to each input port for the user-created cryptographic operation module of the cryptosystem from which the cryptography module creation engine has created. The name of the input port of the user-created cryptographic operation is generated by the concatenation of a text label followed by a numerical value. The text label is retrieved from the name of the internal input port to which the user-created cryptographic operation's input port is mapped. The numerical value uniquely identifies each input port of the user-created cryptographic operation module.

As shown in FIG. 11A, the cryptography module creation engine creates an empty list of the names of input ports of the user-created cryptographic operation module and their mapping ports (step 1100). For the purpose of describing the flowchart in FIG. 11A, this empty list is referred to as list "A". List "A" will be filled during the execution of the steps in FIG. 11A. The cryptography module creation engine also creates (step 1102) another list of all input ports, where an input port is connected to the external input source module, for all modules in the cryptosystem. For the purpose of describing the flowchart in FIG. 11A, this another list is referred to as list "B". One or more of the names of input ports in list "B" may already have a numerical value. From list "B", the cryptography module creation engine gets the next available input port (step 1104), which may happen to be the first one in list "B". For the purpose of describing the flowchart in FIG. 11A, let this next available input port be referred to as input port "X". Thus, the cryptography module creation engine finds the largest numerical value (step 1106) among all input ports in list "B" whose label matches the label of the input port "X". Furthermore, the cryptography module creation engine determines whether or not the label of input port "X" exists in list "A" (step 1108). If the label of input port "X" exists in list "A", then the cryptography module creation engine finds the largest numerical value (step 1110) among all input ports in list "A" whose label matches the label of input port "X". Whether or not the label of input port "X" exists in list "A", the cryptography module creation engine creates a new input port's name by concatenating (step 1112) the label of input port "X" with an increment of the largest numerical value that is obtained from either step 1106 or step 1110. The cryptography module creation engine adds the newly created input port's name and its mapping input port name (the name of input port "X") to list "A" (step 1114). Finally, the cryptography module creation engine determines if there is another input port in list "B" (step 1116) that needs to be processed. If there is another input port in list "B", then the cryptography module creation engine repeats the steps starting from step 1104. If all input ports in list "B" are processed, then list "A" contains all input ports of the user-created cryptographic operation module that have assigned and mapped names (step 1118).

Figure 11B:
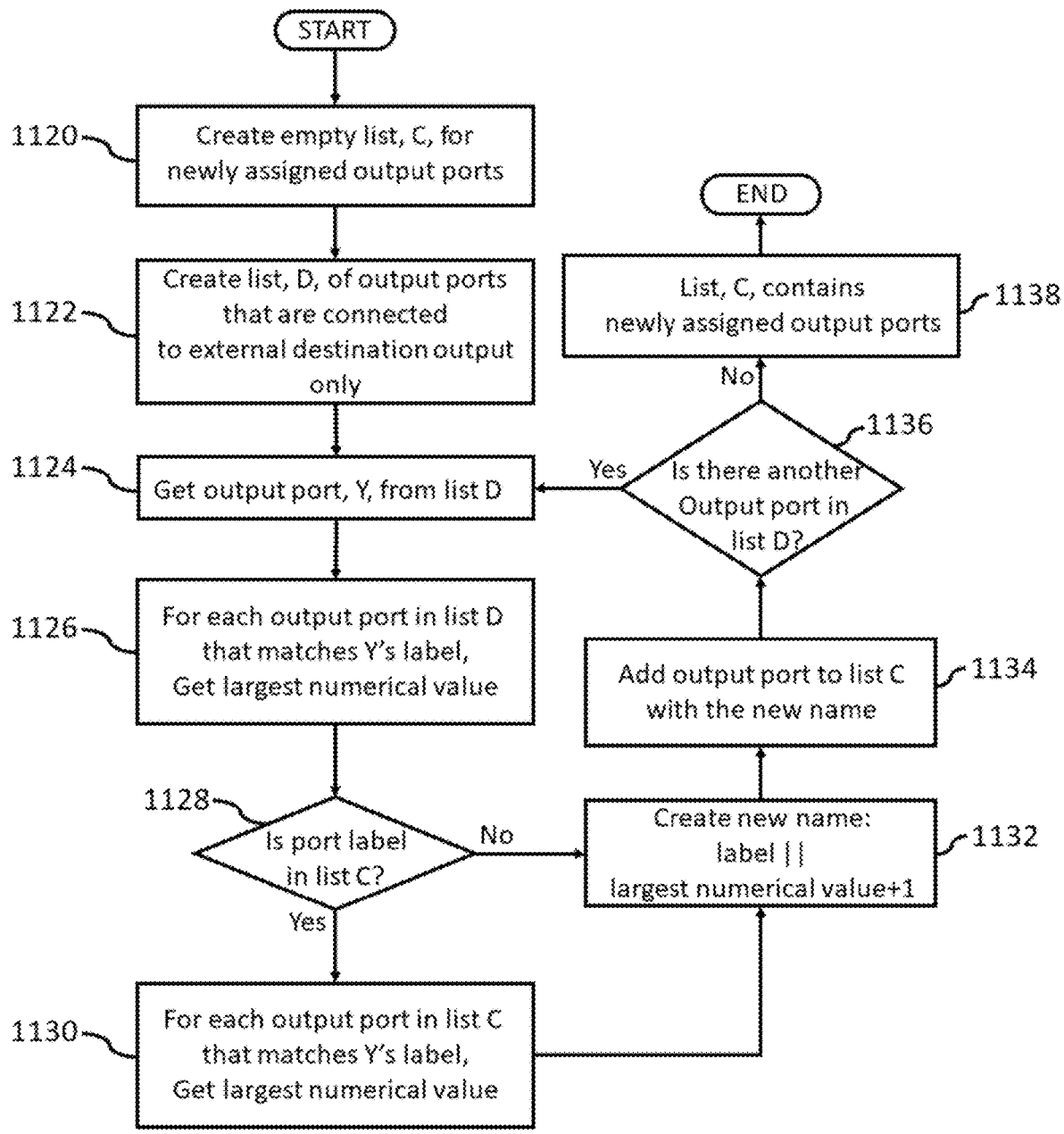
FIG. 11B is a flowchart for creating output ports for the user-created cryptographic operation module.

FIG. 11B shows a flowchart of steps the cryptography module creation engine performs to generate output ports, create a mapping for each output port, and assign a name to each output port for the user-created cryptographic operation module of the cryptosystem from which the cryptography module creation engine has created. The cryptography module creation engine creates an empty list of the names of output ports of the user-created cryptographic operation module (step 1120). For the purpose of describing the flowchart in FIG. 11B, this empty list is referred to as list "C". List "C" will be filled during the execution of the steps in FIG. 11B. The cryptography module creation engine also creates (step 1122) another list of all output ports, where an output port may be connected to the external output destination module, for all modules in the cryptosystem. The output port may also be left unconnected. For the purpose of describing the flowchart in FIG. 11B, this another list is referred to as list "D". The names of output ports in list "D" may already have a numerical value. From list "D", the cryptography module creation engine gets the next available output port (step 1124), which may happen to be the first one in list "D". For the purpose of describing the flowchart in FIG. 11B, let this next available output port be referred to as output port "Y". Thus, the cryptography module creation engine finds the largest numerical value (step 1126) among all output ports in list "D" whose label matches the label of output port "Y". Furthermore, the cryptography module creation engine determines whether or not the label of output port "Y" exists in list "C" (step 1128). If the label of output port "Y" exists in list "C", then the cryptography module creation engine finds the largest numerical value (step 1130) among all output ports in list "C" whose label matches the label of output port "Y". Whether or not the label of output port "Y" exists in list "C", the cryptography module creation engine creates a new output port's name by concatenating (step 1132) the label of output port "Y" with an increment of the largest numerical value that is obtained from either step 1126 or 1130. The cryptography module creation engine adds the newly created output port's name and its mapping output port name (the name of output port "Y") to list "C" (step 1134). Finally, the cryptography module creation engine determines if there is another output port in list "D" (step 1136) that needs to be processed. If there is another output port in list "D", then the cryptography module creation engine repeats the steps starting from step 1124. If all output ports in list "D" are processed, then list "C"

contains all output ports of the user-created cryptographic operation module that have assigned and mapped names (step 1138).

The flowcharts of FIG. 11A and FIG. 11B may be combined into one flowchart with two lists: (1) an empty list that represents input and output ports of the user-created cryptographic operation module, and (2) non-empty list of all input and output ports for all modules in the cryptosystem. The input port in the non-empty list is connected to the external input source module, and the output port in the non-empty list is connected to the external output destination module or left unconnected.

Figure 12:
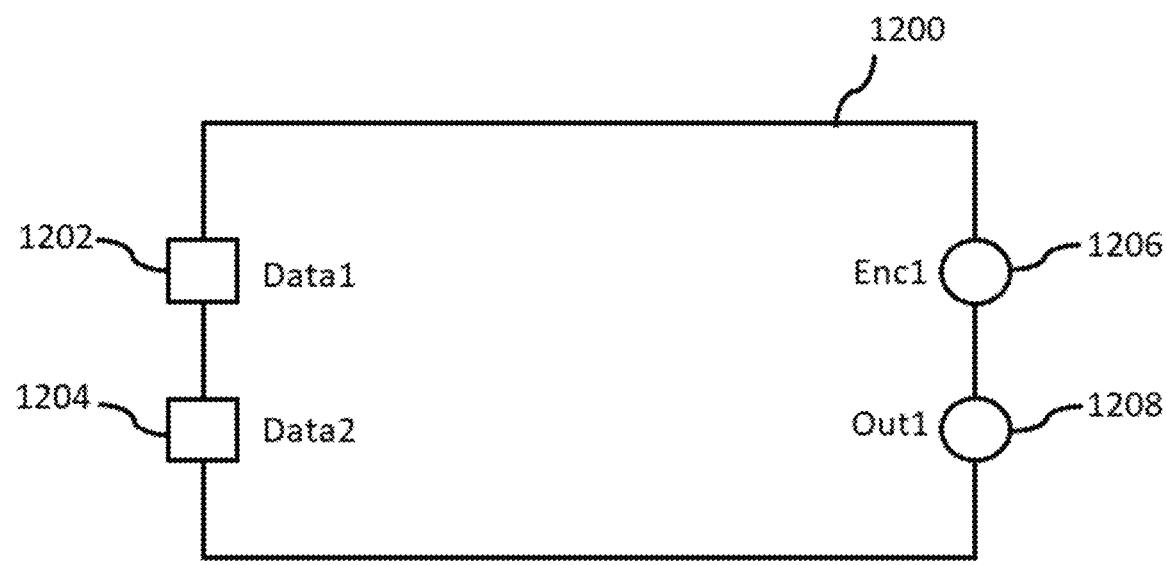
FIG. 12 shows the user-created cryptographic operation module that is generated from the cryptosystem in FIG. 10, and after executing the flowcharts in FIG. 11A and FIG. 11B.

FIG. 12 shows generated user-created cryptographic operation module 1200 from FIG. 10. User-created cryptographic operation module 1200 has mandatory input port 1202, mandatory input port 1204, output port 1206, and output port 1208. Mandatory input port 1202 is mapped to mandatory input port 1002 of cryptographic operation module 1000. Mandatory input port 1204 is mapped to mandatory input port 1024 of cryptographic operation module 1020. Output port 1206 is mapped to output port 1030 of cryptographic operation module 1020. Output port 1208 is mapped to output port 1040 of cryptographic operation module 1036. Discretionary input port 1008 of cryptographic operation module 1000 is connected to no-connection module 1010 and, therefore, user-created cryptographic operation module 1200 does not show and does not have a mapping to discretionary input port 1008. Similarly, output port 1014 of cryptographic operation module 1000 is connected to mandatory input port 1028 of cryptographic operation module 1020 and mandatory input port 1038 of cryptographic operation module 1036. Therefore, user-created cryptographic operation module 1200 does not show and does not have a mapping to either ports. The locations of ports of user-created cryptographic operation module 1200 may be distributed on the perimeter of the graphical module that represents the user-created cryptographic operation module.

The cryptography module creation engine may store the newly created module in a storage device from which the cryptography toolbox program may retrieve the newly created module and display it in the cryptography toolbox view.

Once the user-created cryptographic operation module has been created by the cryptography module creation engine, the contents of the user-created cryptographic operation may be displayed using either the pointing device (such as the mouse) or through simulation by the simulation engine. When the user drags and drops the user-created cryptographic operation module from the cryptography toolbox view into the drawing area of the cryptography design view, the user may use the mouse to double-click on the user-created cryptographic operation module, and the cryptography design sub-view is displayed that shows the cryptosystem of this user-created cryptographic operation module. The user can switch between this cryptography design sub-view and the cryptography design view. Each user-created cryptographic operation module has its own cryptography design sub-view.

Figure 13:
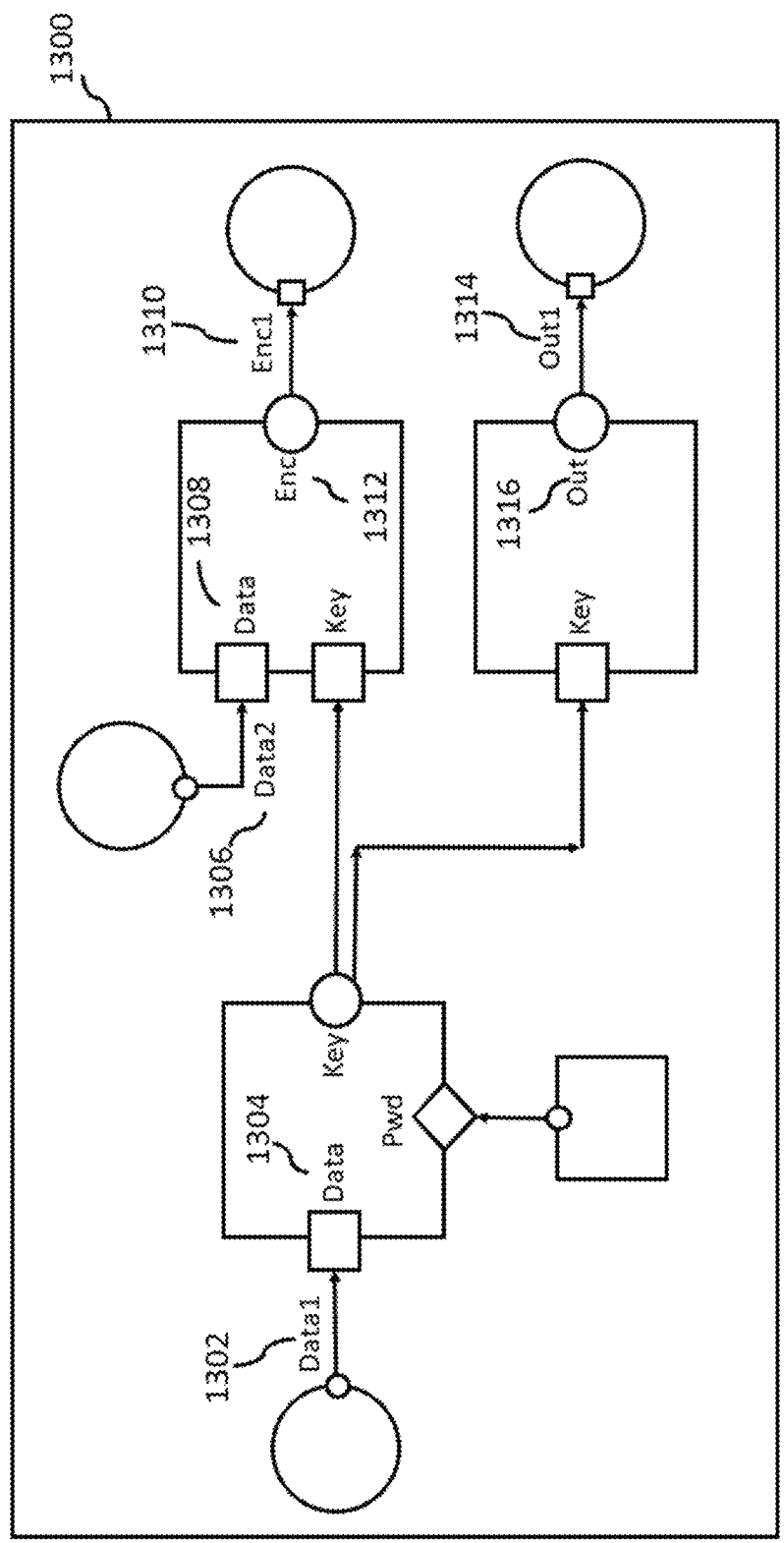
FIG. 13 shows the contents of the user-created cryptographic operation module of FIG. 12, and the mapping of ports' names after executing the flowcharts in FIG. 11A and FIG. 11B.

FIG. 13 shows cryptography design sub-view 1300 displaying the contents of user-created cryptographic operation 1200 of FIG. 12. The contents are of the cryptosystem of FIG. 10. The main difference between FIG. 10 and FIG. 13 is that FIG. 13 displays the name of each port of user-created cryptographic operation module 1200 near its mapping port. Input port name 1302 of user-created cryptographic operation module 1200 is mapped to input port name 1304, input port name 1306 of user-created cryptographic operation module 1200 is mapped to input port name 1308, output port name 1310 of user-created cryptographic operation module 1200 is mapped to output port name 1312, and output port name 1314 of user-created cryptographic operation module 1200 is mapped to output port name 1316. Therefore, the user will be able to visually correlate between the mapped port of the user-created cryptographic operation module and its corresponding port inside the user-created cryptographic operation module.

Figure 14B:
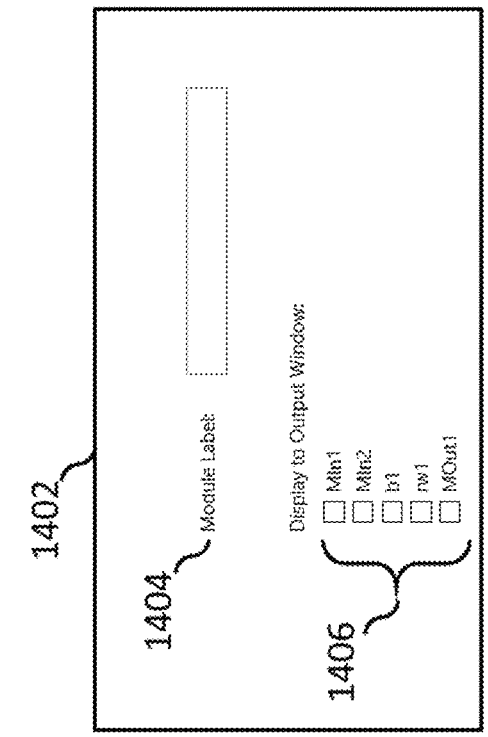
FIG. 14B shows the cryptography properties view created by the cryptography module creation engine for the user-created cryptographic operation module of FIG. 14A.
Figure 14A:
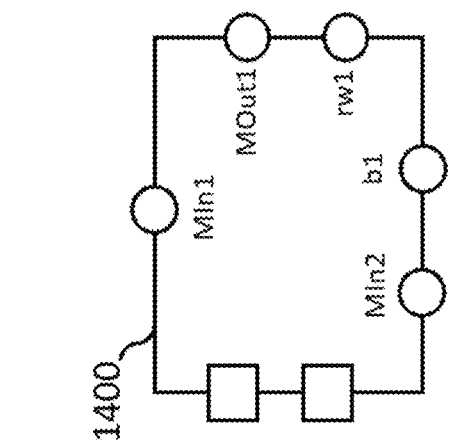
FIG. 14A shows a user-created cryptographic operation module having five output ports.

The cryptography module creation engine may also create a new cryptography properties view when creating a new cryptographic operation module. FIG. 14A shows user-created cryptographic operation module 1400 having five output ports having preassigned named as "Mln1", "Mln2", "b1", "rw1", and "MOut1". FIG. 14B shows an example of created cryptography properties view 1402 for user-created cryptographic module 1400. Cryptography properties view 1402 comprises field 1404 for the user to provide the module identification for user-created cryptographic operation module 1400, where this label may be used during simulation and code generation. Cryptography properties view 1402 also has five data-selection items in data-selection field 1406, where each data-selection item corresponding to one of the output ports of user-created cryptographic operation module 1400. Each data-selection item in data-selection field 1406 allows the user to select whether or not to display the data value of the output port from user-created cryptographic operation module 1400 to the cryptography simulation output view.

Memory Module

Figures 15A, 15B, 15C:
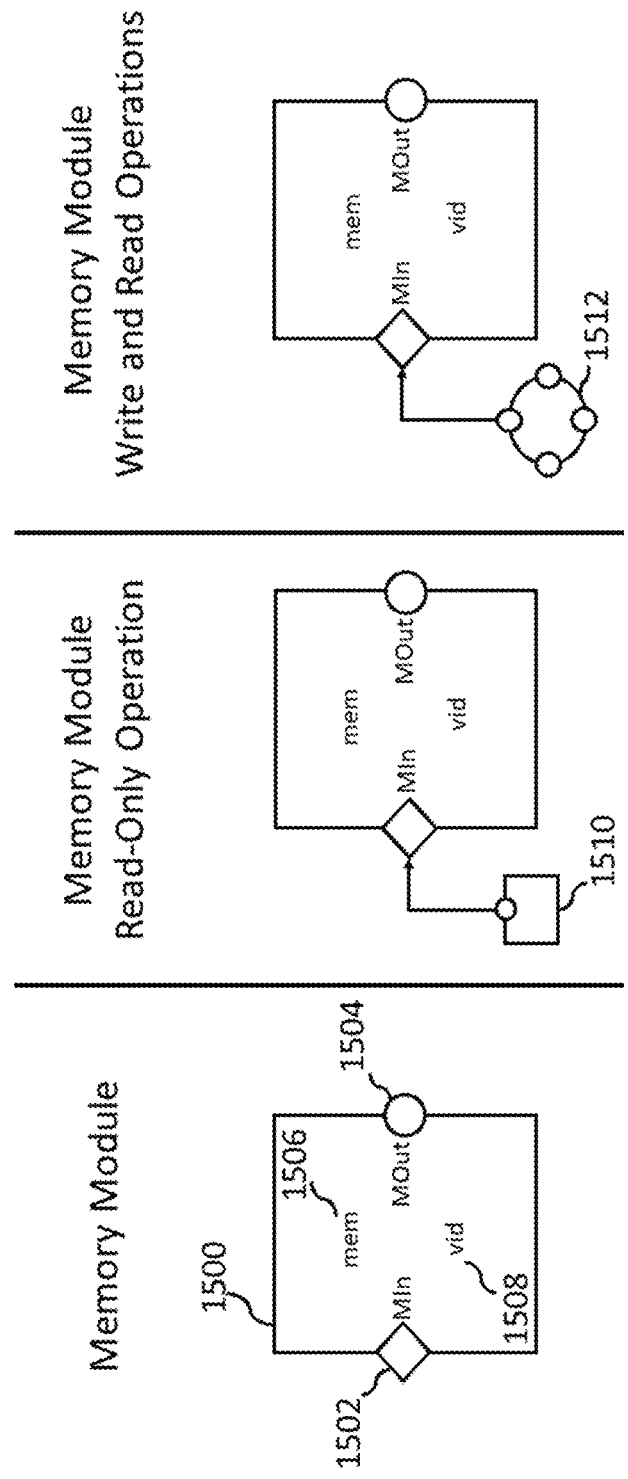
FIG. 15A is an illustration of a graphical representation of the memory module.
FIG. 15B shows the connection of the no-connection module to the memory module to perform a read-only operation.
FIG. 15C shows the connection of the external input source module to the memory module to perform write and read operations.

The memory module represents a single memory location of a computer readable storage medium (or media) capable of storing updated data values during the simulation of the cryptosystem. The computer readable storage medium can be a tangible non-transitory device, such as, but not limited to, RAM, Flash memory or memory stick. The user may not specify the address of the memory location of the computer readable storage medium, and hence the term "virtual memory location" is used in the embodiment and aspects. The memory module may be useful during the evaluation of the expression of a while-loop statement (as described later under the subsection titled: WHILE-LOOP ITERATION MODULE). As depicted in FIG. 15A, memory module 1500 may be represented with one discretionary input port 1502, which has preassigned named "Mln", and one output port 1504, which has preassigned named "MOut". Memory module 1500 may also comprise two labels 1506 and 1508. Label 1506 may be used as the module identification of this memory module during simulation and code generation. Label 1508 may be used as an identification label to the virtual memory location of memory module 1500. Both labels 1506 and 1508 may be provided by the user via the cryptography properties view of this memory model. The labels "mem" and "vid", and the preassigned names "Mln" and "MOut" in FIG. 15A are examples for illustration purpose.

FIG. 15B depicts the read-only operation, executed by the simulation engine, of the virtual memory location of memory module 1500. In order to perform the read-only operation on the virtual memory location, the user may connect no-connection module 1510 to discretionary input port 1502, and the virtual memory location may be read from output port 1504.

FIG. 15C depicts the write and read operations, executed by the simulation engine, of the virtual memory location of memory module 1500. In order to write to the virtual memory location, the user may connect external input source module 1512, as an example, to discretionary input port 1502, the content of the virtual memory location of memory module 1500 gets overwritten or updated with the new data from external input source 1512, and the updated value may be read from output port 1504.

Figure 16:
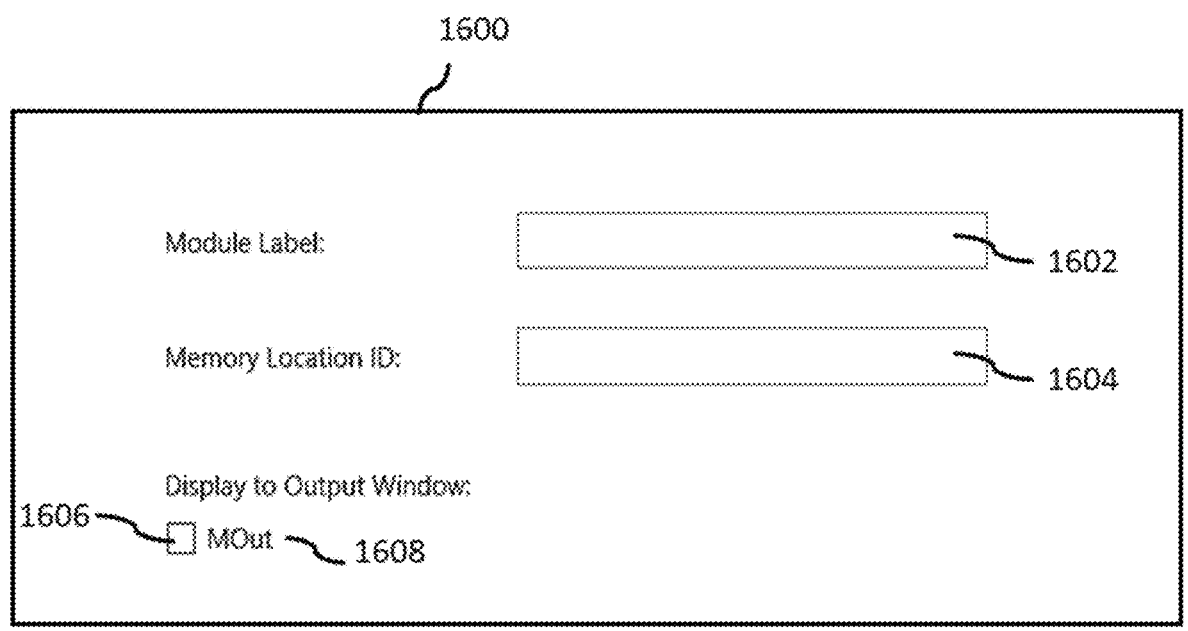
FIG. 16 shows the cryptography properties view of the memory module.

The memory module may be available in the cryptography toolbox view, and the user may drag and drop the memory module into a position in the drawing area of the cryptography design view. The memory module has its own cryptography properties view, as depicted in FIG. 16. Cryptography properties view 1600 of the memory module comprises three fields. Data-entry field 1602 may be used by the user to provide the module identification of the memory module, and may be used during simulation and code generation. The label in field 1602 will appear on the memory module, as indicated earlier at label 1506 of FIG. 15A. Data-entry field 1604 is used to provide the identification label for the virtual memory location. The identification label in field 1604 will appear on the memory module as indicated earlier at label 1508 of FIG. 15A. Data-selection field 1606 allows the user to select whether or not to display the content of the virtual memory location to the cryptography simulation output view. The content of the virtual memory location is available at the output port of the memory module, and the output port in this example is preassigned the name "MOut" 1608, which is the same name of output port 1504 in FIG. 15A.

If-Else Selection Module

Figure 17:
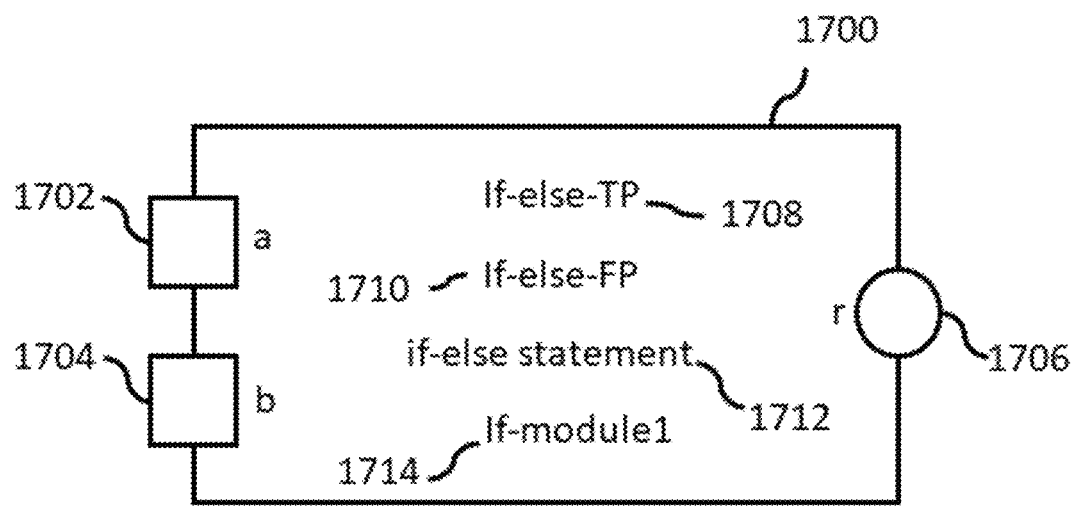
FIG. 17 is an illustration of a graphical representation of the if-else selection module.

The if-else selection module may be used in the design of the cryptosystem or a new cryptographic operation. The if-else selection module represents the if-else selection statement. As depicted in FIG. 17, if-else selection module 1700 may be represented with mandatory input port 1702, which has preassigned named "a", and mandatory input port 1704, which has preassigned named "b", and output port 1706, which has preassigned named "r". The simulation engine compares mandatory input port 1702 data with mandatory input port 1704 data using a comparison operation. Output port 1706 has the result of this comparison operation, which is either the logical true (also known as logical 1) or the logical false (also known as logical 0). The graphical representation of mandatory input port 1702, mandatory input port 1704, and output port 1706 may be located anywhere on the perimeter of if-else selection module 1700. Each graphical shape in FIG. 17 may have a different representation. The preassigned names "a", "b", and "r" in FIG. 17 are examples for illustration purpose.

In general, in any programming language, the if-else selection statement has two paths: the true-path and the false-path. Given the if-else selection module in the drawing area of the cryptography design view, the user may assign modules in the drawing area to each path of this if-else selection module without using graphical connections. If the result of the comparison operation, which is executed by the simulation engine, between mandatory input port 1702 data and mandatory input port 1704 data is the logical true, then the modules assigned to the true-path of this if-else selection module may be executed by the simulation engine. If the outcome of the comparison operation is the logical false, then the modules assigned to the false-path of this if-else selection module may be executed by the simulation engine.

In order to assign modules to the paths of the if-else selection module, the user may provide an identification label that identifies the if-else true-path, and may provide another identification label that identifies the if-else false-path. The user may provide these two identification labels in the cryptography properties view of the if-else selection module, the cryptography properties program in turn receives and assigns these two identification labels to the true-path and false-path of if-else selection module, and then these two identification labels may appear on the if-else selection module. As shown in FIG. 17, label 1708 identifies the true-path of the if-else selection module as "If-else-TP". Label 1710 identifies the false-path of the if-else selection module as "If-else-FP". In addition, label 1712, which is named "if-else statement" may be used as a title that describes the use of if-else selection module 1700. Label 1714, which is named "If-module1" may be provided by the user as the module identification of if-else selection module 1700, and may be used during simulation and code generation. The labels "If-else-TP", "If-else-FP", "if-else statement", and "If-module1" are examples for illustration purpose.

Figure 18:
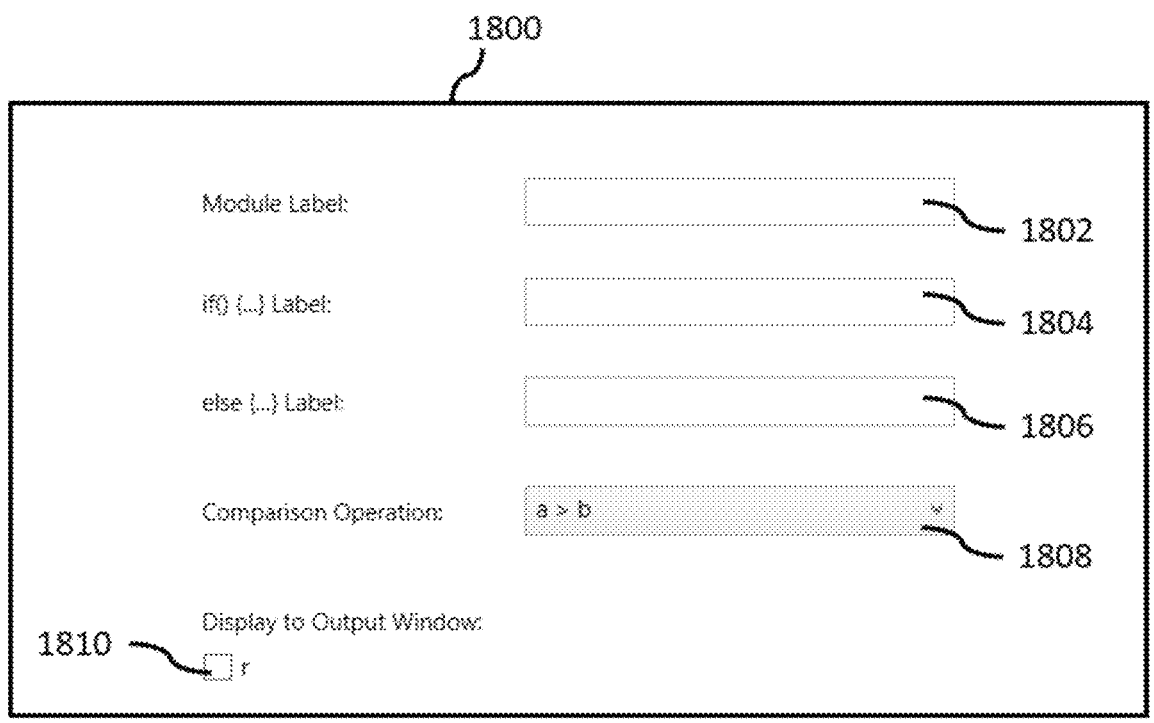
FIG. 18 shows the cryptography properties view of the if-else selection module.

The if-else selection module may be available in the cryptography toolbox view. The user may drag and drop the if-else selection module into the drawing area of the cryptography design view. The if-else selection module has its own cryptography properties view. FIG. 18 shows cryptography properties view 1800 of the if-else selection module. It comprises the following fields and options. Data-entry field 1802 allows the user to provide the module identification to identify this if-else selection module during simulation. This module identification may appear on the module as indicated in FIG. 17 label 1714. Data-entry field 1804 allows the user to provide the identification label of the true-path of this if-else selection module. This true-path identification label may appear on the module as indicated in FIG. 17 label 1708. Data-entry field 1806 allows the user to provide the identification label of the false-path of this if-else selection module. This false-path identification label may appear on the module as indicated in FIG. 17 label 1710. Data-selection field (or options) 1808 allows the user to select from several comparison operations in order for this if-else selection module to compare data on its two input ports. Data-selection field 1810 allows the user to select whether or not to display the result of the comparison operation in the cryptography simulation output view for the output port, which is preassigned the label "r" as an example, of this if-else selection module.

While-Loop Iteration Module

Figure 19:
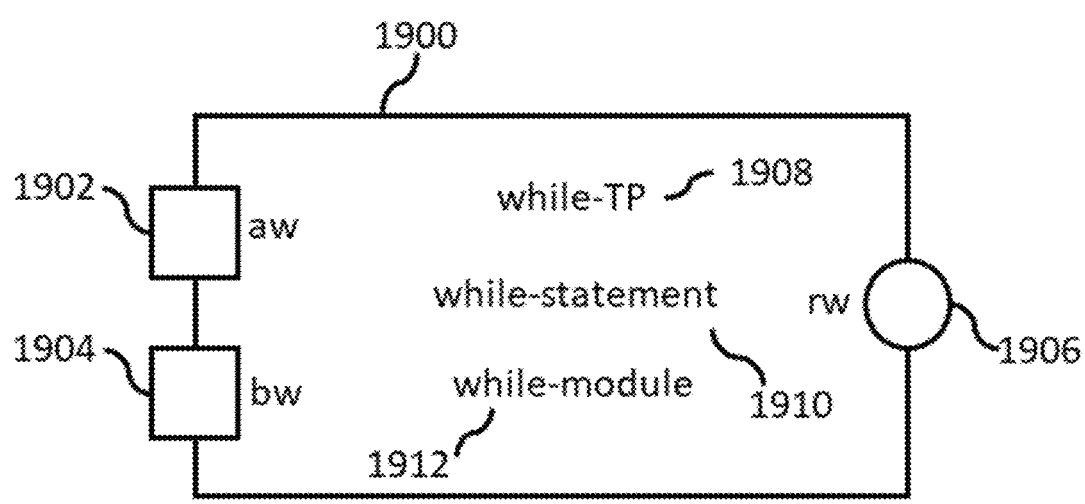
FIG. 19 is an illustration of a graphical representation of the while-loop iteration module.

The while-loop iteration module may be used in the design of the cryptosystem or a new cryptographic operation. The while-loop iteration module represents the while-loop iteration statement. As depicted in FIG. 19, while-loop iteration module 1900 may be represented with mandatory input port 1902, which has preassigned named "aw", mandatory input port 1904, which has preassigned named "bw", and output port 1906, which has preassigned named "rw". The simulation engine compares mandatory input port 1902 data with mandatory input port 1904 data using a comparison operation. Output port 1906 has the result of this comparison operation, which is either the logical true (also known as logical 1) or the logical false (also known as logical 0). The graphical representation of mandatory input port 1902, mandatory input port 1904, and output port 1906 may be located anywhere on the perimeter of while-loop iteration module 1900. Each graphical shape in FIG. 19 may have a different representation. The preassigned names "aw", "bw", and "rw" in FIG. 19 are examples for illustration purpose.

In general, in a programming language that supports the while-loop iteration statement, the while-loop iteration statement has one true-path, which will be referred to as the while-loop path. Given the while-loop iteration module in the drawing area of the cryptography design view, the user may assign modules in the drawing area to the while-loop path of this while-loop iteration module without graphical connections. If the result of the comparison operation, which is executed by the simulation engine, between mandatory input port 1902 data and mandatory input port 1904 data is the logical true, then the modules assigned to the while-loop path of this while-loop iteration module may be executed by the simulation engine.

In order to assign modules to the while-loop path of the while-loop iteration module, the user may provide an identification label that identifies this while-loop path. The user may provide the while-loop path identification label in the cryptography properties view of the while-loop iteration module, the cryptography properties program in turn receives and assigns the while-loop path identification label to the while-loop iteration module, and then the while-loop path identification label may appear on the while-loop iteration module. As shown in FIG. 19, label 1908 identifies the while-loop path of while-loop iteration module 1900 as "while-TP". In addition, label 1910, which is named "while-statement" may be used as a title that describes the use of while-loop iteration module 1900. Label 1912, which is named "while-module" may be provided by the user as the module identification of while-loop iteration module 1900, and may be used during simulation and code generation. The labels "while-TP", "while-statement", and "while-module" are examples for illustration purpose.

In general, the while-loop iteration module may perform another iteration of executing the modules that are assigned to its while-loop path. This another iteration is determined by another comparison between mandatory input port 1902 data and mandatory input port 1904 data. Mandatory input port 1902 data and/or mandatory input port 1904 data may be updated and provided by one or more of the executed modules that are assigned to the while-loop path of while-loop iteration module 1900. In order for while-loop iteration module 1900 to retrieve an updated data on mandatory input port 1902 and another updated data on mandatory input port 1904, the while-loop iteration module internally has two memory modules: (1) a memory module for mandatory input port 1902, and (2) another memory module for mandatory input port 1904. The one or more of the executed modules that provide the updated data may be connected to other memory modules whose virtual memory location identities matches the identity of these two memory modules. FIG. 20 illustrates the use of memory modules with the while-loop iteration module. While-loop iteration module 2000 has mandatory input port 2002 connected to external input source module 2004, and mandatory input port 2006 connected to external input source module 2008. While-loop iteration module 2000 internally has memory module 2010 with its virtual memory location identified as ID1, and memory module 2012 with its virtual memory location identified as ID2. Memory module 2010 is assigned to mandatory input port 2002, while memory module 2012 is assigned to mandatory input port 2006. FIG. 20 also has module 2014 having mandatory input port 2016 connected to external input source module 2018, and output port 2020 connected to memory module 2022 with its virtual memory location having the same identity as memory module 2010. FIG. 20 also has module 2024 having mandatory input port 2026 connected to external input source module 2028, and output port 2030 connected to memory module 2032 with its virtual memory location having the same identity as memory module 2012. To illustrate the use of while-loop iteration module 2000, consider the following execution steps, while assuming that module 2014, module 2022, module 2024, and module 2032 are executed inside the while-loop path of while-loop iteration module 2000:

1. While-loop iteration module 2000 reads from module 2004, via its mandatory input port 2002, data generated by module 2004. Let this data be referred to as "Data A". While-loop iteration module 2000 stores "Data A" in virtual memory location ID1 of memory module 2010.
2. While-loop iteration module 2000 reads from module 2008, via its mandatory input port 2006, data generated from module 2008. Let this data be referred to as "Data B". While-loop iteration module 2000 stores "Data B" in virtual memory location ID2 of memory module 2012.
3. While-loop iteration module 2000 compares "Data A" with "Data B" using a comparison operation, and assuming the outcome of the comparison result is the logical true.
4. Module 2014 reads from module 2018, via its mandatory input port 2016, data generated from module 2018. Let this data be referred to as "Data C". Module 2014 performs some operation on "Data C" to generate output data. Let this generated output data be referred to as "Data D". "Data D" is sent out via port 2020 to memory module 2022.
5. Memory module 2022 overwrites "Data A" in virtual memory location ID1 with "Data D".
6. Module 2024 reads from module 2028, via its mandatory input port 2026, data generated from module 2028, Let this data be referred to as "Data E". Module 2024 performs some operation on "Data E" to generate output data. Let this generated output data be referred to as "Data F". "Data F" is sent out via port 2030 to memory module 2032.
7. Memory module 2032 overwrites "Data B" in virtual memory location ID2 with "Data F".
8. While-loop iteration module 2000 reads virtual memory location ID1 of memory module 2010. The virtual memory location with ID1 has "Data D". While-loop iteration module 2000 also reads the virtual memory location with ID2 of memory module 2012. The virtual memory location with ID2 has "Data F". Finally, while-loop module 2000 compares "Data D" with "Data F" using the comparison operation. The outcome of the comparison operation determines whether or not to execute again modules 2014, 2022, 2024, and 2032.

Figure 21:
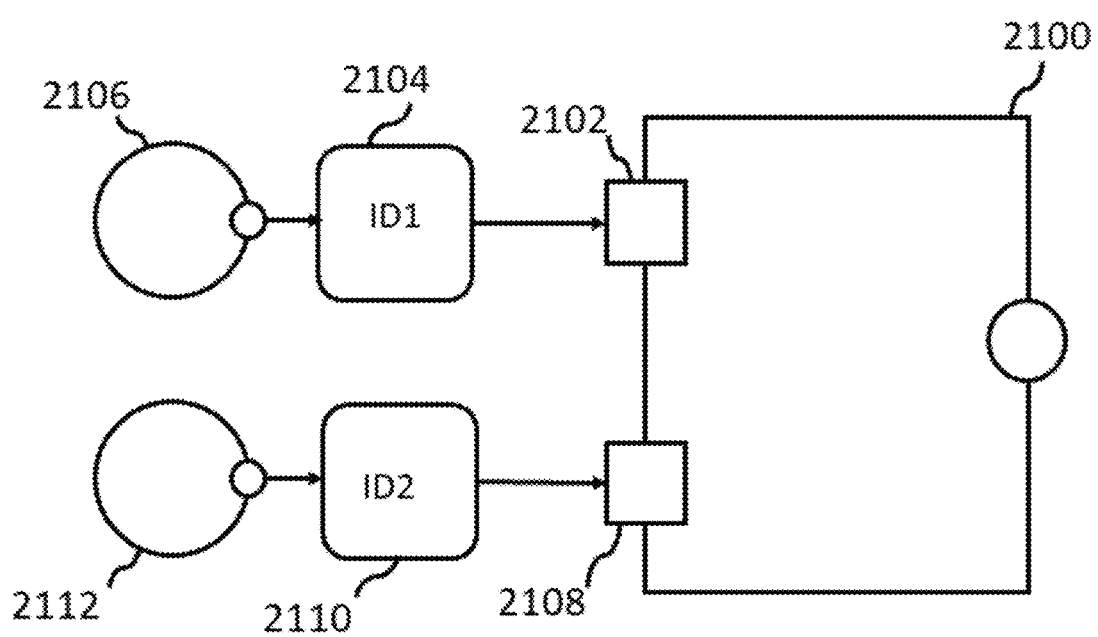
FIG. 21 is an illustration of the use of external memory modules with the while-loop iteration module.

Alternatively, the while-loop iteration module may not have internally two memory modules. Instead, two external memory modules may be connected directly to the input ports of the while-loop iteration statement. Each input port is connected to a memory module. FIG. 21 illustrates while-loop iteration module 2100 having mandatory input port 2102 connected to external memory module 2104, which is connected to external input source module 2106. While-loop iteration module 2100 also has mandatory input port 2108 connected to external memory module 2110, which is connected to external input source module 2112. Thus, when while-loop iteration module 2100 performs another iteration, it reads mandatory input port 2102 which is connected to memory module 2104, and it reads mandatory input port 2108 that is connected to memory module 2110. As a result, mandatory input port 2102 and mandatory input port 2108 have updated data from memory module 2104 and memory module 2110, respectively.

Figure 22:
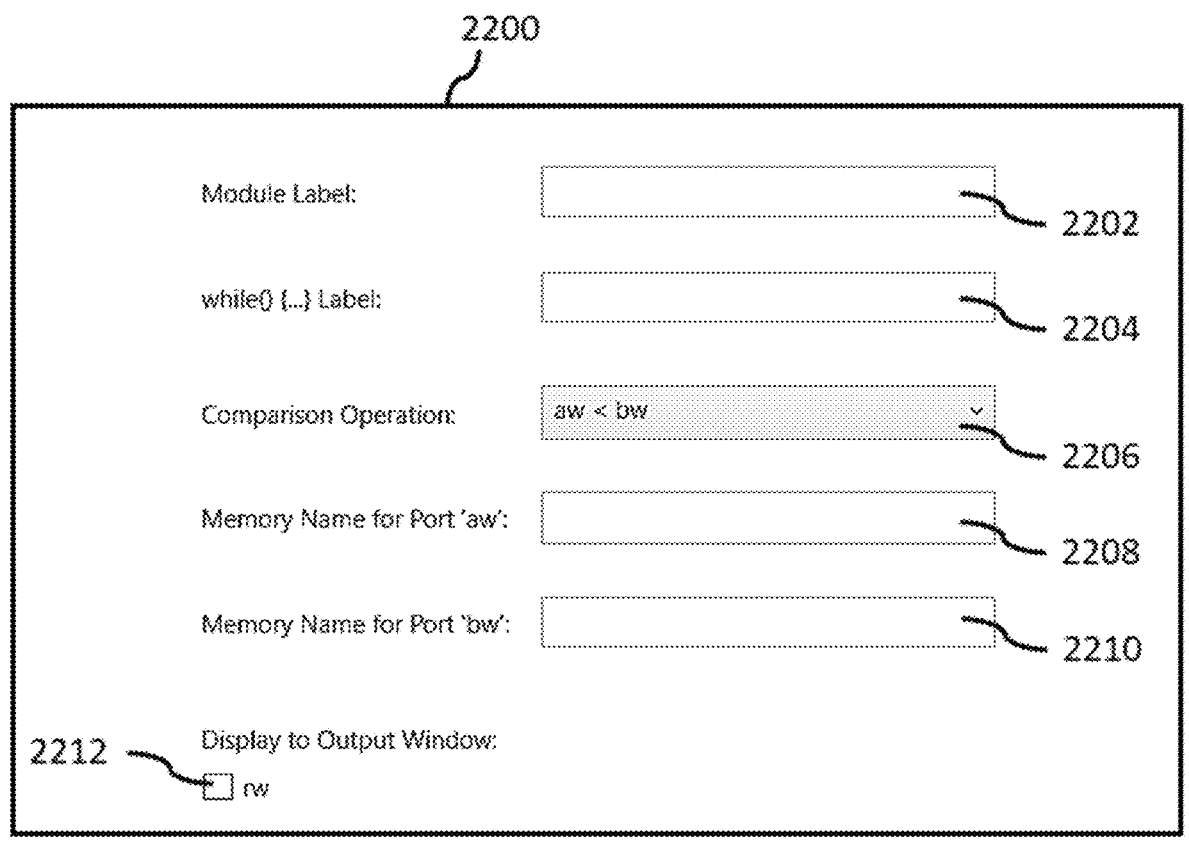
FIG. 22 shows the cryptography properties view of the while-loop iteration module.

The while-loop iteration module may be available in the cryptography toolbox view. The user may drag-and-drop the while-loop iteration module into a position in the drawing area of the cryptography design view. The while-loop iteration module has its own cryptography properties view. FIG. 22 shows cryptography properties view 2200 of the while-loop iteration module. It comprises the following fields and options. Data-entry field 2202 allows the user to provide the module identification to identify this while-loop iteration module during simulation. This module identification appears on the module as indicated in FIG. 19 label 1912. Data-entry field 2204 allows the user to provide the while-loop path identification label for the while-loop path of this while-loop iteration module. This while-loop path identification label appears on the module as indicated in FIG. 19 label 1908. Data-selection field (or options) 2206 allows the user to select from several comparison operations in order for this while-loop iteration module to compare data on its two input ports. Data-entry field 2208 allows the user to provide the identification label for the internal virtual memory location for mandatory input port 1902 of FIG. 19. Data-entry field 2210 allows the user to provide the identification label for the internal memory location for mandatory input port 1904 of FIG. 19. Data-selection field 2212 allows the user to select whether or not to display the result of the comparison operation in the cryptography simulation output view for the output port, which is preassigned the name "rw" as an example, of this while-loop iteration module.

Break and Continue Modules

In programming languages that support the while-loop iteration statement, the while-loop iteration statement may be supported by two other statements: the break statement and the continue statement. The break and continue statements may exist inside the while-loop path of the while-loop iteration statement. Those of ordinary skill in the art will recognize that the break statement allows an early exit or termination from the while-loop path of the while-loop statement without re-evaluating (i.e. another comparison) of the two inputs of the while-loop statement. The continue statement interrupts the operational flow inside the while-loop path of the while-loop statement, and then allows the next iteration of the while-loop statement to begin by performing another comparison operation of the two inputs of the while-loop statement. Thus, as described earlier, the operational flow of the cryptosystem may be affected by the use of the break and continue statements in the while-loop iteration statement.

The break module, which represents the break statement, and the continue module, which represents the continue statement, may be available in the cryptography toolbox view, and the user can drag and drop the break module or the continue module into a position in the drawing area of the cryptography design view.

Figures 23A, 23B:
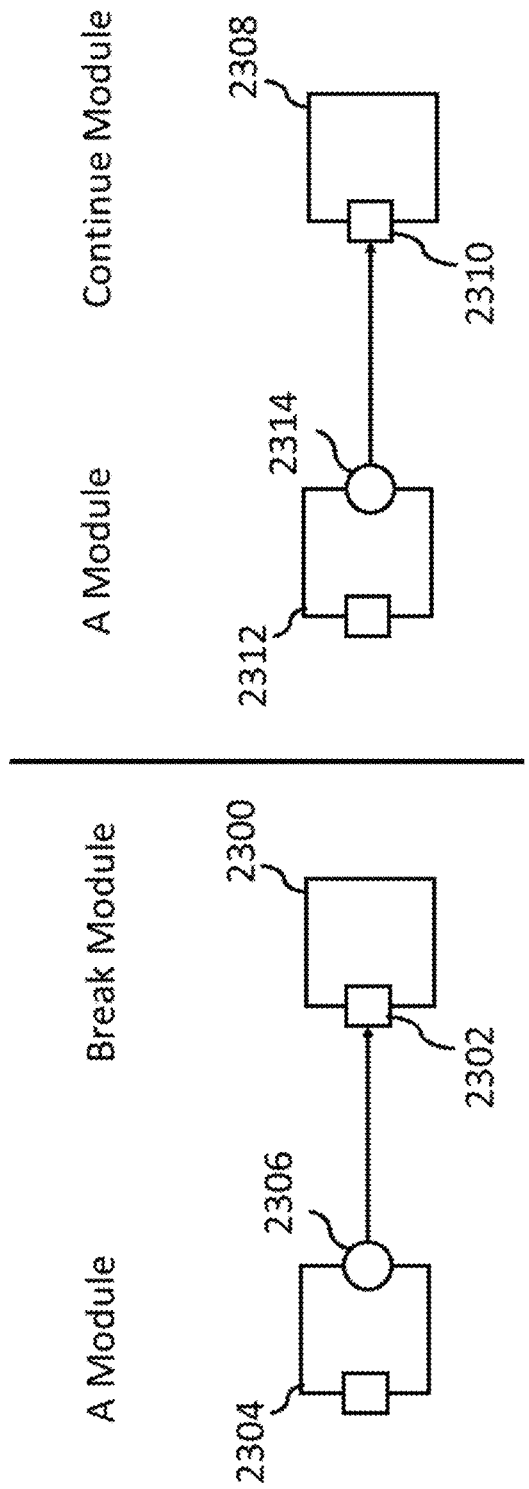
FIG. 23A is an illustration of a graphical representation of the break module, and how it is connected to another module.
FIG. 23B is an illustration of a graphical representation of the continue module, and how it is connected to another module.

As depicted in FIG. 23A, break module 2300 may be represented with one mandatory input port 2302. In order to explain the usage of the break module, FIG. 23A also shows module 2304, whose output port 2306 is connected to mandatory input port 2302 of break module 2300. Break module 2300 does not process any data from its mandatory input port 2302. Instead, break module 2300 represents the last operation, which is in the while-loop path of the while-loop module, to be executed before exiting the while-loop module, but after the execution of module 2304. The mandatory input port of the break module may be connected to only one output port.

As depicted in FIG. 23B, continue module 2308 may be represented with one mandatory input port 2310. In order to explain the usage of the continue module, FIG. 23B also shows module 2312, whose output port 2314 is connected to mandatory input port 2310 of continue module 2308. Continue module 2308 does not process any data from its mandatory input port 2310. Instead, the continue module represents the last operation, which is in the while-loop path of the while-loop module, to be executed before handling control to the while-loop module for re-evaluating data on its two input ports, but after executing module 2312. The mandatory input port of the continue module may be connected to only one output port.

Assigning Modules to if-Else Selection Module and while-Loop Iteration Module

Figure 24:
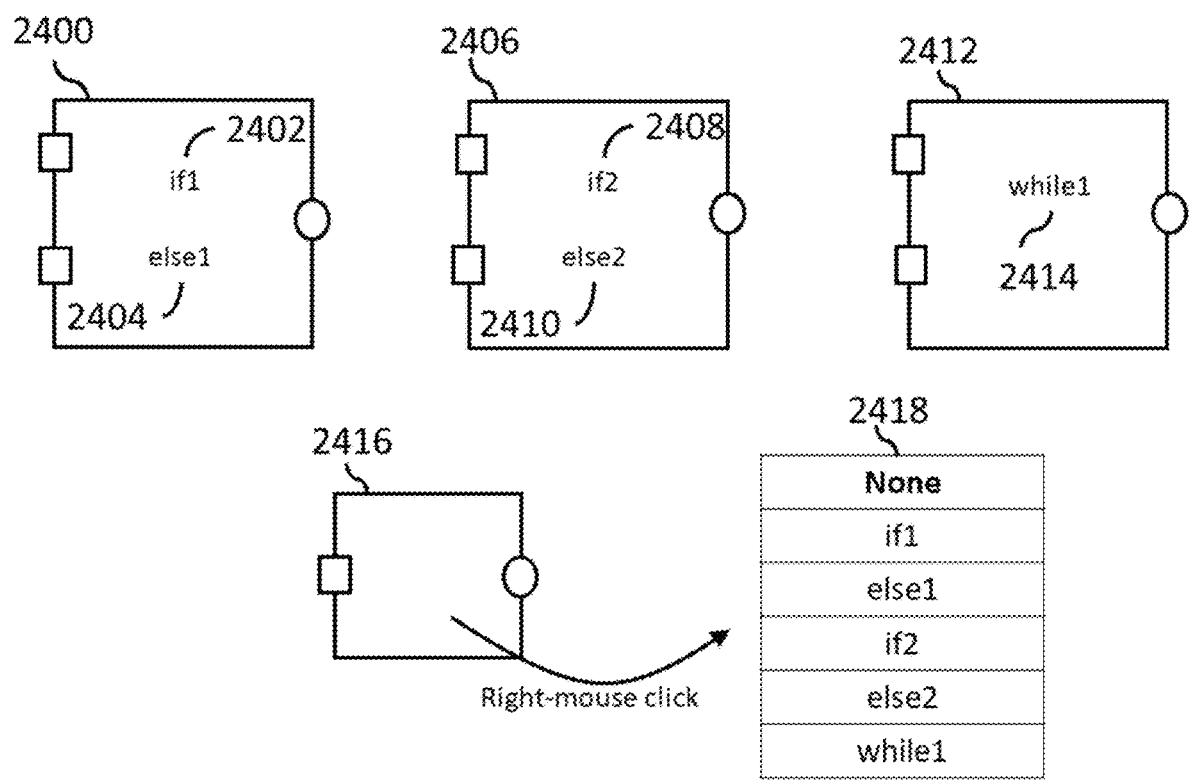
FIG. 24 shows a list of available paths from two if-else selection modules and one while-loop iteration module, when the user right-mouse-clicks on a module.

The user may assign a module in the drawing area of the cryptography design view to either paths of the if-else selection module that exists in the drawing area, or to the while-loop path of the while-loop iteration module that exists in the drawing area, and without using connectors. As described earlier, the first step requires the user to provide identification labels for the true-path and the false-path of the if-else selection module in the drawing area, and for the while-loop path of the while-loop iteration module in the drawing area. The next step is for the user to assign the module to one of the true-path of the if-else selection module, the false-path of the if-else selection module, or the while-loop path of the while-loop iteration module. The assignment may be achieved by the user through a command, such as clicking on the right button of the mouse on the module. When the user clicks on the right button of the mouse on the module, the cryptography design program receives such a command, and displays a list of identification labels on or around the module, from which the user may select. As depicted in FIG. 24, if-else selection module 2400 identifies its true-path as "if1" in label 2402, and identifies its false-path as "else1" in label 2404. If-else selection module 2406 identifies its true-path as "if2" in label 2408, and identifies its false-path as "else2" in label 2410. While-loop iteration module 2412 identifies its while-loop path as "while1" in label 2414. Label 2402, label 2404, label 2408, label 2410, and label 2414 are provided by the user. When the user clicks on the right button of the mouse on module 2416, list 2418 appears to the user with label 2402, label 2404, label 2408, label 2410, and label 2414 in additional to the name "None". The user may select one of the labels in list 2418. When the user selects a label from list 2418, the cryptography design program displays a visual graphical indicator on or around module 2416. The user may select "None" to turn off or remove the visual graphical indicator from module 2416. Only one visual graphical indicator may appear on or around module 2416.

Figure 25:
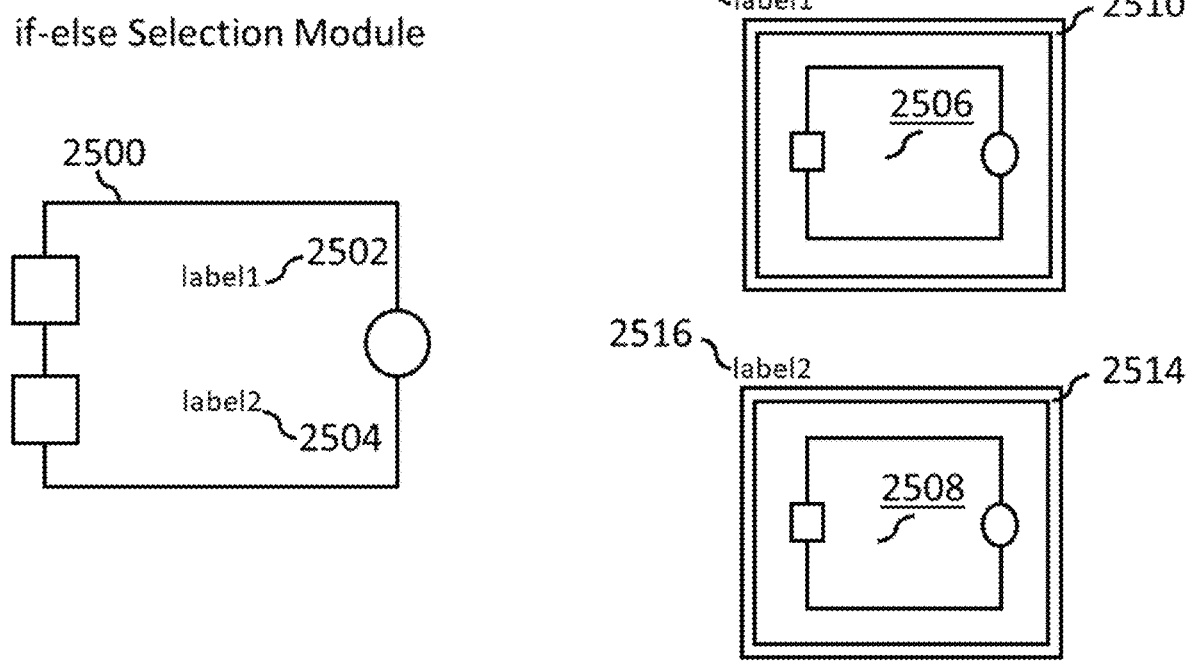
FIG. 25 is an illustration of two visual graphical indicators on two modules, each visual graphical indicator representing a path of the if-else selection module.

The visual graphical indicator indicates that module 2416 is assigned, by the cryptography design program, to one of the paths of if-else selection module 2400, if-else selection module 2406, or while-loop iteration module 2412. The visual graphical indicator comprises the identification label that the user selected from list 2418. The visual graphical indicator may also comprise a graphical representation. As depicted in FIG. 25, if-else selection module 2500 identifies its true-path as "label1" in label 2502, and identifies its false-path as "label2" in label 2504. Label 2502 and label 2504 are provided by the user using the cryptography properties view of if-else selection module 2500. Module 2506 has visual graphical indicator 2510 with label 2512 that matches label 2502 to indicate to the user that module 2506 is in the true-path of if-else selection module 2500, and may be executed in the true-path of if-else selection module 2500. Module 2508 has visual graphical indicator 2514 with label 2516 that matches label 2504 to indicate to the user that module 2508 is in the false-path of if-else selection module 2500, and may be executed in the false-path of if-else selection module 2500. In FIG. 25, the user does not need to have any graphical connectors between if-else selection module 2500 on one side, and module 2506 and module 2508 on the other side.

Figure 26:
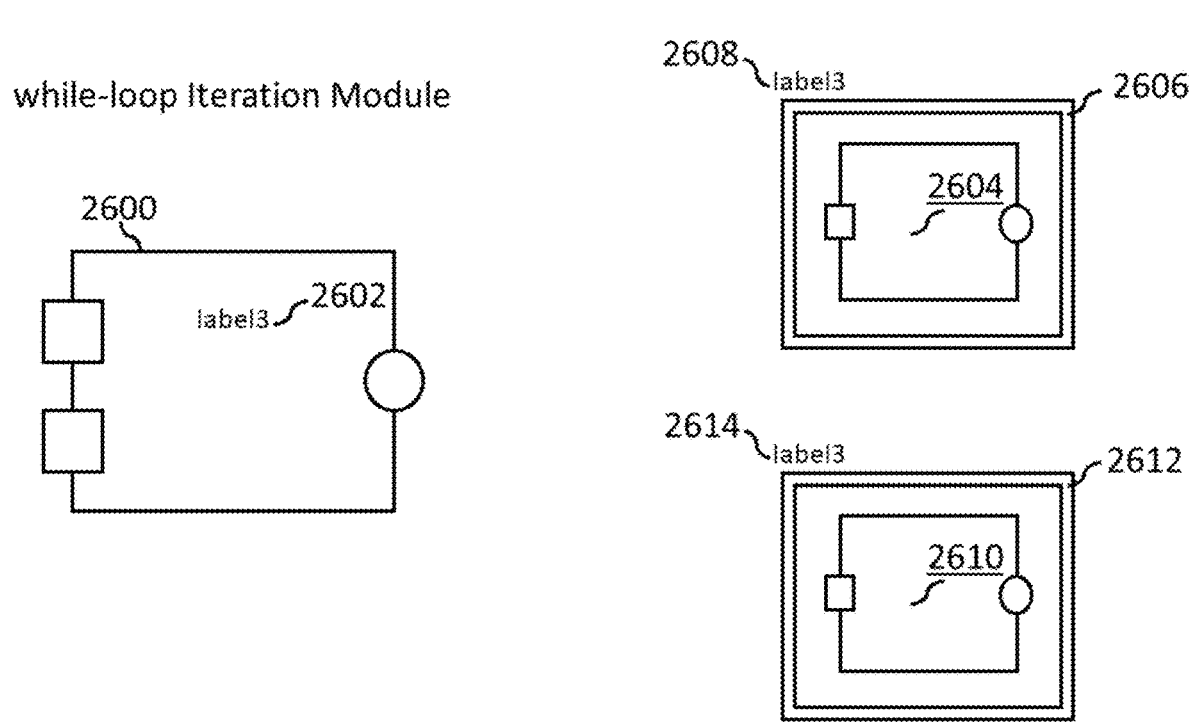
FIG. 26 is an illustration of two visual graphical indicators on two modules, each visual graphical indicator representing the while-loop path of the while-loop iteration module.

As depicted in FIG. 26, while-loop iteration module 2600 identifies its while-loop path as "label3" in label 2602. Label 2602 is provided by the user using the cryptography properties view of while-loop iteration module 2600. Module 2604 has visual graphical indicator 2606 with label 2608 that matches label 2602 to indicate to the user that module 2604 is in the while-loop path of while-loop iteration module 2600, and may be executed in the while-loop path of while-loop iteration module 2600. Module 2610 has visual graphical indicator 2612 with label 2614 that matches label 2602 to indicate to the user that module 2610 is in the while-loop path of while-loop iteration module 2600, and may be executed in the while-loop path of while-loop iteration module 2600. In FIG. 26, the user does not need to have any graphical connectors between while-loop iteration module 2600 on one side, and module 2604 and module 2610 on the other side.

Simulation Engine and Cryptography Simulation Output View

Each cryptographic operation module in the cryptography toolbox view is assigned by the simulation engine to one or more APIs from the software cryptography library, which is loaded by the simulation engine. Since not every software cryptography library has the APIs for each cryptographic operation module in the cryptography toolbox view, if the provided software cryptography library does not have the APIs to perform the operation of a cryptographic operation module, then this cryptographic operation module will not be available to the user in the cryptography toolbox view.

When the drawing area of the cryptography design view contains the cryptosystem, which comprises one or more modules from the cryptography toolbox view, the user may start the operation of the simulation engine to evaluate and execute these modules and to analyze their outputs. The operation of the simulation engine may be started by receiving a command from the user, such as clicking on a button, and then loading the software cryptography library. The simulation engine evaluates a module by determining: (1) whether or not the module is assigned to an active while-loop iteration module or an active if-else selection module, and (2) whether or not data is available on each input port of the module. The input port that is connected to the no-connection module is excluded from this evaluation since the no-connection module provides the null data. The active while-loop iteration module means that the simulation engine has already executed the while-loop iteration module by comparing data on the input ports of the while-loop iteration module, and the outcome of this comparison is the logical true. This logical true outcome indicates that the while-loop path of this while-loop iteration module is ready for processing. The active if-else selection module means that the simulation engine has already executed the if-else selection module by comparing data on the input ports of the if-else selection module, and either the true-path or the false-path of the if-else selection module is ready for processing.

Figure 27:
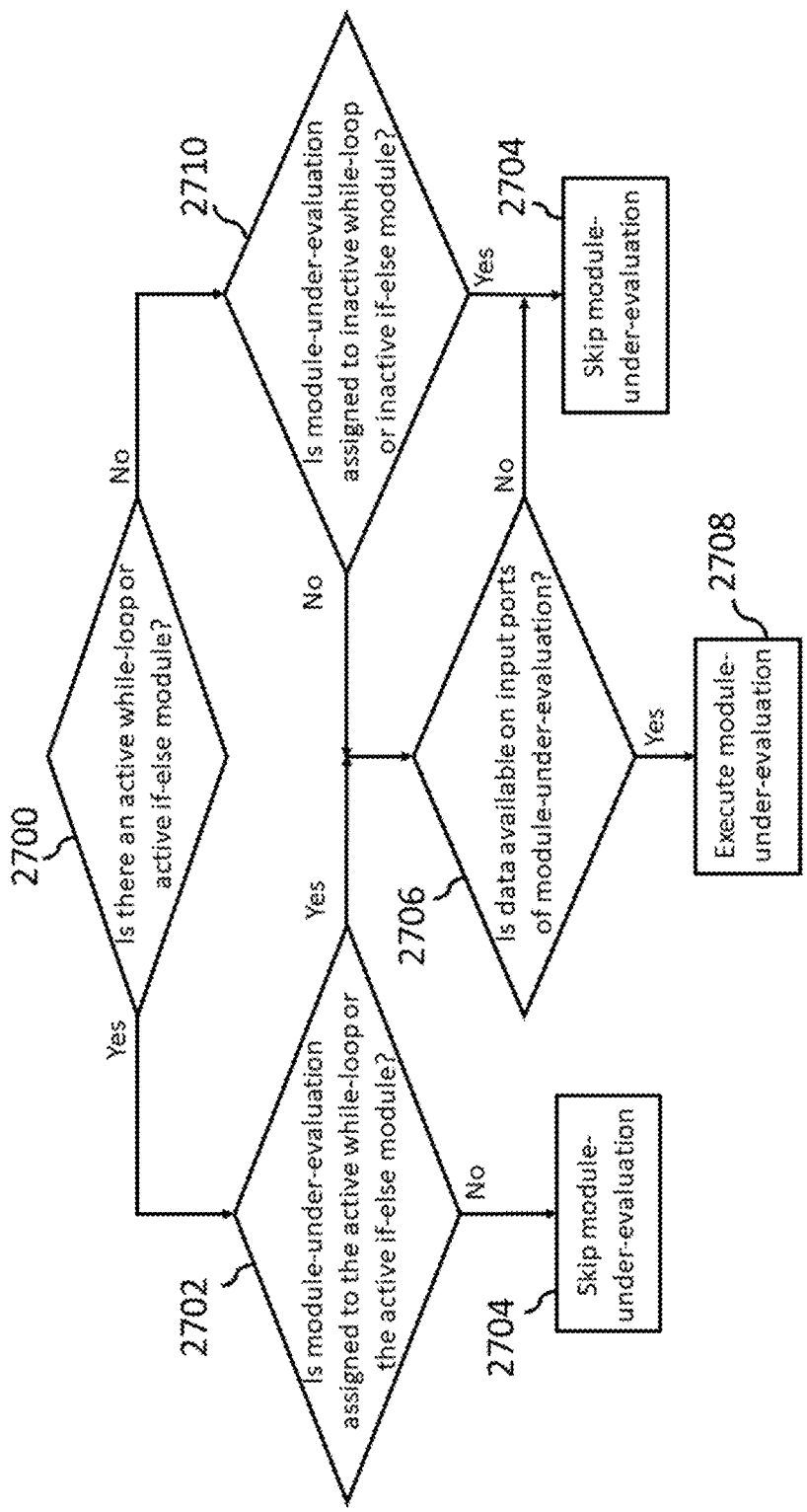
FIG. 27 is a flowchart of steps the simulation engine performs to determine whether or not to execute a module.

FIG. 27 shows a flowchart of the evaluation steps through which the module goes during simulation. For the purpose of describing the flowchart in FIG. 27, the module that is being evaluated is referred to as a module-under-evaluation. On one hand, the simulation engine checks whether or not there is the active if-else selection module or the active while-loop iteration module (step 2700). If there is the active if-else selection module or the active while-loop iteration module, then the simulation engine checks whether or not the module-under-evaluation is assigned to the active if-else selection module or the active while-loop iteration module (step 2702), If the module-under-evaluation is not assigned to the active if-else selection module or the active while-loop iteration module, then the simulation engine skips and does not execute this module-under-evaluation (step 2704). If the module-under-evaluation is assigned to the active if-else selection module or the active while-loop iteration module, then the simulation engine checks whether or not data is available on each input port of the module-under-evaluation (step 2706). If data is not available on each input port of the module-under-evaluation, then the simulation engine skips and does not execute this module-under-evaluation (step 2704). If data is available on each input port of the module-under-evaluation, then the simulation engine assigns one or more APIs from the loaded software cryptography library to the module-under-evaluation, and then executes the module-under-evaluation (step 2708). The execution of the module-under-evaluation involves the use of the assigned one or more APIs that may depend on the selected functional behavior from the cryptography properties view of the module-under-evaluation and on the data on each input port of the module-under-evaluation.

On the other hand, if there is no active if-else selection module and while-loop iteration module, then the simulation engine checks whether or not the module-under-evaluation is assigned to an inactive if-else selection module or an inactive while-loop iteration module (step 2710). If the module-under-evaluation is assigned to the inactive if-else selection module or the inactive while-loop iteration module, then the simulation engine skips and does not execute the module-under-evaluation (step 2704). If the module-under-evaluation is not assigned to any if-else selection module or while-loop iteration module, then the simulation engine checks whether or not data is available on each input port of the module-under-evaluation (step 2706). If data is not available on each input port of the module-under-evaluation, then the simulation engine skips and does not execute this module-under-evaluation (step 2704). If data is available on each input port of the module-under-evaluation, then the simulation engine executes the module-under-evaluation (step 2708). The execution of the module-under-evaluation involves the use of the assigned one or more APIs that may depend on the selected functional behavior from the cryptography properties view of the module-under-evaluation and on the data on each input port of the module-under-evaluation.

Figure 28:
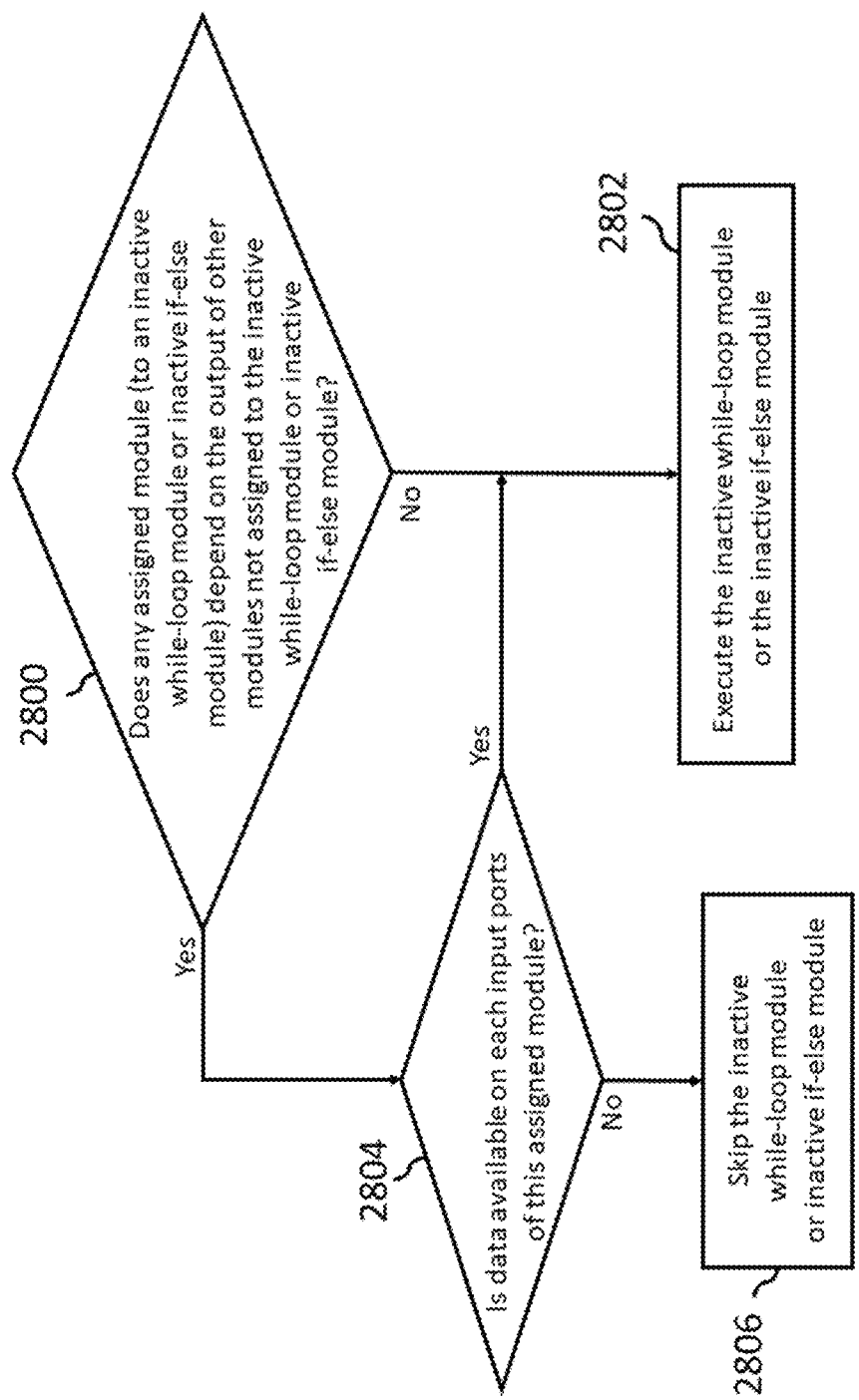
FIG. 28 is a flowchart of steps the simulation engine performs to determine whether or not to execute the if-else selection module or the while-loop iteration module.

FIG. 28 shows the steps the simulation engine performs to evaluate and execute the inactive if-else selection module or the inactive while-loop iteration module. The simulation engine checks if there is any module, which is assigned to this inactive if-else selection module or this inactive while-loop iteration module, depends on the output results of other modules that are not assigned to this inactive if-else selection module or this inactive while-loop iteration module (step 2800). If none of the modules, which are assigned to this inactive if-else selection module or this inactive while-loop iteration module, depends on the output results of other modules that are not assigned to this inactive if-else selection module or this inactive while-loop iteration module, then the simulation engine executes this inactive if-else selection module or this inactive while-loop iteration module (2802). If the simulation engine determines that there is one or more modules, which are assigned to this inactive if-else selection module or this inactive while-loop iteration module, depend on other modules that are not assigned to this inactive if-else selection module or this inactive while-loop iteration module, then the simulation engine checks whether or not data is available on each of the one or more modules (step 2804). If data is not available to one of these modules, then the simulation engine skips and does not execute this inactive if-else selection module or this inactive while-loop iteration module (2806). In other words, the simulation engine cannot execute a module in the while-loop path of the while-loop iteration module or in either the true-path or false-path of the if-else selection module if this module depends on unavailable data from outside the paths of the while-loop iteration module or the if-else selection module. Otherwise, the simulation engine executes this inactive if-else selection module or this inactive while-loop iteration module (2802).

Figure 29:
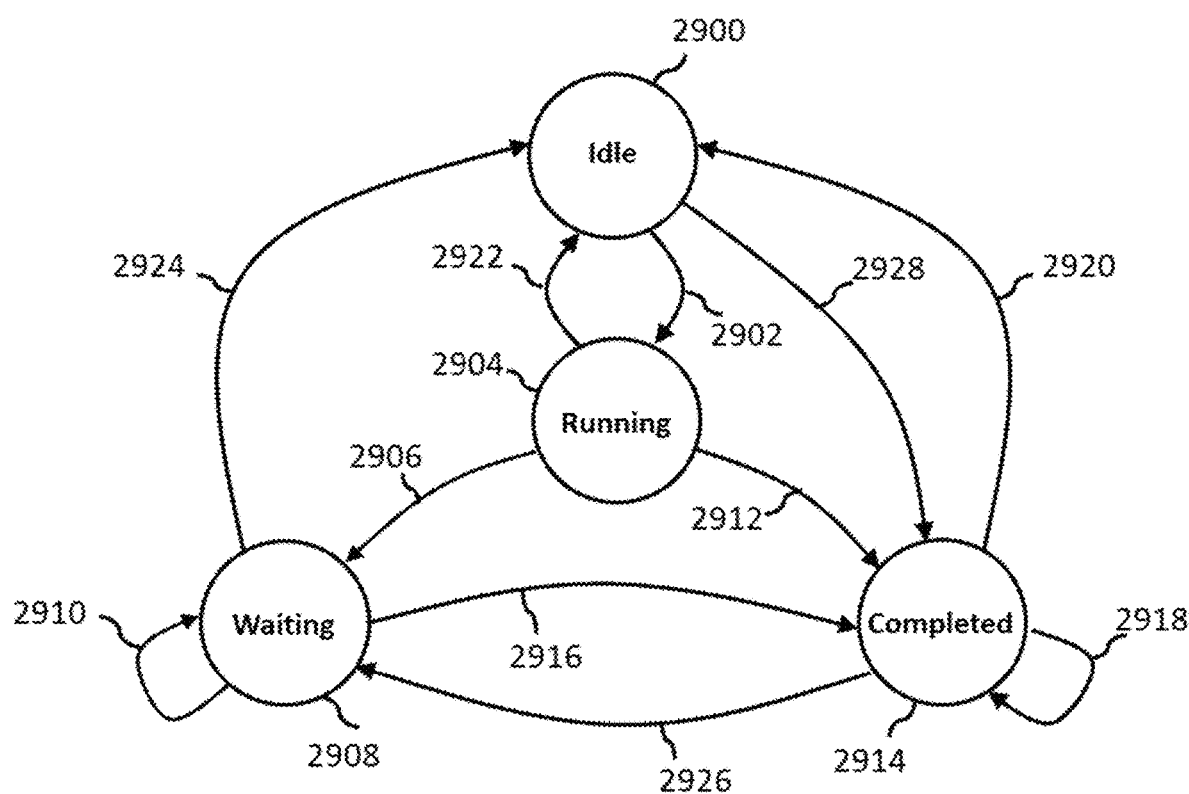
FIG. 29 shows a state diagram of a module during simulation.

FIG. 29 shows a state diagram of the states through which the module goes during the evaluation and execution operations by the simulation engine. When the simulation engine starts, the module is at its an initial "Idle" state 2900. A transition 2902 from "Idle" to a "Running" state 2904 occurs when the simulation engine is ready to evaluate the module. In this evaluation, the simulation engine scans each input port of the module to check whether or not data is available on each input port. If data is not available on any of the input ports, then a transition 2906 will occur from "Running" to a "Waiting" state 2908, and the simulation engine evaluates the next available module in the cryptography design view or sub-views. The module remains in a transition 2910 in "Waiting" state until its turn to be re-evaluated by the simulation engine.

While the module is in "Running" state 2904, if data is available on each input port, then the simulation engine will execute the module. At the end of executing the module, a transition 2912 occurs from "Running" to a "Completed" state 2914.

While the module is in "Waiting" state 2908 and the simulation engine is ready to re-evaluate the module, if data is available on each input port, then the simulation engine will execute the module. At the end of executing the module, a transition 2916 occurs from "Waiting" to "Completed" state 2914.

The module remains in a transition 2918 in "Completed" state and will be ignored by the simulation engine until the simulation engine has finished executing each module in the operational flow of the cryptosystem in the cryptography design view and sub-views. A transition 2920 occurs from "Completed" state 2914 to "Idle" state 2900 when the user re-initiates the operation of the simulation engine.

There are other transitions that occur during the execution of the module. A transition 2922 from "Running" state 2904 to "Idle" state 2900, and a transition 2924 from "Waiting" state 2908 to "Idle" state 2900 occur when the user re-initiates the operation of the simulation engine. A transition 2926 from "Completed" state 2914 to "Waiting" state 2908 occurs when the simulation engine re-evaluates a while-loop iteration module, and the outcome of the re-evaluation is the logical true. In this scenario, each module in the while-loop path of this while-loop iteration module will be re-evaluated by the simulation engine. A transition 2928 from "Idle" state 2900 to "Completed" state 2914, and transition 2916 from "Waiting" state 2908 to "Completed" state 2914 occur when the simulation engine encounters a break module assigned to a while-loop iteration module. In this case, any module in either "Idle" state 2900 or "Wait" state 2908 will be transitioned to "Completed" state 2914 so that these modules will be ignored by the simulation engine.

During simulation, the executed module whose state is transitioned to the "Completed" state is assigned a numerical value. This value gets incremented after each executed module is transitioned to the "Completed" state. This value is referred to as processed order. A module that has a processed order of zero indicates that it is not evaluated and executed.

When the simulation engine executes user-created cryptographic operation module, the processed order is initialized to zero starting from the first executed module inside this user-created cryptographic operation module. The processed order is also initialized to zero starting from the first executed module assigned to the if-else selection module. Furthermore, the processed order is initialized to zero starting from the first executed module assigned to the while-loop iteration module. When the simulation engine exits the user-created cryptographic operation module, the if-else selection module, or the while-loop iteration module, the numerical value retains its value to the one before entering the user-created cryptographic operation module, the if-else selection module, or the while-loop iteration module, respectively. In addition, when the simulation engine re-evaluates the while-loop iteration module, the numerical value retains its value to the one before entering the while-loop iteration module. The processed orders of modules in the cryptosystem are used by the code generation engine.

There are two modes of operation for the simulation engine from which the user can initiate: execute-all and step-wise modes of operation. A new initiation of the simulation engine may erase any generated outputs from previously initiated simulation engine, and ensure each module is at its initial idle state. The execute-all mode of operation may evaluate, execute, and generate output for each module in the operation flow of the cryptosystem in the cryptography design view and sub-views. The step-wise mode of operation may evaluate, execute, and generate output for one module at the user's command. User's commands may comprise the following: step-in, step-out, and step-over. User's commands may be clicking on buttons that each perform one of the step-in, step-out, and step-over commands.

The step-in command allows the user to evaluate, execute, and generate output for the next available module, whose state is either in "Idle" or "Waiting" state, in the cryptosystem. If the next available module is the user-created cryptographic operation module, then the step-in command also may allow the user to step inside the user-created cryptographic operation module and view its contents on the cryptography design sub-view. The simulation engine then may wait at the first available module inside this user-created cryptographic operation module for the user to issue the next step-wise simulation engine command.

The step-out command allows the user to evaluate, execute, and generate output for the next available module, whose state is either in "Idle" or "Waiting" state, in the cryptosystem. If the simulation engine is already inside the user-created cryptographic operation module, then the step-out command may finish executing the remaining modules in the operational flow inside the user-created cryptographic operation module, and then step outside the user-created cryptographic operation module. The simulation engine may wait at the next available module outside the user-created cryptographic operation module for the user to issue the next step-wise simulation engine command.

The step-over command allows the user to evaluate, execute, and generate output for the next available module, whose state is either in "Idle" or "Waiting" state, in the cryptosystem. If the next available module is the user-created cryptographic operation module, then the step-over command may evaluate, execute, and generate output for each module in the operational flow inside the user-created cryptographic operation module without stepping inside the user-created cryptographic operation module. The simulation engine may wait at the next available module for the user to issue the next step-wise simulation engine command.

Figure 30:
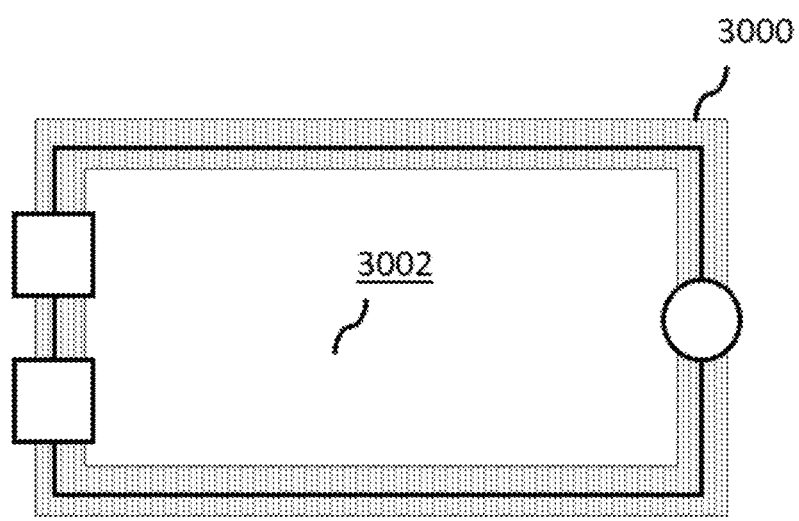
FIG. 30 shows a visual graphical indicator that may have different colors, where each color may represent a breakpoint, an evaluation step, or an executed step.

In the step-wise mode of operation, when the module is waiting to be evaluated, a visual colored graphical indicator may be displayed on or around the module by the cryptography design program. When the simulation engine finishes executing and generating output for this module, a different visual colored graphical indicator may be displayed on or around the module by the cryptography design program. The cryptography design program may turn off the visual colored graphical indicator of the module when the simulation engine starts evaluating another module or completes the simulation operation. FIG. 30 depicts visual colored graphical indicator 3000 around the perimeter of module 3002.

In the step-wise mode of operation, the user can set a breakpoint on one or more modules in the cryptography design view and sub-views. The breakpoint interrupts the operation of the simulation engine at the module that has the breakpoint, and the simulation engine waits at this module for the user to issue the next step-wise simulation engine command. The breakpoint may be added by the user as the visual colored graphical indicator on or around the module, as shown in FIG. 30. The color of the visual graphical indicator of the breakpoint may be different than the color of the visual graphical indicator of the step-wise mode of operation. The user may add or remove the breakpoint by right-mouse-click on module 3002, and select whether or not to add or remove the breakpoint. If the user selects to add the breakpoint, the cryptography design program receives such a command, and displays the visual colored graphical indicator on or around the module. If the user selects to remove the breakpoint, the cryptography design program receives such a command, and removes the visual colored graphical indictor from the module.

Cryptography Simulation Output View

Figure 31:
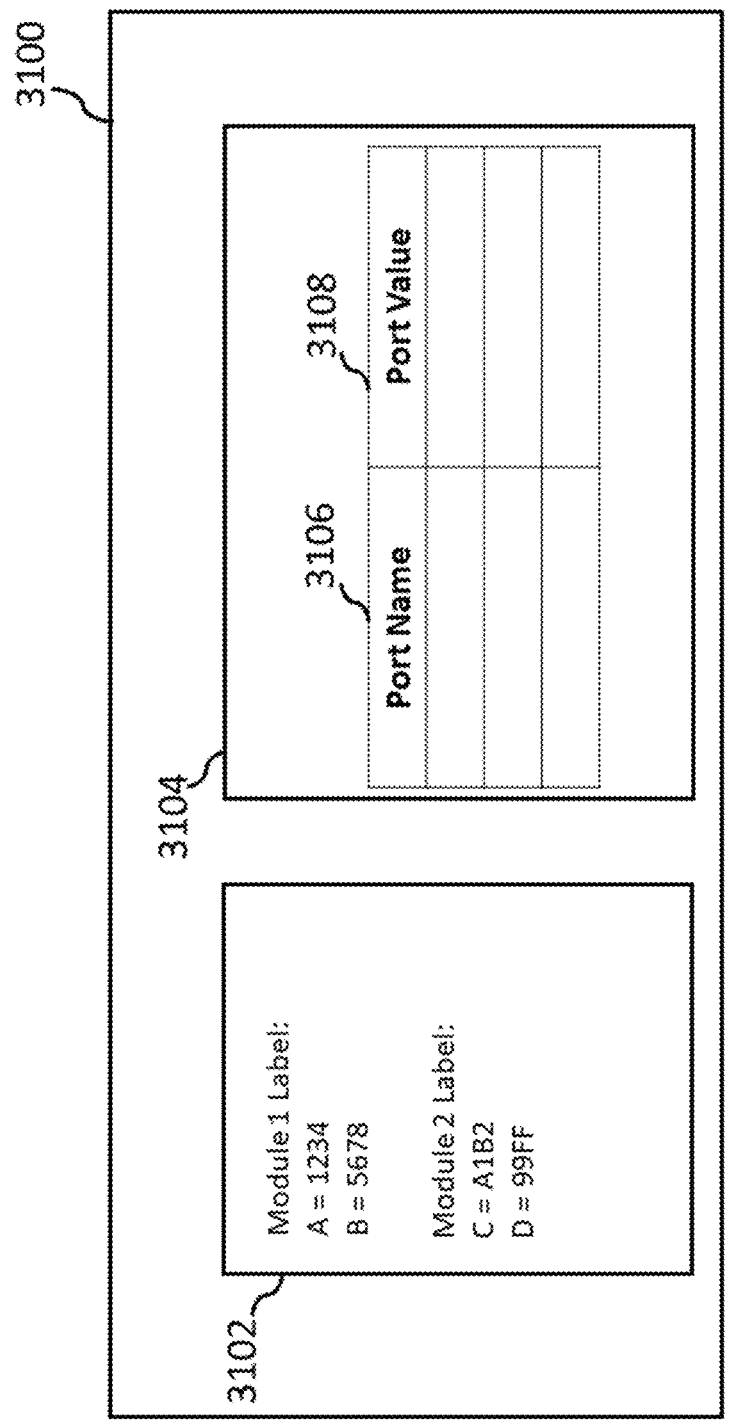
FIG. 31 is an illustration of the cryptography simulation output view having two sub-views: one is for the execute-all simulation mode of operation, the other is for step-wise simulation mode of operation.

The cryptography simulation output view displays the results of simulating one or more modules that exists in the cryptography design view and sub-views. FIG. 31 depicts cryptography simulation output view 3100 that comprises two sub-views. The user may choose to display either of the sub-views, and may switch between the two sub-views. Cryptography simulation output sub-view 3102 may display the simulation result of one or more modules during the execute-all mode of operation of the simulation engine. The display of results may be in the format of: the module identification label (the label that is provided by the user in the cryptography properties view of the module (e.g. FIG. 4 text box 406), the name and the value of each port of the simulated module. Cryptography simulation output sub-view 3102 illustrates the simulation results of a module having the module identification of "Module 1 Label", a data port named "A" with a value of "1234", and a data port named "B" with a value of "5678". Cryptography simulation output sub-view 3102 also illustrates the simulation results of another module having the module identification of "Module 2 Label", a data port named "C" with a value of "A1B2", and a data port named "D" with a value of "99FF". Cryptography simulation output sub-view 3104 is used to display the result of one module during the step-wise mode of operation. Cryptography simulation output sub-view 3104 may display the simulation result in a tabular format that comprises two columns. Column 3106 identifies the names of ports of the module under evaluation and execution. Column 3108 displays the value of each corresponding port of column 3106.

Code Generation Engine

The code generation engine translates the cryptosystem into pieces of generated code that is written in a programming language. The programming language may be the same language of the loaded software cryptography library. The operation of the code generation engine may be started by receiving a command from the user, such as clicking on a button. The code generation engine assigns each cryptographic operation module in the cryptosystem to one or more APIs of the loaded software cryptography library. The code generation engine may encapsulate the one or more APIs of the cryptographic operation module into a new API, which will be referred to as "internally-created API". The internally-created API may be written in the same programming language of the loaded software cryptography library. In addition to the utilization of the APIs of the loaded software cryptography library, a piece of generated code may comprise the following elements: (1) data structures that are defined by the loaded software cryptography library, and/or (2) operations, statements, and functions of the utilized programming language for manipulating data structures (i.e. user-defined and/or library-defined) and for controlling the flow of operation. The internally-created APIs may contain one or more of the aforementioned elements.

The code generation engine generates code according to the processed order of executed modules. The code generation engine will not generate code for modules with a processed order of zero. The processed order of executed modules inside the while-loop path of the while-loop iteration module may overlap the processed order of executed modules outside the while-loop path of the while-loop iteration module. This is due to: (1) the functional behavior of the while-loop iteration module that may include re-evaluation of its inputs, executing the break module, or executing the continue module, and (2) as described earlier, the processed order is initialized to zero when entering the while-loop path of the while-loop iteration module. Furthermore, the processed order of executed modules inside the user-created cryptographic operation module may overlap the processed order of executed modules outside the user-created cryptographic operation module. This overlap may be caused by: (1) the while-loop iteration module inside the user-created cryptographic operation module, and (2) as described earlier, the processed order is initialized to zero when entering the user-created cryptographic operation module.

Figure 32A:
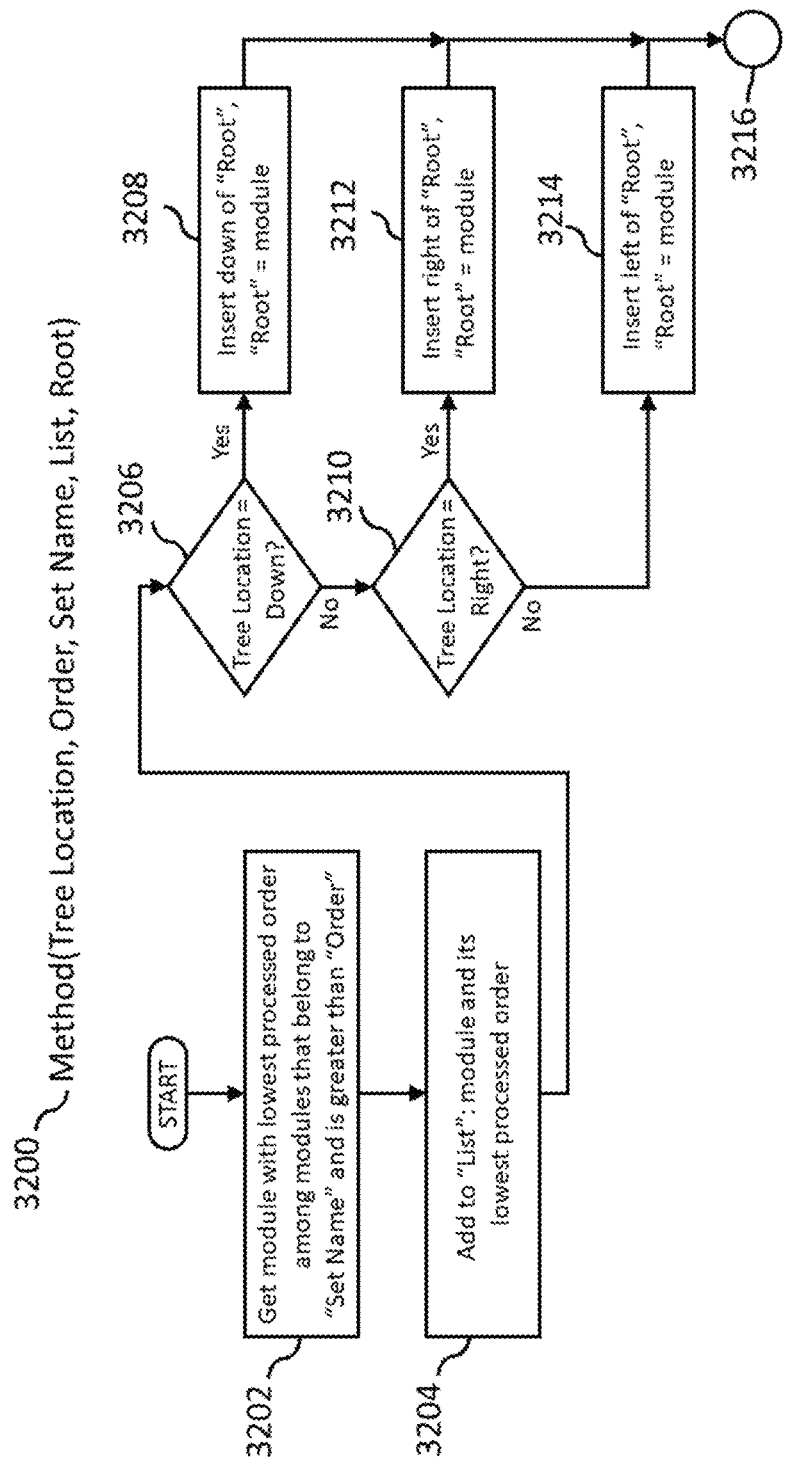
FIG. 32A is a flowchart that describes a recursive function named "Method" to create, by the code generation engine, a tree of nodes representing the sequence of executing modules in a cryptosystem.
Figure 32B:
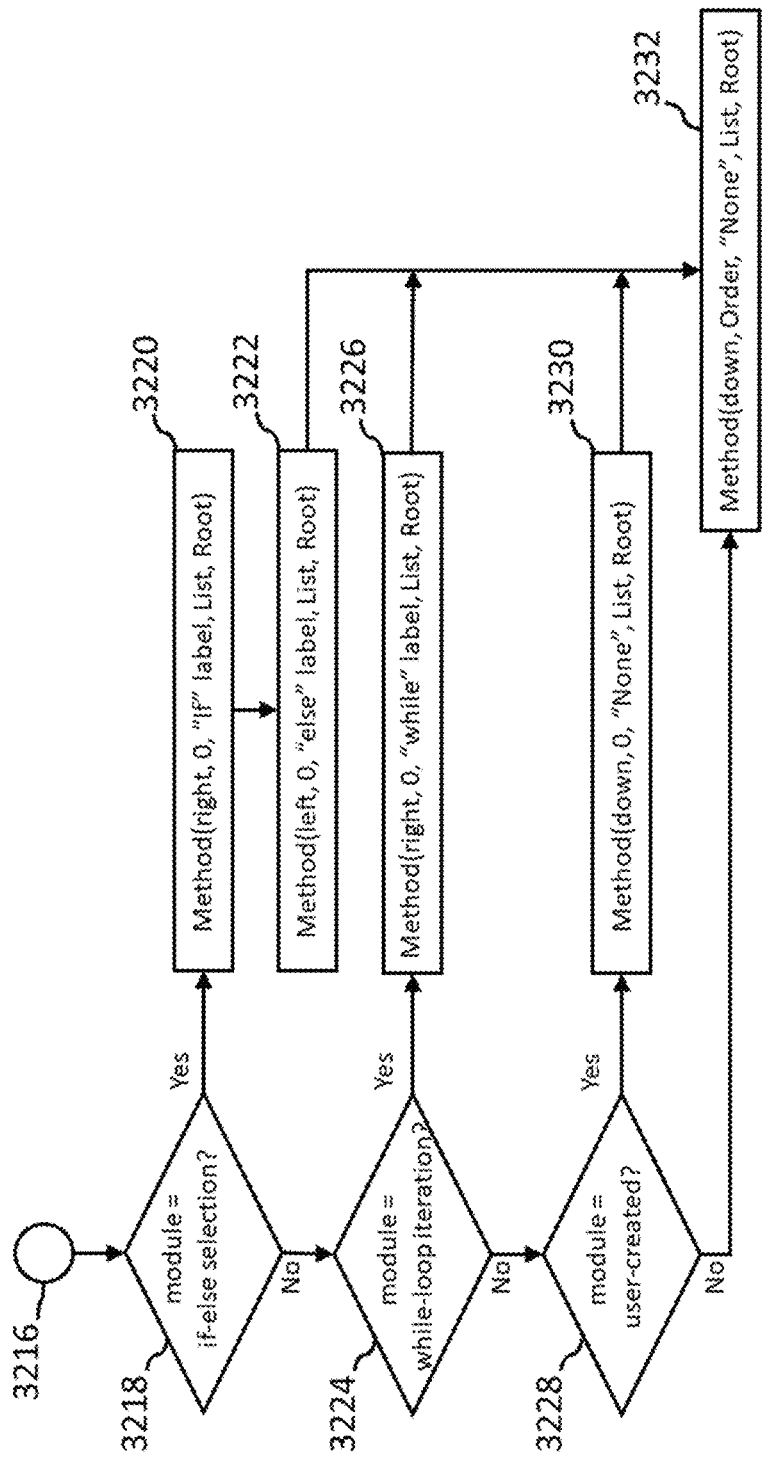
FIG. 32B is a continuation of the flowchart of FIG. 32A, where the cryptosystem may comprise if-else selection modules, while-loop iteration modules, user-created cryptographic operation modules, and other modules.

The flowcharts in FIG. 32A and FIG. 32B show the steps that the code generation engine performs to create a new ordered-list of processed orders of executed modules in the cryptosystem. These steps are performed to eliminate any overlap of processed orders. These steps create a tree of nodes. Each node contains an executed module and its processed order. A parent node may have a child node to its left. The parent node may have a child node to its right. The parent node may have a child node to its downward direction. A left-node is created when the executed module is the first executed module in the false-path of the if-else selection module. A right-node is created when the executed module is the first executed module in the true-path of the if-else selection module, or the while-loop path of the while-loop iteration module. A down-node is created otherwise.

FIG. 32A and FIG. 32B show the steps of a recursive method 3200 that takes five parameters: (1) "Tree Location", such as "down", "right", and "left", (2) "Order" that contains the current processed order value, (3) "Set Name" that contains the identification label of the true-path of the if-else selection module (e.g. FIG. 17, "If-else-TP" 1708), the identification label of the false-path of the if-else selection module (e.g. FIG. 17, "If-else-FP" 1710), the identification label of the while-loop path of the while-loop iteration module (e.g. FIG. 19 "while-TP" 1908), or "None", (4) "List" that contains the list of executed modules and their processed order, and (5) "Root" that indicates the current root node in the tree.

Initially, recursive method 3200 is called with the "Tree Location" of "down", the "Order" of zero, the "Set Name" of "None", an empty list of "List", and an empty "Root". The steps start in FIG. 32A by finding the module with the lowest processed order among all executed modules that belong to "Set Name", provided that this lowest processed order is greater than "Order" (step 3202). Once the lowest processed order module has been found, the code generation engine adds the module with the lowest processed order to list "List" (step 3204). The next decisions determine the location in the tree to add the module. The code generation engine checks whether or not the "Tree Location" is "down" (step 3206). If the "Tree Location" is "down", then the code generation engine adds the module to the tree as the child node to the downward direction of the "Root", and then assigns this child node to be the new "Root" (step 3208). If the "Tree Location" is not "down", then the code generation engine checks whether or not the "Tree Location" is "right" (step 3210). If the "Tree Location" is "right", then the code generation engine adds the module to the tree as the child node to the right of "Root", and then assigns this child node to be the new "Root" (step 3212). If the "Tree Location" is neither "down" nor "right", then the code generation engine adds the module to the tree as the child node to the left of "Root", and then assigns this child node to be the new "Root" (step 3214). The steps of the flowchart in FIG. 32A continues on to FIG. 32B via step 3216.

After adding the module to "List" and to the tree, the steps continue in FIG. 32B with several decisions. The code generation engine checks whether or not the module is the if-else selection module (step 3218). If it is the if-else selection module, then the recursive method will be called (step 3220) with the following parameters: the "Tree Location" of "right", the "Order" of zero, the "Set Name" of the true-path label of the if-else selection module, the "List", and the "Root". Once this method has completed its processing, another call of the recursive method will be called (step 3222) for the false-path of the if-else selection module. The method will be called with the following parameters: the "Tree Location" of "left", the "Order" of zero, the "Set Name of" the false-path label of the if-else selection module, the "List", and the "Root".

If the module is not the if-else selection module, then the code generation engine checks whether or not the module is the while-loop iteration module (step 3224). If it is the while-loop iteration module, then the recursive method will be called (step 3226) with the following parameters: the "Tree Location" of "right", the "Order" of zero, the "Set Name" of the while-loop path label of the while-loop iteration module, the "List", and the "Root".

If the module is not the while-loop iteration module, then the code generation engine checks whether or not the module is the user-created cryptographic operation module (step 3228). If it is the user-created cryptographic operation module, then the recursive method will be called (step 3230) with the following parameters: the "Tree Location" of "down", the "Order" of zero, the "Set Name" of "None", the "List", and the "Root".

A last step 3232 is called after step 3222, step 3226, or step 3230. The code generation engine calls the recursive method with the following parameters (step 3232): the "Tree Location" of "down", the "Order" of the lowest processed order that is obtained from step 3202, the "Set Name" of "None", the "List", and the "Root".

After creating the tree, the outcome is the "List" which represents a queue of executed modules. The code generation engine uses this queue to re-assign each executed module a code generation order according to its location in the queue. The code generation engine then generates code for each executed module in the queue, starting from the lowest code generation order. The code generation engine uses the created tree during the code generation of the executed module to determine if the executed module is in the true-path of the if-else selection module, in the false-path of the if-else selection module, in the while-loop path of the while-loop iteration module, or inside the user-created cryptographic operation module.

FIG. 33 depicts piece of generated code 3300 for a cryptographic operation module that computes the addition of two large integers. Those of ordinary skill in the art will recognize that this code is written in "C" programming language, and some of the APIs in this code are from the OpenSSL software cryptography library. This piece of generated code contains: (1) internally-created APIs 3302, 3306, 3308, and 3314 that are not part of the loaded software cryptography library, (2) data structures 3304 that are defined by the loaded software cryptography library, and (3) APIs 3310, 3312, 3316, 3318, and 3320 of the loaded software cryptography library.

Figure 34:
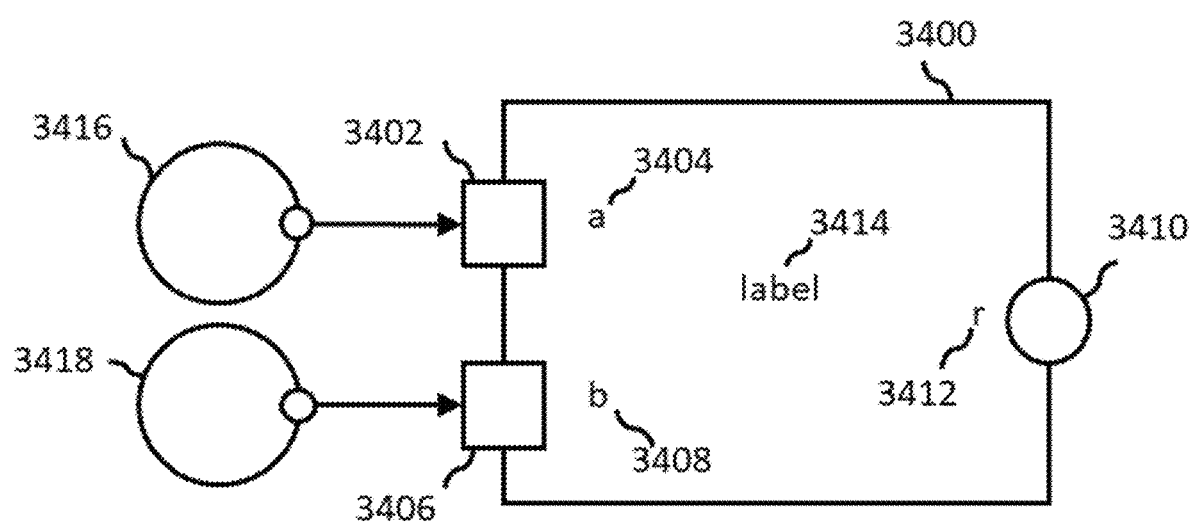
FIG. 34 shows the module that performs the addition of two large integers, and which the internally-created API in FIG. 33 represents.

FIG. 34 depicts cryptographic operation module 3400 that has mandatory input port 3402 with preassigned name "a" 3404, mandatory input port 3406 with preassigned name "b" 3408, and output port 3410 with preassigned name "r" 3412. The code generation engine generates internally-created API 3302 with a number of parameters of at least the sum of the input ports and output ports of cryptographic operation module 3400. Thus, internally-created API 3302 has at least three parameters. Each of these three parameters has a parameter name. The code generation engine uses the same input port name "a" 3404, input port name "b" 3408, and output port name "r" 3412 as the parameters' names in internally-created API 3302. Thus, internally-created API 3302 has parameters "a", "b", and "r". The code generation engine may also include additional parameters to aid in the utilization of internally-created API 3302. Those of ordinary skill in the art will recognize that "alength", "bLength", and "rLength" in internally-created API 3302 represent the length of "a", "b", and "r", respectively; and the "errReason" may provide a descriptive error or an error code in the event there is an error in processing internally-created API 3302. Thus, input port 3402 provides data to the corresponding parameter "a", which in turn provides this data to the one or more APIs inside internally-created API 3302. Input port 3406 provides another data to the corresponding parameter "b", which in turn provides this another data to the one or more APIs inside internally-created API 3302. Output port 3410 reads the outcome data from the one or more APIs inside internally-created API 3302 via the corresponding parameter "r". Thus, the generated internally-created API of the module may have a first subset of parameters that provides data from input ports of this module to inside the generated internally-created API, and a second subset of parameters that provide data to output ports of this module from inside the generated internally-created API.

A real value that is passed to one of these parameters is referred to as an argument. The argument may be in a form of a programming-language variable name that holds the real value. The argument may be passed via a programming-language call. When internally-created API 3302 is called by the code generation engine from another API; from another generated internally-created API, or from a programming-language function, the code generation engine determines how each of the parameters of the called internally-created API is assigned an argument with a constructed name. The code generation engine may have two setups for constructing the name of the argument. In the first setup, if the input port of the cryptographic operation module is connected to the external input source module, then the corresponding parameter of the internally-created API will be assigned the argument with a name constructed as follows: the input port name followed by the module identification of the cryptographic operation module (if it is provided by the user in the cryptography properties view of the cryptographic operation module) followed by the code generation order of this cryptographic operation module. FIG. 35 depicts piece of generated code 3500 that is generated from FIG. 34 for internally-created API 3302. A called internally-created API 3502 is inside the main-routine of "C" programming language. Assuming the code generation order of cryptographic operation module 3400 is "1" and the module identification for this module is provided by the user as "label" 3414, the code generation engine passes "a_label_1" as argument 3504, "b_label_1" as argument 3506, and "r_label_1" as argument 3508 to the called internally-created API 3502. The code generation engine also generates code for external input source modules 3416 and 3418. A programming-language variable is created whose constructed name matches the constructed name of the argument that is passed to the called internally-created API 3502 in FIG. 35. FIG. 36 depicts piece of generated code 3600 that is generated from FIG. 34. Programming-language input variable "a_label_1" 3602 is associated with input port 3402 whose module 3400 is connected to external input source module 3416, and is assigned a value 3604, Value 3604 is provided by the user via the cryptography properties view of external input source module 3416. Programming-language input variable "b_label_1" 3606 is associated with input port 3406 whose module 3400 is connected to external input source module 3418, and is assigned a value 3608. Value 3608 is provided by the user via the cryptography properties view of external input source module 3418. Programming-language output variable "r_label_1" 3610 is associated with output port 3410 and will be assigned a value when generated code 3500 is executed by the user outside the environment of the embodiment and, therefore, it will be set to the unassigned C-keyword of NULL.

Figure 37:
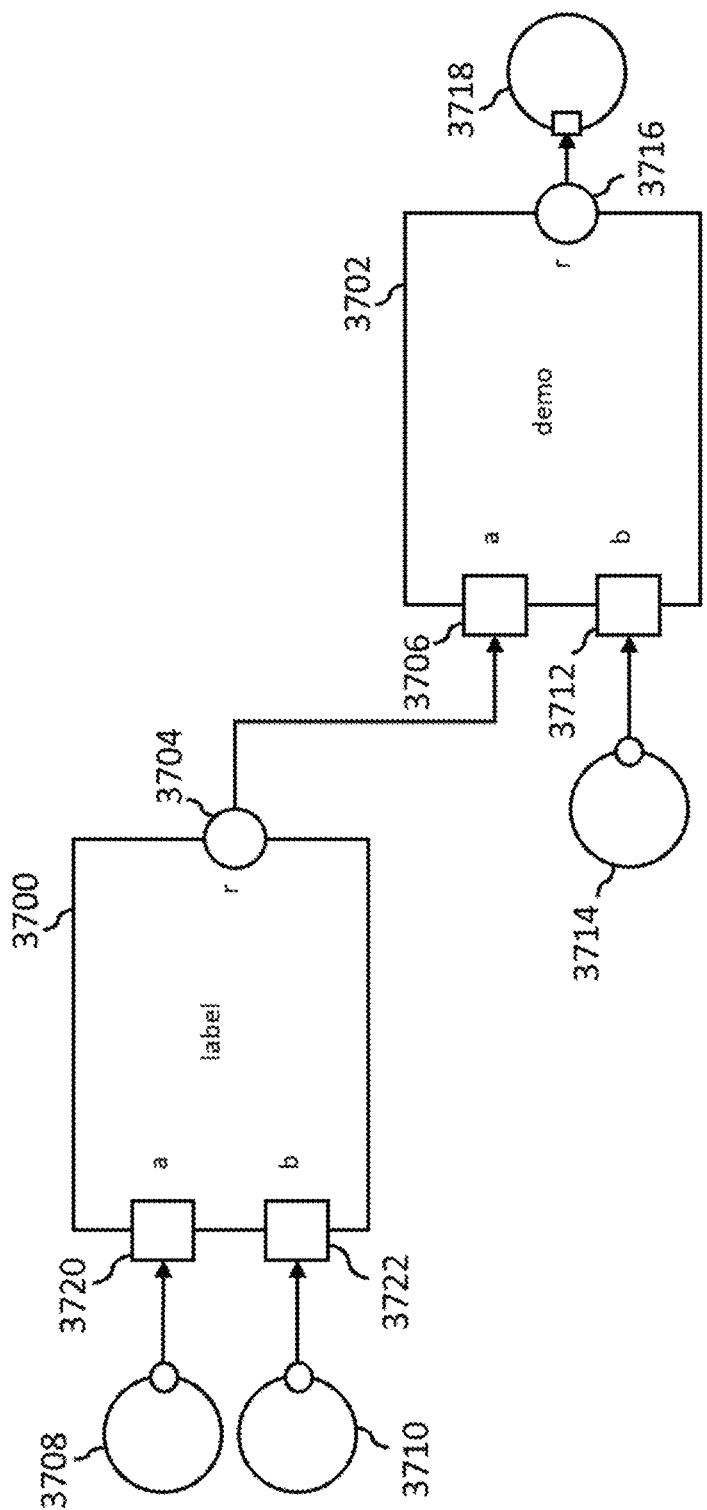
FIG. 37 is an illustration of two connected modules, where both perform the addition of two large integers.

In the second setup, if the input port of the cryptographic operation module is connected to another cryptographic operation module; then the corresponding parameter of the internally-created API will be assigned an argument with a name constructed as follows: use the name of the parameter or the name of the constructed argument from the other cryptographic operation module. FIG. 37 depicts cryptographic operation module 3700 connected to cryptographic operation module 3702. The connection is between input port 3706 and output port 3704. Cryptographic operation module 3700 performs the addition of two large integers. Cryptographic operation module 3702 also performs the additions of two large integers. Thus, the same internally-created API 3302 of FIG. 33 is utilized for cryptographic operation module 3700 and cryptographic operation module 3702. FIG. 38 depicts piece of generated code 3800 that is generated from FIG. 37. Called internally-created API 3802 and called internally-created API 3804 are inside the main-routine of "C" programming language. Called internally-created API 3802 is for cryptographic operation module 3700. Called internally-created API 3804 is for cryptographic operation module 3702. The code generation engine passes arguments to called internally-created API 3802 and called internally-created API 3804 in the following two steps, and assuming the code generation order of cryptographic operation 3700 is "1", the code generation order of cryptographic operation module 3702 is "2", and the user provided the module identification of "label" to cryptographic operation module 3700, and the module identification of "demo" to cryptographic operation module 3702. In the first step, the arguments of called internally-created API 3802 are assigned names as described previously for FIG. 35 since the input ports of cryptographic operation module 3700 are connected to external input source module 3708 and external input source module 3710. In the second step, the code generation engine passes a constructed name "r_label_1" as argument 3806 since the value of parameter "a" of internally-created API 3302 is the output from output port 3704. The code generation engine passes a constructed name "b_demo_2" as argument 3808 since input port 3712 is connected to external input source module 3714. The code generation engine assigns a constructed name "r_demo_2" as argument 3810 to called internally-created API 3804 since output port 3716 is connected to external output destination module 3718.

The code generation engine also generates code for external input source module 3708, external input source module 3710, and external input source module 3714. FIG. 39 depicts piece of generated code 3900 that is generated from FIG. 37. Programming-language input variable "a_label_1" 3902 is associated with input port 3720 whose module 3700 is connected to external input source module 3708, and is assigned a value 3904. Value 3904 is provided by the user via the cryptography properties view of external input source module 3708. Programming-language input variable "b_label_1" 3906 is associated with input port 3722 whose module 3700 is connected to external input source module 3710, and is assigned a value 3908. Value 3908 is provided by the user via the cryptography properties view of external input source module 3710. Programming-language output variable "r_label_1" 3910 is associated with output port 3704, and will be assigned a value when generated code 3800 is executed by the user outside the environment of the embodiment and, therefore, it will be set to the unassigned C-keyword of NULL. Programming-language input variable "b_demo_2" 3912 is associated with input port 3712 whose module 3702 is connected to external input source module 3714, and is assigned a value 3914. Value 3914 is provided by the user via the cryptography properties view of external input source module 3714. Finally, programming-language output variable "r_demo_2" 3916 is associated with output port 3716, and will be assigned a value when generated code 3800 is executed by the user outside the environment of the embodiment and, therefore, it will be set to the unassigned C-keyword of NULL.

The embodiment may be a computer program product and/or a method. The computer program product may include a computer readable storage medium (or media) having computer readable program instructions thereon for causing one or more processors to carry out aspects of the embodiment described in the specification and Figures. The computer readable storage medium can be a tangible device, such as, but not limited to, read-only memory (ROM), optical storage devices (e.g. CD ROM, DVD), erasable programmable read-only memory (e.g. Flash memory), (random-access memory) RAM, memory stick, or any other computer-readable storage media that is capable of storing digital information or program instructions. The computer readable storage medium is not to be construed as being transitory signals per se.

Computer readable program instructions for carrying out aspects of the embodiment may be source code written in any combination of one or more of high-level or low-level programming languages such as the "C#" programming language, the "C" programming language, or assembly instructions, or the like.

Computer readable program instructions may execute entirely on a computing device, such as the user's computer, a remote computer, a remote server or a Cloud-based server. Computer readable program instructions may execute partially on several computing devices. The remote computer or the remote server or the Cloud-based server may be connected to the user's computer through the Internet, a local area network (LAN), a wide area network (WAN), or the like. Computer readable program instructions may be a portable application or a standalone software.

The sequence of steps of the disclosed method in aspects of the embodiment and the illustrative flowcharts are not to be interpreted to perform the exclusive sequence of steps possible within the scope of the embodiment. Furthermore, steps of the method may be performed in parallel to perform their described functionality.

The descriptions and all matter contained in the descriptions or shown in the accompanying figures of the embodiment have been presented for purposes of illustration, but are not to be interpreted to be exhaustive or limited to the disclosed embodiment. Various modifications, additions, substitutions, and the like will be apparent to those of ordinary skill in the art without departing from the scope of the embodiment. The terminologies used herein was selected to explain the embodiment and to enable those of ordinary skill in the art to understand the embodiment.

What is claimed is:

1. A computer program product for designing, simulating, and generating code for a cryptosystem, the computer program product comprising:

one or more non-transitory tangible computer-readable storage media and program instructions stored on at least one of the one or more non-transitory tangible computer-readable storage media, the program instructions comprising:

a. program instructions to receive, by a software cryptography library management program, a software cryptography library from a computing system having a first storage device, and wherein the software cryptography library is provided by a user via a graphical user interface, stored in the first storage device, and having a plurality of application programming interfaces;

b. based on the received software cryptography library, program instructions to display, by a cryptography toolbox program, to the user a plurality of cryptographic operation modules in a cryptography toolbox view, wherein the cryptographic operation modules each having a cryptographic operation, and wherein the cryptographic operation is performed by one or more of the application programming interfaces;

c. program instructions to receive and to place, by a cryptography design program, one or more selected cryptographic operation modules from the cryptography toolbox view into a cryptography design view, wherein the one or more selected cryptographic operation modules each is selected by the user via the graphical user interface, wherein the cryptography design view having a drawing area for placing and displaying the one or more selected cryptographic operation modules, wherein the one or more selected cryptographic operation modules each having a preassigned one or more first input ports and a preassigned one or more first output ports, wherein the one or more first input ports and the one or more first output ports each having a preassigned name and a graphical shape that overlays their cryptographic operation module, wherein the one or more first input ports each is preassigned to be a first mandatory input port or a first discretionary input port, wherein the one or more selected cryptographic operation modules each having a first position in the drawing area, and wherein the first position is provided by the user via the graphical user interface;

d. program instructions to assign, by a cryptography properties program, a first cryptography properties view to each of the one or more selected cryptographic operation modules;

e. program instructions to receive, by the cryptography properties program, a selected functional behavior for each of the one or more selected cryptographic operation modules in the drawing area, and wherein the selected functional behavior is graphically selected by the user via the graphical user interface from one or more functional behaviors in the first cryptography properties view;

f. program instructions to display, by the cryptography toolbox program, to the user an external input source module in the cryptography toolbox view;

g. program instructions to receive and to place, by the cryptography design program, one or more external input source modules from the cryptography toolbox view into the drawing area, wherein the one or more external input source modules each is selected by the user in the cryptography toolbox view via the graphical user interface, each having one or more second output ports, and each having a second position in the drawing area, and wherein the second position is provided by the user via the graphical user interface;

h. program instructions to assign, by the cryptography properties program, a second cryptography properties view to each of the one or more external input source modules, wherein the second cryptograph properties view having a plurality of first data-entry fields, wherein the first data-entry fields each having a first content that is provided by the user via the graphical user interface, and wherein the first content is available via the one or more second output ports;

i. program instructions to receive, by the cryptography design program, first graphical connections among the one or more external input source modules and the one or more selected cryptographic operation modules to form a design of the cryptosystem, wherein the design is articulated by the user, and wherein the first graphical connections are provided by the user via the graphical user interface;

j. program instructions to receive, by a simulation engine, a first command to start a first operation of the simulation engine, wherein the first command is initiated by the user via the graphical user interface, and wherein the first operation comprises:
- A. program instructions to load, by the simulation engine, the software cryptography library;
- B. program instructions to evaluate, by the simulation engine, whether or not each of the first input ports of the one or more selected cryptographic operation modules is provided with a first data;
- C. based on the evaluation of the one or more selected cryptographic operation modules, program instructions to assign, by the simulation engine, the one or more selected cryptographic operation modules to one or more application programming interfaces from the loaded software cryptography library;
- D. program instructions to execute, by the simulation engine, one or more of the one or more selected cryptographic operation modules, each using the assigned one or more application programming interfaces, the provided first data, and the selected functional behavior; and
- E. program instructions to display, by the cryptography design program, a first visual graphical indicators on or around the one or more selected cryptographic operation modules, wherein the first visual graphical indicators each having different colors, and wherein each color represents a breakpoint assigned by the user, an evaluation step performed by the simulation engine, and an execution step performed by the simulation engine; and k. program instructions to receive, by a simulation output program, execution results from the simulation engine for the one or more selected cryptographic operation modules, and wherein the execution results are displayed by the simulation output program in a simulation output view;

l. program instructions to receive, by a code generation engine, a second command to start a second operation of the code generation engine for generating code for the cryptosystem in the same programming language of the loaded software cryptography library, wherein the second command is initiated by the user via the graphical user interface, and wherein the second operation comprises:
- A. program instructions to create a queue of executed cryptographic operation modules, and wherein the executed cryptographic operation modules each is assigned, by the code generation engine, to the one or more of the application programming interfaces and to a code generation order;
- B. program instructions to create a first internally-created application programming interface for a queued executed cryptographic operation module, wherein the first internally-created application programming interface having one or more parameters of at least the sum of the number of the preassigned one or more first input ports and the number of the preassigned one or more first output ports, wherein the first internally-created application programming interface comprises the one or more of the application programming interfaces, wherein the one or more parameters each having a parameter name, a first subset of parameters and a second subset of parameters, wherein the first subset of parameters each provides a second data to the one or more of the application programming interfaces, wherein the second data is provided by one of the preassigned one or more first input ports whose preassigned name matches the parameter name of a first corresponding parameter from the first subset of parameters, wherein the second subset of parameters each provides a third data to one of the preassigned one or more first output ports whose preassigned name matches the parameter name of a second corresponding parameter from the second subset of parameters, and wherein the third data is provided by the one or more of the application programming interfaces, whereby the user conveniently learns cryptography, experiments with cryptography, and designs, simulates, generates code, and validates the cryptosystem using graphical representations of cryptographic operations and the loaded software cryptography library.

2. The computer program product of claim 1, wherein the second operation further comprising:
- a. program instructions to create a programming-language call of the first internally-created application programming interface, and wherein the programming-language call passes one or more arguments to the first internally-created application programming interface;
- b. program instructions to assign a first constructed name to each of the one or more arguments, under a first setup or a second setup, wherein the first constructed name in the first setup is constructed using the preassigned name, followed by a module identification identifying the queued executed cryptographic operation module, followed by the code generation order of the queued executed cryptographic operation module, wherein the module identification is optionally provided by the user, wherein the second setup provides a fourth data from a constructed argument from a second internally-created application programming interface, wherein the constructed argument has a second constructed name, and wherein the first constructed name in the second setup is constructed using the second constructed name;
- c. program instructions to create one or more programming-language input variables for the queued executed cryptographic operation module, wherein the one or more programming-language input variables each having an associated input port from the first input ports, and each having a third constructed name, wherein the third constructed name is constructed using the preassigned name of the associated input port, followed by the module identification of the queued executed cryptographic operation module, followed by the code generation order of the queued executed cryptographic operation module, and wherein the programming-language input variables each is assigned the second data if the associated input port is connected to the external input source module; and
- d. program instructions to create one or more programming-language output variables for the queued executed cryptographic operation module, wherein the one or more programming-language output variables each having an associated output port from the first output ports, and each having a fourth constructed name, and wherein the fourth constructed name is constructed using the preassigned name of the associated output port, followed by the module identification of the queued executed cryptographic operation module, followed by the code generation order of the queued executed cryptographic operation module.

3. The computer program product of claim 1, wherein program instructions further comprising:

a. program instructions to display, by the cryptography toolbox program, to the user a no-connection module in the cryptography toolbox view;
b. program instructions to receive and to place, by the cryptography design program, the no-connection module from the cryptography toolbox view into the drawing area, wherein the no-connection module is selected by the user in the cryptography toolbox view via the graphical user interface, having a third output port, and having a third position in the drawing area, and wherein the third position is provided by the user via the graphical user interface; and
c. program instructions to receive, by the cryptography design program, a second graphical connection between the third output port and a second discretionary input port of a first module in the drawing area, wherein the second discretionary input port and the first module are selected by the user via the graphical user interface, wherein the second graphical connection is provided by the user via the graphical user interface, and wherein the no-connection module provides a null data to the second discretionary input port.

4. The computer program product of claim 3, wherein program instructions further comprising:
a. program instructions to display, by the cryptography toolbox program, to the user a memory module in the cryptography toolbox view;
b. program instructions to receive and to place, by the cryptography design program, the memory module from the cryptography toolbox view into the drawing area, wherein the memory module is selected by the user in the cryptography toolbox view via the graphical user interface, and having a fourth position in the drawing area, wherein the fourth position is provided by the user via the graphical user interface, and wherein the memory module comprising:
   A. an assigned third cryptography properties view by the cryptography properties program, wherein the assigned third cryptography properties view having a second data-entry field for the user to provide a first identification label for identifying a virtual memory location of the memory module, wherein the virtual memory location having a second content, and wherein the second content is provided by the user or by a second module in the drawing area;
   B. a fourth output port; and
   C. a third discretionary input port;
c. program instructions to execute, by the simulation engine, write and read operations on the virtual memory location if the third discretionary input port is graphically connected, by the user via the graphical user interface, to the second module that provides a fourth data, wherein the memory module overwrites the second content with the fourth data in the virtual memory location, and wherein the fourth data in the virtual memory location is available for reading on the fourth output port; and
d. program instructions to execute, by the simulation engine, a read-only operation on the virtual memory location if the third discretionary input port is graphically connected, by the user via the graphical user interface, to the no-connection module, and wherein the second content of the virtual memory location is available for reading on the fourth output port.

5. The computer program product of claim 4, wherein program instructions further comprising:

a. program instructions to display, by the cryptography toolbox program, to the user a while-loop iteration module in the cryptography toolbox view;
b. program instructions to receive and to place, by the cryptography design program, the while-loop iteration module from the cryptography toolbox view into the drawing area, wherein the while-loop iteration module is selected by the user in the cryptography toolbox view via the graphical user interface, represents a while-loop path of a while-loop iteration statement, and having a fifth position in the drawing area, wherein the fifth position is provided by the user via the graphical user interface, and wherein the while-loop iteration module in the drawing area comprising:
   A. a second mandatory input port;
   B. a third mandatory input port;
   C. a first memory module for storing a fifth data provided by the second mandatory input port, wherein the first memory module having a second identification label for its virtual memory location, wherein the virtual memory location of the first memory module having a third content, wherein the third content is updated with a sixth data if a third module inside the while-loop path of the while-loop iteration module is connected to a second memory module having the same second identification label of the first memory module, and wherein the third module writes the sixth data into the second memory module;
   D. a third memory module for storing a seventh data provided by the third mandatory input port, wherein the third memory module having a third identification label for its virtual memory location, wherein the virtual memory location of the third memory module having a fourth content, wherein the fourth content is updated with an eighth data if a fourth module inside the while-loop path of the while-loop iteration module is connected to a fourth memory module having the same third identification label of the virtual memory location of the third memory module, and wherein the fourth module writes the eighth data into the fourth memory module;
   E. an assigned fourth cryptography properties view by the cryptography properties program, wherein the assigned fourth cryptography properties view comprises a data-selection field for the user to select a comparison operation, wherein the comparison operation is used by the simulation engine to compare the fifth data with the seventh data in one iteration, and to compare the sixth data with the eighth data in the next iteration, and wherein the assigned fourth cryptography properties view having a third data-entry field for the user to provide the second identification label for the virtual memory location of the first memory module, and having a fourth data-entry field for the user to provide the third identification label for the virtual memory location of the third memory module; and
   F. a fifth output port for holding the outcome of executing the comparison operation by the simulation engine,
whereby the while-loop iteration module performs comparison operations using the contents of its internal first memory module and internal third memory module, such that the contents can be updated by other modules, in the cryptosystem, that are graphically connected to other memory modules having the same identification label as the first memory module and/or the third memory module.

6. The computer program product of claim 5, wherein program instructions further comprising:
   a. program instructions to display, by the cryptography toolbox program, to the user a break module in the cryptography toolbox view;
   b. program instructions to receive and to place, by the cryptography design program, the break module from the cryptography toolbox view into the drawing area, wherein the break module is selected by the user in the cryptography toolbox view via the graphical user interface, having a fourth mandatory input port, is placed in the while-loop path of the while-loop iteration module, and having a sixth position in the drawing area, and wherein the sixth position is provided by the user via the graphical user interface; and
   c. program instructions to receive, by the cryptography design program, a third graphical connection between the fourth mandatory input port and a sixth output port of a fifth module in the drawing area, wherein the sixth output port and the fifth module are selected by the user via the graphical user interface, wherein the fifth module is placed, by the cryptography design program, in the while-loop path of the while-loop iteration module, wherein the third graphical connection is provided by the user via the graphical user interface, and wherein the break module indicates the termination of the while-loop path of the while-loop iteration module after executing the fifth module by the simulation engine.

7. The computer program product of claim 5, wherein program instructions further comprising:
   a. program instructions to display, by the cryptography toolbox program, to the user a continue module in the cryptography toolbox view;
   b. program instructions to receive and to place, by the cryptography design program, the continue module from the cryptography toolbox view into the drawing area, wherein the continue module is selected by the user in the cryptography toolbox view via the graphical user interface, having a fourth mandatory input port, is placed in the while-loop path of the while-loop iteration module, and having a sixth position in the drawing area, and wherein the sixth position is provided by the user via the graphical user interface; and
   c. program instructions to receive, by the cryptography design program, a third graphical connection between the fourth mandatory input port and a sixth output port of a fifth module in the drawing area, wherein the sixth output port and the fifth module are selected by the user via the graphical user interface, wherein the third graphical connection is provided by the user via the graphical user interface, wherein the fifth module is placed, by the cryptography design program, in the while-loop path of the while-loop iteration module, wherein the continue module indicates a last operation in the while-loop path of the while-loop iteration module after executing the fifth module by the simulation engine, and forces the while-loop iteration module to perform another comparison on the contents of the first memory module and the third memory module using the comparison operation.

8. The computer program product of claim 5, wherein program instructions further comprising:
   a. program instructions to receive, by the cryptography properties program, a fourth identification label, wherein the fourth identification label is assigned by the cryptography properties program to the while-loop path of the while-loop iteration module in the drawing area, and wherein the assigned fourth cryptography properties view of the while-loop iteration module having a fifth data-entry field for the user to provide the fourth identification label via the graphical user interface;
   b. program instructions to receive, by the cryptography design program, a third command to display a list having the fourth identification label, wherein the third command is initiated by the user via the graphical user interface, wherein the list is displayed on or around a fifth module in the drawing area, and wherein the fifth module is selected by the user via the graphical user interface;
   c. program instructions to assign, by the cryptography design program, the fifth module to none or the fourth identification label, and wherein the none or the fourth identification label is selected by the user from the list via the graphical user interface; and
   d. program instructions to display, by the cryptography design program, a second visual graphical indicator on or around the fifth module, and wherein the second visual graphical indicator having the selected fourth identification label,
   whereby the user visually identifies modules that are assigned and placed in the while-loop path of the while-loop iteration module in the drawing area, with the absence of graphical connections between the while-loop iteration module and these modules in the drawing area.

9. The computer program product of claim 1, wherein program instructions further comprising:
   a. program instructions to display, by the cryptography toolbox program, to the user an if-else selection module in the cryptography toolbox view;
   b. program instructions to receive and to place, by the cryptography design program, the if-else selection module from the cryptography toolbox view into the drawing area, wherein the if-else selection module is selected by the user in the cryptography toolbox view via the graphical user interface, represents an if-else true-path and if-else false-path of an if-else selection statement, and having a third position in the drawing area, wherein the third position is provided by the user via the graphical user interface, and wherein the if-else selection module in the drawing area comprising:
      A. a second mandatory input port;
      B. a third mandatory input port;
      C. an assigned third cryptography properties view by the cryptography properties program, wherein the assigned third cryptography properties view comprises a data-selection field for the user to select a comparison operation, and wherein the comparison operation is used by the simulation engine to compare a fourth data on the second mandatory input port with a fifth data on the third mandatory input port; and
      D. a third output port for holding the outcome of executing the comparison operation by the simulation engine.

10. The computer program product of claim 9, wherein program instructions further comprising:
    a. program instructions to receive, by the cryptography properties program, a first identification label, wherein the first identification label is assigned by the cryptography properties program to the if-else true-path of the if-else selection module in the drawing area, and wherein the assigned third cryptography properties view of the if-else selection module having a second data-entry field for the user to provide the first identification label via the graphical user interface;

b. program instructions to receive, by the cryptography properties program, a second identification label, wherein the second identification label is assigned by the cryptography properties program to the if-else false-path of the if-else selection module in the drawing area, and wherein the assigned third cryptography properties view of the if-else selection module having a third data-entry field for the user to provide the second identification label via the graphical user interface;

c. program instructions to receive, by the cryptography design program, a third command to display a list having the first identification label and the second identification label, wherein the third command is initiated by the user via the graphical user interface, wherein the list is displayed on or around a module in the drawing area, and wherein the module is selected by the user via the graphical user interface;

d. program instructions to assign, by the cryptography design program, the module to none, the first identification label, or the second identification label, and wherein the none, the first identification label, or the second identification label is selected by the user from the list via the graphical user interface; and e. program instructions to display, by the cryptography design program, a second visual graphical indicator on or around the module, and wherein the second visual graphical indicator having the selected first identification label or the selected second identification label, whereby the user visually identifies modules in the if-else true-path and the if-else false-path of the if-else selection module in the drawing area, with the absence of graphical connections between the if-else selection module and these modules in the drawing area.

11. The computer program product of claim 1, wherein program instructions to receive, by a cryptography module creation engine, a third command to start a third operation of the cryptography module creation engine for creating a user-created cryptographic operation module from the cryptosystem in the drawing area, wherein the third command is initiated by the user via the graphical user interface, wherein the cryptosystem comprises of interconnected modules, wherein the interconnected modules combined having one or more second input ports and one or more third output ports, and wherein the third operation further comprising:

a. program instructions to generate one or more third input ports for the user-created cryptographic operation module;

b. program instructions to map each of the one or more third input ports to one of the one or more second input ports that are connected to one or more of the external input source module, wherein the one or more third input ports each is determined to be a second mandatory input port or a second discretionary input port, and each having a first name, wherein the first name is constructed using a first label followed by a first numerical value, wherein the first label is obtained from the one or more second input ports having the first label, and wherein the first numerical value is computed as an increment of a first largest numerical value among all names of the one or more second input ports having the first label, and among all names of the third input ports having the first label;

c. program instructions to generate one or more fourth output ports for the user-created cryptographic operation module;

d. program instructions to map each of the one or more fourth output ports to one of the one or more third output ports, wherein the one or more fourth output ports each having a second name, wherein the second name is constructed using a second label followed by a second numerical value, wherein the second label is obtained from the one or more third output ports having the second label, and wherein the second numerical value is computed as an increment of a second largest numerical value among all names of the one or more third output ports having the second label, and among all names of the one or more fourth output ports having the second label;

e. program instructions to create, by the cryptography module creation engine, a third cryptography properties view for the user-created cryptographic operation module, wherein the third cryptography properties view having a data-selection field comprising one or more data-selection items for the user, wherein the data-selection items each is assigned to one of the one or more fourth output ports, and wherein the simulation output view displays a fourth data of one of the one or more fourth output ports if the user selects the data-selection item that is assigned to the one of the one or more fourth output ports; and f. program instructions to store, by the cryptography module creation engine, the user-created cryptographic operation module in a second storage device, wherein the cryptography toolbox program retrieves the user-created cryptographic operation module from the second storage device, and wherein the cryptography toolbox program displays to the user in the cryptography toolbox view the user-created cryptographic operation module.

12. A method for designing, simulating, and generating code for a cryptosystem, the method comprising:

a. receiving, by a software cryptography library management program, a software cryptography library from a computing system having a first storage device, and wherein the software cryptography library is provided by a user via a graphical user interface, stored in the first storage device, and having a plurality of application programming interfaces;

b. based on the received software cryptography library, displaying, by a cryptography toolbox program, to the user a plurality of cryptographic operation modules in a cryptography toolbox view, wherein the cryptographic operation modules each having a cryptographic operation, and wherein the cryptographic operation is performed by one or more of the application programming interfaces;

c. receiving and placing, by a cryptography design program, one or more selected cryptographic operation modules from the cryptography toolbox view into a cryptography design view, wherein the one or more selected cryptographic operation modules each is selected by the user via the graphical user interface, wherein the cryptography design view having a drawing area for placing and displaying the one or more selected cryptographic operation modules, wherein the one or more selected cryptographic operation modules each having a preassigned one or more first input ports and a preassigned one or more first output ports, wherein the one or more first input ports and the one or more first output ports each having a preassigned name and a graphical shape that overlays their cryptographic operation module, wherein the one or more first input ports each is preassigned to be a first mandatory input port or a first discretionary input port, wherein the one or more selected cryptographic operation modules each having a first position in the drawing area, and wherein the first position is provided by the user via the graphical user interface;

d. assigning, by a cryptography properties program, a first cryptography properties view to each of the one or more selected cryptographic operation modules;

e. receiving, by the cryptography properties program, a selected functional behavior for each of the one or more selected cryptographic operation modules in the drawing area, and wherein the selected functional behavior is graphically selected by the user via the graphical user interface from one or more functional behaviors in the first cryptography properties view;

f. displaying, by the cryptography toolbox program, to the user an external input source module in the cryptography toolbox view;

g. receiving and placing, by the cryptography design program, one or more external input source modules from the cryptography toolbox view into the drawing area, wherein the one or more external input source modules each is selected by the user in the cryptography toolbox view via the graphical user interface, each having one or more second output ports, and each having a second position in the drawing area, and wherein the second position is provided by the user via the graphical user interface;

h. assigning, by the cryptography properties program, a second cryptography properties view to each of the one or more external input source modules, wherein the second cryptograph properties view having a plurality of first data-entry fields, wherein the first data-entry fields each having a first content that is provided by the user via the graphical user interface, and wherein the first content is available via the one or more second output ports;

i. receiving, by the cryptography design program, first graphical connections among the one or more external input source modules and the one or more selected cryptographic operation modules to form a design of the cryptosystem, wherein the design is articulated by the user, and wherein the first graphical connections are provided by the user via the graphical user interface;

j. receiving, by a simulation engine, a first command to start a first operation of the simulation engine, wherein the first command is initiated by the user via the graphical user interface, and wherein the first operation comprises:
 A. loading, by the simulation engine, the software cryptography library;
 B. evaluating, by the simulation engine, whether or not each of the first input ports of the one or more selected cryptographic operation modules is provided with a first data;
 C. based on the evaluation of the one or more selected cryptographic operation modules, assigning, by the simulation engine, the one or more selected cryptographic operation modules to one or more application programming interfaces from the loaded software cryptography library;
 D. executing, by the simulation engine, one or more of the one or more selected cryptographic operation modules, each using the assigned one or more application programming interfaces, the provided first data, and the selected functional behavior; and
 E. displaying, by the cryptography design program, a first visual graphical indicators on or around the one or more selected cryptographic operation modules, wherein the first visual graphical indicators each having different colors, and wherein each color represents a breakpoint assigned by the user, an evaluation step performed by the simulation engine, and an execution step performed by the simulation engine; and k. receiving, by a simulation output program, execution results from the simulation engine for the one or more selected cryptographic operation modules, and wherein the execution results are displayed by the simulation output program in a simulation output view;

l. receiving, by a code generation engine, a second command to start a second operation of the code generation engine for generating code for the cryptosystem in the same programming language of the loaded software cryptography library, wherein the second command is initiated by the user via the graphical user interface, and wherein the second operation comprises:
 A. creating a queue of executed cryptographic operation modules, and wherein the executed cryptographic operation modules each is assigned, by the code generation engine, to the one or more of the application programming interfaces and to a code generation order;
 B. creating a first internally-created application programming interface for a queued executed cryptographic operation module, wherein the first internally-created application programming interface having one or more parameters of at least the sum of the number of the preassigned one or more first input ports and the number of the preassigned one or more first output ports, wherein the first internally-created application programming interface comprises the one or more of the application programming interfaces, wherein the one or more parameters each having a parameter name, a first subset of parameters and a second subset of parameters, wherein the first subset of parameters each provides a second data to the one or more of the application programming interfaces, wherein the second data is provided by one of the preassigned one or more first input ports whose preassigned name matches the parameter name of a first corresponding parameter from the first subset of parameters, wherein the second subset of parameters each provides a third data to one of the preassigned one or more first output ports whose preassigned name matches the parameter name of a second corresponding parameter from the second subset of parameters, and wherein the third data is provided by the one or more of the application programming interfaces, whereby the user conveniently learns cryptography, experiments with cryptography, and designs, simulates, generates code, and validates the cryptosystem using graphical representations of cryptographic operations and the loaded software cryptography library.

13. The method of claim 12, wherein the second operation further comprising:

49 a. creating a programming-language call of the first internally-created application programming interface, and wherein the programming-language call passes one or more arguments to the first internally-created application programming interface;
b. assigning a first constructed name to each of the one or more arguments, under a first setup or a second setup, wherein the first constructed name in the first setup is constructed using the preassigned name, followed by a module identification identifying the queued executed cryptographic operation module, followed by the code generation order of the queued executed cryptographic operation module, wherein the module identification is optionally provided by the user, wherein the second setup provides a fourth data from a constructed argument from a second internally-created application programming interface, wherein the constructed argument has a second constructed name, and wherein the first constructed name in the second setup is constructed using the second constructed name;
c. creating one or more programming-language input variables for the queued executed cryptographic operation module, wherein the one or more programming-language input variables each having an associated input port from the first input ports, and each having a third constructed name, wherein the third constructed name is constructed using the preassigned name of the associated input port, followed by the module identification of the queued executed cryptographic operation module, followed by the code generation order of the queued executed cryptographic operation module, and wherein the programming-language input variables each is assigned the second data if the associated input port is connected to the external input source module; and
d. creating one or more programming-language output variables for the queued executed cryptographic operation module, wherein the one or more programming-language output variables each having an associated output port from the first output ports, and each having a fourth constructed name, and wherein the fourth constructed name is constructed using the preassigned name of the associated output port, followed by the module identification of the queued executed cryptographic operation module, followed by the code generation order of the queued executed cryptographic operation module.

14. The method of claim 12, further comprising:
a. displaying, by the cryptography toolbox program, to the user a no-connection module in the cryptography toolbox view;
b. receiving and placing, by the cryptography design program, the no-connection module from the cryptography toolbox view into the drawing area, wherein the no-connection module is selected by the user in the cryptography toolbox view via the graphical user interface, having a third output port, and having a third position in the drawing area, and wherein the third position is provided by the user via the graphical user interface; and
c. receiving, by the cryptography design program, a second graphical connection between the third output port and a second discretionary input port of a first module in the drawing area, wherein the second discretionary input port and the first module are selected by the user via the graphical user interface, wherein the second graphical connection is provided by the user via

50 the graphical user interface, and wherein the no-connection module provides a null data to the second discretionary input port.

15. The method of claim 14, further comprising:
a. displaying, by the cryptography toolbox program, to the user a memory module in the cryptography toolbox view;
b. receiving and placing, by the cryptography design program, the memory module from the cryptography toolbox view into the drawing area, wherein the memory module is selected by the user in the cryptography toolbox view via the graphical user interface, and having a fourth position in the drawing area, wherein the fourth position is provided by the user via the graphical user interface, and wherein the memory module comprising:
   A. an assigned third cryptography properties view by the cryptography properties program, wherein the assigned third cryptography properties view having a second data-entry field for the user to provide a first identification label for identifying a virtual memory location of the memory module, wherein the virtual memory location having a second content, and wherein the second content is provided by the user or by a second module in the drawing area;
   B. a fourth output port; and
   C. a third discretionary input port;
c. executing, by the simulation engine, write and read operations on the virtual memory location if the third discretionary input port is graphically connected, by the user via the graphical user interface, to the second module that provides a fourth data, wherein the memory module overwrites the second content with the fourth data in the virtual memory location, and wherein the fourth data in the virtual memory location is available for reading on the fourth output port; and
d. executing, by the simulation engine, a read-only operation on the virtual memory location if the third discretionary input port is graphically connected, by the user via the graphical user interface, to the no-connection module, and wherein the second content of the virtual memory location is available for reading on the fourth output port.

16. The method of claim 15, further comprising:
a. displaying, by the cryptography toolbox program, to the user a while-loop iteration module in the cryptography toolbox view;
b. receiving and placing, by the cryptography design program, the while-loop iteration module from the cryptography toolbox view into the drawing area, wherein the while-loop iteration module is selected by the user in the cryptography toolbox view via the graphical user interface, represents a while-loop path of a while-loop iteration statement, and having a fifth position in the drawing area, wherein the fifth position is provided by the user via the graphical user interface, and wherein the while-loop iteration module in the drawing area comprising:
   A. a second mandatory input port;
   B. a third mandatory input port;
   C. a first memory module for storing a fifth data provided by the second mandatory input port, wherein the first memory module having a second identification label for its virtual memory location, wherein the virtual memory location of the first memory module having a third content, wherein the third content is updated with a sixth data if a third module inside the while-loop path of the while-loop iteration module is connected to a second memory module having the same second identification label of the first memory module, and wherein the third module writes the sixth data into the second memory module;

D. a third memory module for storing a seventh data provided by the third mandatory input port, wherein the third memory module having a third identification label for its virtual memory location, wherein the virtual memory location of the third memory module having a fourth content, wherein the fourth content is updated with an eighth data if a fourth module inside the while-loop path of the while-loop iteration module is connected to a fourth memory module having the same third identification label of the virtual memory location of the third memory module, and wherein the fourth module writes the eighth data into the fourth memory module;

E. an assigned fourth cryptography properties view by the cryptography properties program, wherein the assigned fourth cryptography properties view comprises a data-selection field for the user to select a comparison operation, wherein the comparison operation is used by the simulation engine to compare the fifth data with the seventh data in one iteration, and to compare the sixth data with the eighth data in the next iteration, and wherein the assigned fourth cryptography properties view having a third data-entry field for the user to provide the second identification label for the virtual memory location of the first memory module, and having a fourth data-entry field for the user to provide the third identification label for the virtual memory location of the third memory module; and F. a fifth output port for holding the outcome of executing the comparison operation by the simulation engine, whereby the while-loop iteration module performs comparison operations using the contents of its internal first memory module and internal third memory module, such that the contents can be updated by other modules, in the cryptosystem, that are graphically connected to other memory modules having the same identification label as the first memory module and/or the third memory module.

17. The method of claim 16, further comprising:
a. displaying, by the cryptography toolbox program, to the user a break module in the cryptography toolbox view;
b. receiving and placing, by the cryptography design program, the break module from the cryptography toolbox view into the drawing area, wherein the break module is selected by the user in the cryptography toolbox view via the graphical user interface, having a fourth mandatory input port, is placed in the while-loop path of the while-loop iteration module, and having a sixth position in the drawing area, and wherein the sixth position is provided by the user via the graphical user interface; and
c. receiving, by the cryptography design program, a third graphical connection between the fourth mandatory input port and a sixth output port of a fifth module in the drawing area, wherein the sixth output port and the fifth module are selected by the user via the graphical user interface, wherein the fifth module is placed, by the cryptography design program, in the while-loop path of the while-loop iteration module, wherein the third graphical connection is provided by the user via the graphical user interface, and wherein the break module indicates the termination of the while-loop path of the while-loop iteration module after executing the fifth module by the simulation engine.

18. The method of claim 16, further comprising:
a. displaying, by the cryptography toolbox program, to the user a continue module in the cryptography toolbox view;
b. receiving and placing, by the cryptography design program, the continue module from the cryptography toolbox view into the drawing area, wherein the continue module is selected by the user in the cryptography toolbox view via the graphical user interface, having a fourth mandatory input port, is placed in the while-loop path of the while-loop iteration module, and having a sixth position in the drawing area, and wherein the sixth position is provided by the user via the graphical user interface; and
c. receiving, by the cryptography design program, a third graphical connection between the fourth mandatory input port and a sixth output port of a fifth module in the drawing area, wherein the sixth output port and the fifth module are selected by the user via the graphical user interface, wherein the third graphical connection is provided by the user via the graphical user interface, wherein the fifth module is placed, by the cryptography design program, in the while-loop path of the while-loop iteration module, wherein the continue module indicates a last operation in the while-loop path of the while-loop iteration module after executing the fifth module by the simulation engine, and forces the while-loop iteration module to perform another comparison on the contents of the first memory module and the third memory module using the comparison operation.

19. The method of claim 16, further comprising:
a. receiving, by the cryptography properties program, a fourth identification label, wherein the fourth identification label is assigned by the cryptography properties program to the while-loop path of the while-loop iteration module in the drawing area, and wherein the assigned fourth cryptography properties view of the while-loop iteration module having a fifth data-entry field for the user to provide the fourth identification label via the graphical user interface;
b. receiving, by the cryptography design program, a third command to display a list having the fourth identification label, wherein the third command is initiated by the user via the graphical user interface, wherein the list is displayed on or around a fifth module in the drawing area, and wherein the fifth module is selected by the user via the graphical user interface;
c. assigning, by the cryptography design program, the fifth module to none or the fourth identification label, and wherein the none or the fourth identification label is selected by the user from the list via the graphical user interface; and
d. displaying, by the cryptography design program, a second visual graphical indicator on or around the fifth module, and wherein the second visual graphical indicator having the selected fourth identification label, whereby the user visually identifies modules that are assigned and placed in the while-loop path of the while-loop iteration module in the drawing area, with the absence of graphical connections between the while-loop iteration module and these modules in the drawing area.

20. The method of claim 12, further comprising:
a. displaying, by the cryptography toolbox program, to the user an if-else selection module in the cryptography toolbox view;
b. receiving and placing, by the cryptography design program, the if-else selection module from the cryptography toolbox view into the drawing area, wherein the if-else selection module is selected by the user in the cryptography toolbox view via the graphical user interface, represents an if-else true-path and if-else false-path of an if-else selection statement, and having a third position in the drawing area, wherein the third position is provided by the user via the graphical user interface, and wherein the if-else selection module in the drawing area comprising:
  A. a second mandatory input port;
  B. a third mandatory input port;
  C. an assigned third cryptography properties view by the cryptography properties program, wherein the assigned third cryptography properties view comprises a data-selection field for the user to select a comparison operation, and wherein the comparison operation is used by the simulation engine to compare a fourth data on the second mandatory input port with a fifth data on the third mandatory input port; and
  D. a third output port for holding the outcome of executing the comparison operation by the simulation engine.

21. The method of claim 20, further comprising:
a. receiving, by the cryptography properties program, a first identification label, wherein the first identification label is assigned by the cryptography properties program to the if-else true-path of the if-else selection module in the drawing area, and wherein the assigned third cryptography properties view of the if-else selection module having a second data-entry field for the user to provide the first identification label via the graphical user interface;
b. receiving, by the cryptography properties program, a second identification label, wherein the second identification label is assigned by the cryptography properties program to the if-else false-path of the if-else selection module in the drawing area, and wherein the assigned third cryptography properties view of the if-else selection module having a third data-entry field for the user to provide the second identification label via the graphical user interface;
c. receiving, by the cryptography design program, a third command to display a list having the first identification label and the second identification label, wherein the third command is initiated by the user via the graphical user interface, wherein the list is displayed on or around a module in the drawing area, and wherein the module is selected by the user via the graphical user interface;
d. assigning, by the cryptography design program, the module to none, the first identification label, or the second identification label, and wherein the none, the first identification label, or the second identification label is selected by the user from the list via the graphical user interface; and
e. displaying, by the cryptography design program, a second visual graphical indicator on or around the module, and wherein the second visual graphical indicator having the selected first identification label or the selected second identification label, whereby the user visually identifies modules in the if-else true-path and the if-else false-path of the if-else selection module in the drawing area, with the absence of graphical connections between the if-else selection module and these modules in the drawing area.

22. The method of claim 12, further comprising receiving, by a cryptography module creation engine, a third command to start a third operation of the cryptography module creation engine for creating a user-created cryptographic operation module from the cryptosystem in the drawing area, wherein the third command is initiated by the user via the graphical user interface, wherein the cryptosystem comprises of interconnected modules, wherein the interconnected modules combined having one or more second input ports and one or more third output ports, and wherein the third operation further comprising:
  a. generating one or more third input ports for the user-created cryptographic operation module;
  b. mapping each of the one or more third input ports to one of the one or more second input ports that are connected to one or more of the external input source module, wherein the one or more third input ports each is determined to be a second mandatory input port or a second discretionary input port, and each having a first name, wherein the first name is constructed using a first label followed by a first numerical value, wherein the first label is obtained from the one or more second input ports having the first label, and wherein the first numerical value is computed as an increment of a first largest numerical value among all names of the one or more second input ports having the first label, and among all names of the third input ports having the first label;
  c. generating one or more fourth output ports for the user-created cryptographic operation module;
  d. mapping each of the one or more fourth output ports to one of the one or more third output ports, wherein the one or more fourth output ports each having a second name, wherein the second name is constructed using a second label followed by a second numerical value, wherein the second label is obtained from the one or more third output ports having the second label, and wherein the second numerical value is computed as an increment of a second largest numerical value among all names of the one or more third output ports having the second label, and among all names of the one or more fourth output ports having the second label;
  e. creating, by the cryptography module creation engine, a third cryptography properties view for the user-created cryptographic operation module, wherein the third cryptography properties view having a data-selection field comprising one or more data-selection items for the user, wherein the data-selection items each is assigned to one of the one or more fourth output ports, and wherein the simulation output view displays a fourth data of one of the one or more fourth output ports if the user selects the data-selection item that is assigned to the one of the one or more fourth output ports; and
  f. storing, by the cryptography module creation engine, the user-created cryptographic operation module in a second storage device, wherein the cryptography toolbox program retrieves the user-created cryptographic operation module from the second storage device, and wherein the cryptography toolbox program displays to the user in the cryptography toolbox view the user-created cryptographic operation module.

\* \* \* \* \*